United States Patent
Shirota et al.

(10) Patent No.: US 10,356,320 B2
(45) Date of Patent: Jul. 16, 2019

(54) INFORMATION PROCESSING DEVICE AND IMAGE INPUT DEVICE

(71) Applicant: TOSHIBA MEMORY CORPORATION, Minato-ku, Tokyo (JP)

(72) Inventors: Yusuke Shirota, Kanagawa (JP); Tatsunori Kanai, Kanagawa (JP); Junichi Segawa, Kanagawa (JP); Toshiki Kizu, Kanagawa (JP); Akira Takeda, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 304 days.

(21) Appl. No.: 14/847,142

(22) Filed: Sep. 8, 2015

(65) Prior Publication Data
US 2016/0080652 A1    Mar. 17, 2016

(30) Foreign Application Priority Data
Sep. 16, 2014    (JP) ................. 2014-187568

(51) Int. Cl.
*H04N 5/232*    (2006.01)
*G06K 7/14*    (2006.01)
*G06K 9/00*    (2006.01)
*H04N 7/18*    (2006.01)

(52) U.S. Cl.
CPC ....... *H04N 5/23241* (2013.01); *G06K 7/1404* (2013.01); *G06K 9/00221* (2013.01); *H04N 5/23222* (2013.01); *H04N 7/183* (2013.01)

(58) Field of Classification Search
CPC .......... H04N 5/23222; H04N 5/23229; H04N 5/23241; H04N 5/23245; H04N 7/183; H04N 7/188; H04N 5/23203; H04N 5/23206; H04N 5/23216; H04N 5/23219; H04N 5/23225; H04N 5/23251; H04N 5/23258; H04N 5/23254; G06K 7/1404; G06K 9/00221–00281
See application file for complete search history.

(56) References Cited

U.S. PATENT DOCUMENTS

| 7,090,136 B2 * | 8/2006 | Muramatsu ........ G06K 7/10881 235/462.09 |
| 7,098,899 B1 * | 8/2006 | Ginosar ................ G06F 1/1613 345/204 |
| 7,966,458 B2 * | 6/2011 | Warrier ............... G06F 12/1433 711/105 |

(Continued)

FOREIGN PATENT DOCUMENTS

| JP | 2003-144385 | 5/2003 |
| JP | 2004-328735 | 11/2004 |

(Continued)

*Primary Examiner* — Lin Ye
*Assistant Examiner* — Chriss S Yoder, III
(74) *Attorney, Agent, or Firm* — Oblon, McClelland, Maier & Neustadt, L.L.P.

(57) ABSTRACT

According to an embodiment, in an information processing device, when there is no change in a first image received from an image sensor, reception of the next first image is awaited. When there is a change in the first image, a second image having a higher resolution than the first image is received from the image sensor and processing for the second image is performed.

20 Claims, 28 Drawing Sheets

(56) References Cited

U.S. PATENT DOCUMENTS

| | | | |
|---|---|---|---|
| 9,544,497 B2* | 1/2017 | Forutanpour | H04N 5/23293 |
| 9,628,716 B2* | 4/2017 | Kim | H04N 5/23293 |
| 9,800,782 B2* | 10/2017 | Kallstrom | H04N 5/23241 |
| 2004/0212678 A1* | 10/2004 | Cooper | G08B 13/19602 |
| | | | 348/155 |
| 2014/0118592 A1* | 5/2014 | Yoon | H04N 5/23245 |
| | | | 348/308 |
| 2014/0208069 A1* | 7/2014 | Wegener | G06F 9/3001 |
| | | | 712/22 |
| 2015/0062365 A1* | 3/2015 | Lee | H04N 5/23245 |
| | | | 348/222.1 |

FOREIGN PATENT DOCUMENTS

| | | |
|---|---|---|
| JP | 2005-033649 | 2/2005 |
| JP | 2007-241657 | 9/2007 |
| JP | 2007-318262 | 12/2007 |
| JP | 2010-124381 | 6/2010 |
| JP | 2010-154070 | 7/2010 |
| JP | 2012-060291 | 3/2012 |
| WO | 2007/105270 | 9/2007 |

* cited by examiner

|  | INTERNAL CLOCK | INTERNAL REGISTER | OSCILLATOR |
|---|---|---|---|
| FIRST LOW POWER MODE | × | ○ | ○ |
| SECOND LOW POWER MODE | × | × | × |

INFORMATION PROCESSING DEVICE AND IMAGE INPUT DEVICE

CROSS-REFERENCE TO RELATED APPLICATION

This application is based upon and claims the benefit of priority from Japanese Patent Application No. 2014-187568, filed on Sep. 16, 2014; the entire contents of which are incorporated herein by reference.

FIELD

Embodiments described herein relate generally to an information processing device and an image input device.

BACKGROUND

Typically, various types of information processing devices are known to be equipped with various functions. For example, a glasses-type wearable device or a wristwatch type wearable device is known to have a camera application or a perceptual UI for gesture recognition; an IoT/M2M system is known to be equipped with a security camera; a tablet or a smartphone is known to have a camera application; an electronic endoscope is known to have a healthcare application, and an in-vehicle camera is known to be equipped with an image sensor.

For example, in an electronic endoscope (an example of the information processing device) that includes an imaging unit (an image sensor); a technology is known in which, when a pressure equal to or greater than a predetermined value with respect to a grip is not detected for a certain period of time or beyond, supply of electrical power to the imaging unit is stopped.

However, for example, in an advanced camera application such as face recognition, not only it takes time to perform face recognition once but also imaging (sometimes also called "capturing") using an image sensor needs to be continued in such a way that no important event is missed from being captured, and image processing (face recognition) using the obtained image needs to be performed on a constant basis. Hence, an idle period (the period of time in which no operations are performed in the information processing device) cannot be secured, or only a very limited idle period can be secured. Because of that, the information processing device cannot switch to a low power consumption state, and keeps on consuming a large amount electrical power.

DETAILED DESCRIPTION

According to an embodiment, in an information processing device, when there is no change in a first image received from an image sensor, reception of the next first image is awaited. When there is a change in the first image, a second image having a higher resolution than the first image is received from the image sensor and processing for the second image is performed.

Exemplary embodiments of an information processing device and an image input device according to the invention are described below in detail with reference to the accompanying drawings.

First Embodiment

Figure 1:
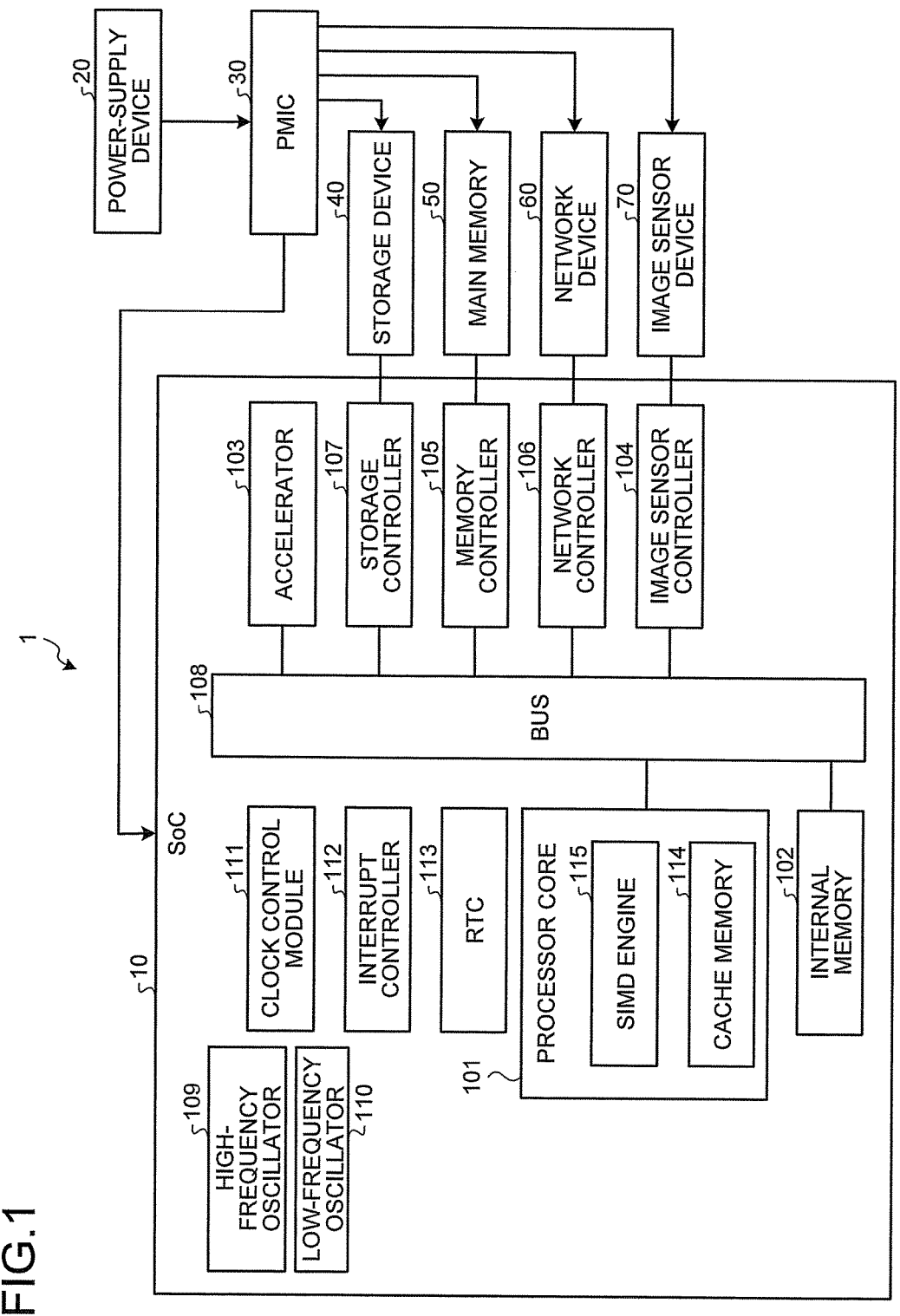
FIG. 1 is a diagram illustrating a configuration of an information processing device according to a first embodiment.

FIG. 1 is a diagram illustrating an exemplary hardware configuration of an information processing device 1 according to a first embodiment. As illustrated in FIG. 1, the information processing device 1 includes a system-on-chip (SoC) 10, a power-supply device 20, a power management integrated circuit (PMIC) 30, a storage device 40, a main memory 50, a network device 60, and an image sensor device 70. In the following explanation, when the storage device 40, the main memory 50, the network device 60, and the image sensor device 70 need not be distinguished from each other, they are sometimes collectively referred to as an "I/O device". The SoC 10 can also include a general-purpose and versatile serial interface such as an I2C interface (I2C stands for Inter-Integrated Circuit), an SPI interface (Serial Peripheral Interface), a UART interface (UART stands for Universal Asynchronous Receiver/Transmitter), or a USB interface (USB stands for Universal Serial Bus). Moreover, various devices can be used as the I/O device.

The SoC 10 includes various internal modules. In the example illustrated in FIG. 1, the SoC 10 includes the following internal modules: a processor core 101; an internal memory (also called a local memory) 102 such as a static random access memory (SRAM) serving as the memory area in the SoC 10; an accelerator 103 such as a graphic processing unit (GPU) or a hardware engine; an image sensor controller 104; a memory controller 105 that controls the main memory 50; a network controller 106 that controls the network device 60; a storage controller 107 that controls the storage device 40; a bus 108 that interconnects the internal modules; a high-frequency oscillator 109 such as an oscillator that generates a high-frequency clock; a low-frequency oscillator 110 that generates a low-frequency clock; a clock control module 111 that controls whether or not to perform clock frequency conversion and clock supply (controls ON/OFF of the clock); an interrupt controller 112 that sends an interrupt, which is received from the I/O device, to the processor core 101; and a real time clock (RTC) 113 that has a timekeeping function. In the following explanation, when the image sensor controller 104, the memory controller 105, the network controller 106, and the storage controller 107 need not be distinguished from each other, there are sometimes collectively referred to as a "device controller".

The processor core 101 is an ARM processor (ARM stands for Advanced RISC machines), and includes a cache memory (L1 cache, L2 cache) 114 and a general-purpose SIMD engine 115 (SIMD stands for Signal Instruction Multiple Data) such as NEON. The SoC 10 illustrated in FIG. 1 is an example of a single-core configuration including a single processor core 101. Alternatively, the SoC 10 can have a multicore configuration (as a multicore processor) including a plurality of processor cores 101.

The SoC 10 has a WAIT mode and a DEEP SLEEP mode as the low power modes for being in the standby state on low electrical power. In the DEEP SLEEP mode, the power consumption is lower than the power consumption in the WAIT mode. In the WAIT mode, the processor core 101 is stopped (clock gating is performed) and the supply voltage is lowered to a range in which only holding of the state is possible. However, the cache memory 114 consumes the necessary electrical power for holding a state in which the operations can be immediately resumed in response to the notification of an event from the interrupt controller 112. Moreover, the voltage and the clock required for the operations of the peripherals such as the device controller is continuously supplied, and the main memory 50 is also held in an accessible state. On the other hand, in the DEEP SLEEP mode (also called a STOP mode), in addition to stopping the processor core 101, the supply of electrical power to the cache memory 114 is also stopped (power gating is performed); and the contents of the internal memory and the power-supply voltage supplied to the peripherals such as a device controller are lowered to a range in which only the values of internal registers can be held. Meanwhile, when the main memory 50 is a volatile memory, that fact is explicitly set in the low power modes (described later). In contrast, when the main memory 50 is a nonvolatile memory, the supply of electrical power is stopped. Moreover, the supply of electrical power is continued only to the internal modules such as the interrupt controller 112, the RTC 113, and the clock control module 111 that get the clock supply from the low-frequency oscillator 110 having low power consumption and that are required at the time of returning from the DEEP SLEEP mode. However, the high-frequency oscillator 109 having high power consumption and a phase locked loop (PLL) in the clock control module 111 are stopped so that the standby state having extremely low power consumption can be achieved. Meanwhile, the DEEP SLEEP mode requires more time for state transition than the WAIT mode. The low power modes in the SoC 10 can be of various types depending on the SoC 10, and is not limited to the examples explained above.

Examples of the power-supply device 20 include the following various types: an alternating-current (AC) power supply; a primary battery; and a secondary battery. Alternatively, it is possible to use combination of an energy harvesting device, such as a photovoltaic cell, and an electrical storage device, such as a high-capacity capacitor. In that case, it is possible to perform power supply control of the peak assist type in which the surplus electricity generated during an idle period (i.e., the period of time in which the information processing device 1 does not perform operations) can be stored in an electrical storage unit. Then, the electrical power required at the peak hour during an active period (i.e., the period of time in which the information processing device 1 performs operations) can be covered by supplying a combination of the electrical power stored in the electrical storage unit and the electrical power generated by the photovoltaic cell.

The PMIC 30 converts the electrical power supplied by the power-supply device 20 into the voltage required by the SoC 10 and the I/O device, and supplies the voltage.

The storage device 40 is used as a secondary storage in the information processing device 1 for storing data or computer programs. The storage device 40 can be configured with, for example, a NAND flash memory, a memory card such as a secure digital (SD) card, or a hard disk.

The main memory 50 can be a volatile memory such as a dynamic random access memory (DRAM); or can be a nonvolatile memory such as a magnetoresistive random access memory (MRAM), a phase change memory (PCM), a resistance random memory (ReRAM), or a ferroelectric random access memory (FeRAM). When a volatile memory is used, the power consumption can be held down by, for example, switching a DRAM such as LPDDR2 to the self-refresh mode. When a nonvolatile memory is used, electrical power saving can be achieved by stopping the supply of electrical power.

As far as the network device 60 is concerned, it is possible to use a wireless LAN device having the transmission standard of 802.11a/802.11b/802.11g/802.11n/802.11ac; or to use a device for near field transmission such as Bluetooth or Zigbee (registered trademark).

Figures 2, 3:
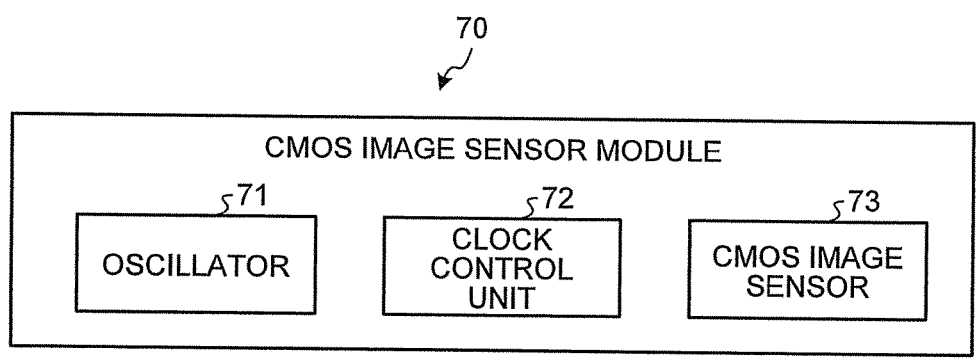
FIG. 2 is a diagram illustrating a configuration of an image sensor module according to the first embodiment.
FIG. 3 is a diagram illustrating low power modes of the image sensor module according to the first embodiment.

As illustrated in FIG. 2, the image sensor device 70 is, for example, a CMOS image sensor module (CMOS stands for Complementary Metal-Oxide Semiconductor) having a CMOS image sensor (an imaging element) installed therein. In the following explanation, the image sensor device 70 is sometimes referred to as a "CMOS image sensor module 70". Meanwhile, as the CMOS image sensor, it is also possible to use some other sensor such as a CCD image sensor (CCD stands for Charge-Coupled Device). The CMOS image sensor module 70 includes an oscillator 71 that generates a clock; a clock control unit 72 that controls the clock; a CMOS image sensor 73; and a lens (not illustrated). In the following explanation, the CMOS image sensor 73 is sometimes referred to as an "image sensor 73". Herein, either the CMOS image sensor module (the image sensor device) 70 can be considered to be corresponding to the "image sensor", or the CMOS image sensor 73 can be considered to be corresponding to the "image sensor".

Meanwhile, the image sensor 73 can also have an automatic adjustment function such as autofocusing for taking clear images.

The image sensor 73 is compatible to a plurality of frame rates; and inputs images to the SoC 10 according to the frame rate that is set. For example, the frame rate can be 30 frames per second (fps). In this way, since successive images (sometimes also called a "stream" or a "video") keep on reaching the SoC 10, the main memory 50 having a buffer for storing the arrived data also needs to be maintained in the accessible state. Moreover, the image sensor controller 106 and the data transfer bus also need to be continuously supplied with a clock. Hence, an idle period cannot be secured for switching the SoC 10 to a low power mode. In the first embodiment, the image sensor 73 and the image sensor controller 106 are minutely controlled so that only the necessary images (sometimes also referred to as "still images") are received as input, and the image sensor 73 and the image sensor controller 106 are immediately stopped thereafter. With that, it becomes possible to secure an idle period. In essence, even under a typical condition of, what is called, shooting a video (or, during the use/operations of the information processing device 1 (i.e., since an application is performing operations, during a change detection operation from the perspective of the application); the image sensor 73, the SoC 10, and the main memory 50 are (internally) minutely stopped or switched to a low power mode.

The image sensor controller 104 includes an interface, such as a camera serial interface (CSI) of the MIPI alliance, for receiving input of images from the image sensor 73. The image sensor controller 104 performs stream processing with respect to the images that keep on arriving. Moreover, the image sensor controller 104 can also have a conversion function for changing the resolution of the input images. For that reason, the image sensor controller 104 is also called an image processing unit (IPU). Furthermore, the image sensor controller 104 can also include a DMA controller (DMA stands for Direct Memory Access) for transferring the input images to the main memory 50. Moreover, for example, in the case of using an I2C interface in controlling the image sensor 73, the image sensor controller 104 can include an I2C controller or can itself be configured as an I2C controller.

Meanwhile, as illustrated in FIG. 3, the CMOS image sensor module 70 has a plurality of low power modes. For example, the CMOS image sensor module 70 has a first low power mode in which a return period, which represents the period of time taken for returning from the low power mode to a state that enables imaging, is short; and has a second low power mode in which the return period is longer but the standby electricity is lower. In the first low power mode, only the internal clock is stopped (clock gating is performed). However, in the second low power mode, in addition to stopping the internal clock, the oscillator 71 is also stopped and the internal register of the CMOS image sensor 73 is also turned OFF (the supply of electrical power is stopped). Herein, during the period of time of returning from the low power mode to the state that enables imaging, the resetting of registers as necessary in each low power mode or the resetting of registers while dynamically changing the resolution is also referred to as "initialization". Meanwhile, depending on the type of the image sensor device 70, various types of low power modes can be set in image sensor device 70. That is, the low power modes are not limited to the example explained above. As described later, if the low power modes are appropriately used in switching the SoC 10 to the DEEP SLEEP mode, it becomes possible to achieve still lower power consumption in the information processing device 1.

The information processing device 1 can also include the following: various types of sensors such as a 9-axis sensor, an infrared sensor, a sound sensor (a microphone), and a pulse sensor; various types of electronic-paper devices or nonvolatile displays such as Mirasol; a display such as a memory liquid crystal display or IGZO LCD that runs on low refresh rate; a liquid crystal display (LCD) compatible to panel self-refresh (PSR); a display device of a head-mounted display in the case of using a glasses-type wearable device; and a controller for controlling the components. The same is applicable in all embodiments.

In the first embodiment, with respect to the images obtained (input) from the image sensor device 70, during a period of time in which the target for processing is not captured or during a period of time in which the target movement for detection does not occur (i.e., "a period of time having no change or only a small change in the images or a period of time having no image change that is supposed to be detected or only a small image change that is supposed to be detected"; in essence, a period of time in which "an image change significant for the application" is either absent or only small or "an image change requested by the application" is either absent or only small), with the aim of achieving low power consumption in the information processing device 1, standby-state image processing (an operation performed prior to the operations of the application) is introduced that, in a short period of time and at low power consumption, enables detection of an event which triggers a change in the state of the surrounding environment or triggers advanced image processing (such as face recognition) of the application. With that, in the application, it becomes possible to reduce the time for which advanced image processing is unnecessarily performed without any triggering event. As a result, the idle period in which the information processing device 1 can remain in the low power consumption state can be secured as much as possible. Furthermore, the standby-state image processing is not implemented in the application but is isolated in the operating system (OS). Then, in the OS, electrical power saving is achieved by proactively switching to a low power mode, such as the DEEP SLEEP mode, even for short idle periods. Herein, a short idle period is, for example, in the range of few milliseconds to several tens of milliseconds. Moreover, the standby-state image processing is performed using an image having a lower resolution (in the following explanation, sometimes referred to as a "low-resolution image") than the image obtained by the image sensor device 70 and used in the advanced image processing of the application. That enables achieving reduction in the amount of calculations. Besides, speeding up of the image processing is achieved using the accelerator 103 and the SIMD engine 115 (hereinafter, sometimes collectively referred to as an "accelerator"). Therefore, the image processing is completed in a short period of time, thereby enabling securing a longer idle period. As a result of performing the standby-state image processing, if a change in the environment is detected, or a change in the condition is detected, or a specific target object is detected (collectively referred to as "change detection"); then the application is notified about the change detection and is given the control after transferring the image required in the advanced image processing of the application (i.e., the image having a higher resolution than the low-resolution image). Herein, according to the request of the application, either a single image may be transferred thereto or a plurality of images such as a video or a stream may be transferred thereto. Then, the application performs unique and advanced image processing using the high-resolution image sent by the OS.

In essence, in the information processing device 1 according to the first embodiment, if there is no change in a first image (in this example, a "low-resolution image") that is input from the image sensor 73, then the input of the next first image is awaited. When a change is found in a first image, then a second image having a higher resolution than the first image (i.e., in this example, a "high-resolution image") is input from the image sensor 73, and image processing is performed using the second image. Thus, in the first embodiment, it is possible to think that, in order to detect a change in a second image, an operation is performed for determining a change in the first images using the first images.

However, that is not the only possible case. Alternatively, for example, the image used in the image processing of an application can have the same resolution as the image used in the standby-state image processing. In essence, in the first embodiment, instead of an application performing image processing on a constant basis, whether or not to allow the application to perform image processing is determined by means of image processing that is performed prior to the image processing of the application and that has a smaller throughput than the image processing of the application.

Meanwhile, the OS represents the basic computer program that provides functions for controlling the hardware resources (such as the image sensor device 70) of the information processing device 1. For example, Linux (registered trademark) is an example of the OS. An application represents a computer program that provides a specific function using the OS. The application can be of any type. The processor core 101 executes the OS and the application, and implements various functions. Meanwhile, in this written description, "imaging" represents the operation in which an image of a photographic subject (an imaging target) formed using an optical system such as a lens is converted into electrical signals.

Figure 4:
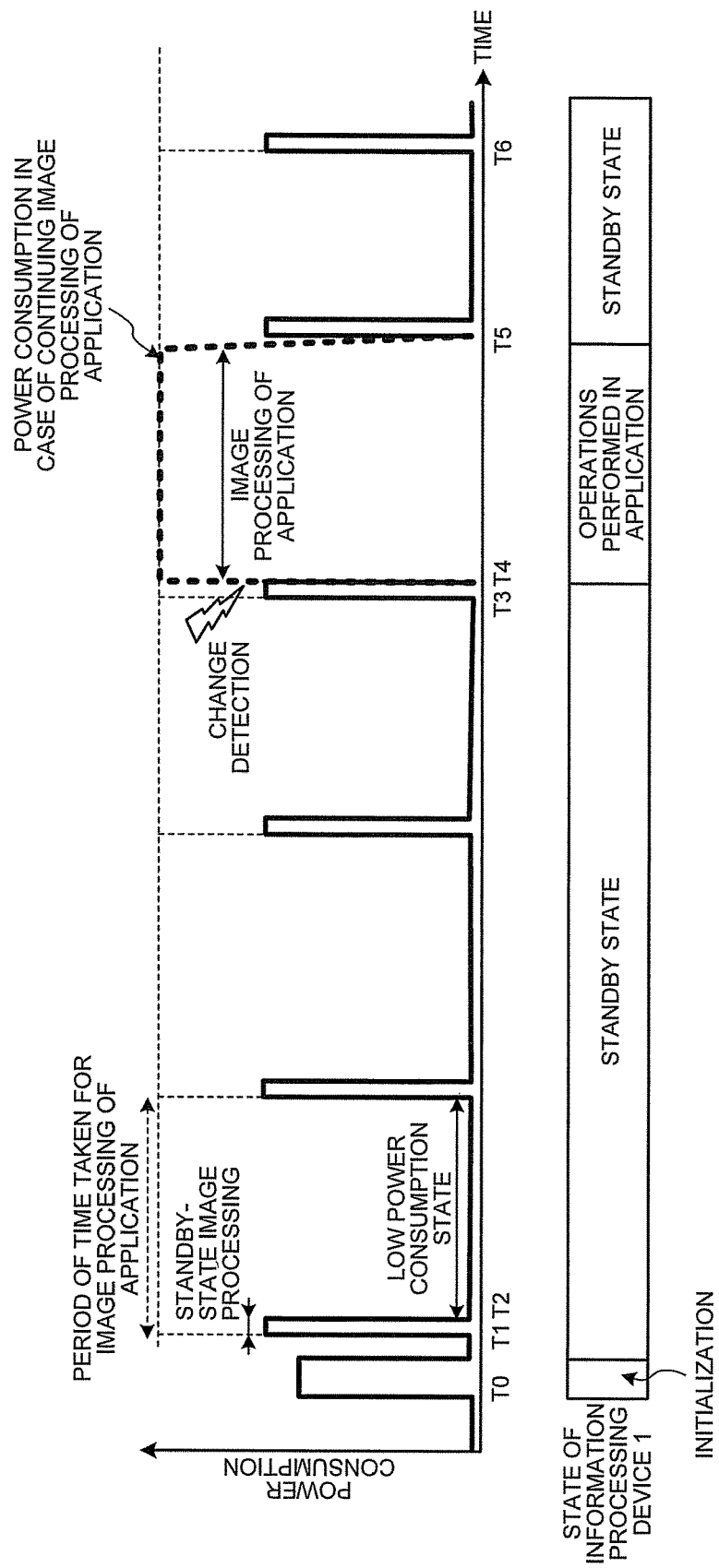
FIG. 4 is a diagram illustrating an exemplary transition of the power consumption of the information processing device according to the first embodiment.

FIG. 4 is a diagram illustrating an exemplary transition of the power consumption of the entire information processing device 1 according to the first embodiment as observed during the use of the information processing device 1. Thus, explained below with reference to FIG. 4 is the general outline of the first embodiment. As illustrated in FIG. 4, firstly, at a timing T0 of starting the execution of an application, an initialization operation is performed to initialize the application and the CMOS image sensor 73. During the initialization operation, some operations need to be performed only once at the start of the execution of the application; some operations need to be performed every time the image sensor 73 returns from the low power mode and performs imaging; and some operations need to be performed at the time of changing the settings in a dynamic manner. Herein, the initialization operation can include all such operations. Then, at a timing T1, the application requests the OS to start the standby-state image processing for detecting any environmental change or detecting an event (i.e., detecting a change in the image), and switches to the standby state until a notification about the detection of a change in the image is received from the OS. When a request for starting the standby-state image processing is received from the application, the OS imports a low-resolution image from the CMOS image sensor 73 and starts the standby-state image processing in which the low-resolution image serves as the input.

The standby-state image processing represents the operation for detecting a change in the image obtained from the CMOS image sensor 73 (in the following explanation, sometimes called a "change detection operation"). It is possible to think of various examples of the standby-state image processing. For example, in the case of performing advanced face recognition using an application, the standby-state image processing can be performed prior to the face recognition operation for the purpose of detecting a period of time during which no person is captured (i.e., a period of time usable as the idle period). In the information processing device 1 according to the first embodiment, as an exemplary image processing algorithm of the standby-state image processing, when a stationary camera such as a security camera is installed or when a person wearing a glasses-type wearable device equipped with a non-stationary camera is standing still, the difference between a background image, which represents an image taken over the period of time in which there is no change prior to the entry of a person (an image obtained by the CMOS image sensor 73 by means of imaging), and the current image obtainable from the CMOS image sensor 73 is calculated for detecting a change. With that, it becomes possible to detect whether or not a person is captured in the current image. Herein, it is needless to say that the background image can be a single image; or can be an average image of a plurality of images taken during the period of time of no change; or can be an image obtained by calculating the standard operations or changes and performing modeling; or can be an image that is reset when many pixels of the input image change values. Alternatively, it can be checked whether or not the skin color is present in the current image obtainable from the CMOS image sensor 73. With that, it becomes possible to detect whether or not a person is captured in the current image. As another example, in the case of performing advanced image processing for reading barcode contents using an application, the operations to be performed prior to the reading can include image processing for detecting a period of time during which no barcode is captured (i.e., a period of time usable as the idle period). In the information processing device 1 according to the first embodiment, in the case of using a non-stationary camera of a glasses-type wearable device or using a camera application of a smartphone for the purpose of detecting a barcode captured in an image that is obtained by means of imaging, an exemplary image processing algorithm of the standby-state image processing includes detecting whether or not a portion having a substantial change in the contrasting density, which represents the feature of a barcode, is present in the current image obtainable from the CMOS image sensor 73. With that, it can be detected whether or not a barcode is present in the current image. In the case in which the CMOS image sensor 73 itself moves around when used in a glasses-type wearable device or a capsule endoscope, the standby-state image processing can represent an operation of obtaining the difference with a background image and determining whether or not the CMOS image sensor 73 has moved since the input of the background image. In the case in which, for example, an image can be taken over 360° in the lateral direction using an endoscope, the standby-state image processing can represent an operation of determining the direction of the object that needs to be captured at high resolution and stored (i.e., determining the direction of the imaging target), and can also represent an operation of detecting a change in the image in the concerned direction.

Meanwhile, during the standby-state image processing, there is no need to use a high-resolution image that is required in the advanced image processing of the application. As long as it is possible to detect an idle state for securing as much period of time as possible to switch to the low power consumption state, the image resolution can be lowered to any level. A low-resolution image can be an image taken at a low resolution by the image sensor 73, or can be an image obtained by the image sensor controller 104 by converting an image input from the image sensor 73. If the resolution can be lowered, the amount of calculation decreases thereby leading to a reduction in the processing time. Moreover, if the image sensor 73 takes an image at a low resolution and if accordingly a high framerate is used (for example, 30 fps is used for high-resolution imaging and 120 fps is used for low-resolution imaging), it becomes possible to shorten the time taken for transferring image data from the image sensor 73 to the SoC 10 or to the buffer of the main memory 50. Therefore, operations performed using the image obtained by means of imaging can be started early, thereby enabling achieving reduction in the time taken for the standby-state image processing. Moreover, not only simply the amount of calculation decreases, but it also becomes possible to use the internal memory 102 that generally has a small memory capacity as explained in another embodiment (described later). Hence, it becomes possible to achieve lower power consumption. Moreover, as explained in another embodiment (described later), in the internal memory (the local memory) 102, it becomes possible to use NEON having a high electrical efficiency. That promotes effective usage of the accelerator 103. Furthermore, as explained in another embodiment (described later), at the time of offloading the standby-state image processing to a microcomputer, it becomes possible to reduce the load of the microcomputer and thus to use the microcomputer at a lower electrical power. Moreover, as explained in another embodiment, while performing the standby-state image processing inside the CMOS image sensor 73, only a small buffer is required thereby making it easier to perform the operations. In this way, if the resolution of the image to be used in the standby-state image processing is reduced to be lower than the resolution of the image to be used in the image processing of the application, or if the frame rate used for low-resolution imaging is increased to be higher than the frame rate used for high-resolution imaging (or if both the measures are taken); then it leads to an enhancement in the coordination with various mechanisms in the framework in which a change detection operation is performed separately from the application. As a result, the processing time of the change detection operation decreases to a large extent, and the period of time for which the information processing device 1 can remain in the low power consumption state can be maximized.

Meanwhile, in the standby-state image processing, there is no need to use a clear image that is required by the application. As long as it is possible to detect the presence or absence of an image change, it is possible to use an unclear image too. Whenever a change is detected, the clear image required by the application can be re-obtained. While obtaining a clear image, if the initialization operation of the CMOS image sensor 73 is time consuming; then the period of time allotted for the initialization operation (hereinafter, sometimes referred to as the "initialization period") can be set to be shorter than the period of time required for obtaining a clear image, and an unclear image can be used so that the change detection operation can be performed in a short period of time. Using an unclear image includes the following cases, for example: using the frames (images) that are input until a clear image is obtained but that were destroyed in the conventional technology are used in the change detection operation; performing the setting not to use autofocusing and using an image taken under that setting; taking an image in insufficient brightness; and using an imaging mode in which the period of time for the start of image input is short.

In essence, in the information processing device 1 according to the first embodiment, the image sensor 73 is supplied with a second electrical power at the time of inputting images, and is supplied with a third electrical power, which is lower than the second electrical power, in the case other than inputting images. Alternatively, the configuration can be such that, during a period of time in which there is no change in the first images (in this example, "low-resolution images"), the image sensor 73 performs the input for a first time period representing a period of time taken for inputting images. However, when there is a change in a first image, the image sensor 73 performs the input for a second time period representing a period of time taken for inputting images. Herein, the first time period is shorter than the second time period. Still alternatively, for example, the configuration can be such that, during a period of time in which there is no change in the first images, the period of time starting from the start of an input request operation for requesting the input of a first image up to the start of an input operation for inputting the first images is a third time period. However, when there is a change in a first image, the period of time starting from the start of an input request operation for requesting the input of a second image (in this example, a "high-resolution image") up to the start of an input operation for inputting a second image is a fourth time period. Herein, the third time period is shorter than the fourth time period.

In this way, it becomes possible to secure a long idle period in which the information processing device 1 can remain in the low power consumption state. When a change is detected during the standby-state image processing, the application is notified about the change; a high-resolution image that is required in the image processing of the application is taken and sent to the application; and the control is transferred to the application. Then, the application performs unique image processing such as a face recognition operation, an operation of reading the contents of a barcode, an operation of storing/recording the image in the storage device 40, or an operation of transferring the image via the network device 60.

As described above, during a period of time in which there is no change in the images obtained in a sequential manner from the CMOS image sensor 73 (a period of time of no image change), the advanced image processing of the application is replaced with lightweight pre-processing described above. That eliminates the need for performing the image processing of the application until the target for processing such as a person or a barcode is captured in an image. Thus, when there is no image change, the period of time for which the information processing device 1 can remain in the low power consumption state can be maximized. Hence, it becomes possible to achieve lower power consumption. Meanwhile, regarding the algorithms to be implemented in the standby-state image processing, it is possible to implement algorithms that are commonly usable in a number of applications which calculate the difference with background images, or it is possible to implement application-specific algorithms. That is, the algorithms are not limited to the examples described earlier. Moreover, because of the framework according to the first embodiment, regarding the change detection operation that is commonly usable in a number of applications, the implementation optimized for an accelerator such as the accelerator 103 or the SIMD engine 115 can be provided in the OS. With that, the optimized implementation and the change detection operation using that implementation become easily available to an application. Besides, if the change detection operation is performed in the OS, then the number of times of copying data in the user space can also be reduced.

Returning to the explanation with reference to FIG. 4, at a timing T2 illustrated in FIG. 4, since the standby-state image processing did not result in the detection of an image change, the entire information processing device 1 is immediately and explicitly switched to the low power consumption state in which the power consumption is extremely low. More particularly, the SoC 10 is switched to the DEEP SLEEP mode, and the CMOS image sensor module 70 is switched to a low power mode. Moreover, if the main memory 50 is of the volatile type, it is switched to a low power mode (for example, the self-refresh mode). On the other hand, if the main memory 50 is of the nonvolatile type, the supply of electrical power to the main memory 50 is stopped. After waiting in the low power consumption state for a certain period of time, the constituent elements are made to return from the low power mode, and the standby-state image processing is performed again. This sequence of operations is repeated until an image change is detected during the standby-state image processing.

Explained below is an exemplary method of swiftly switching the entire information processing device 1 to the low power consumption state in which the power consumption is extremely low. Firstly, in the sequence of a video capturing framework in Linux such as Video for Linux Two (V4L2), after the start of stream processing for receiving images, image processing is performed using the input images. Then, stream processing is stopped after the completion of the image processing. However, with that, during processing for the first image too, the image sensor keeps on performing operations. Hence, in the first embodiment, a sequence is followed in which, after the start of stream processing for receiving images, when the input of necessary images (such as a single image) is completed, the stream processing is stopped; and the processing for the first image is performed using the image received thereafter. As a result of such a sequence, during the execution of the processing for the first image, when the input of images from the image sensor 73 is not required (i.e., immediately after the input of an image), electrical power saving is achieved by either setting the image sensor 73 to the low power mode or stopping the image sensor 73. Usually, in a camera, such control cannot be performed because there are times when the user requests for continuous shooting. However, the basic operation in the first embodiment is to wait if an image is received but no change is detected. Hence, electrical power saving can be achieved in such proactive manner. Meanwhile, in the case of capture processing, since the input of images is received in succession, there are times when a double buffer is used in order to make the input operation efficient. However, in the case of detecting a change using a single image, instead of waiting for the input of two images in the double buffer, the setting can be done to generate an interrupt after a single image is input, and the image sensor 73 and the IPU are immediately stopped when a single image is input. Alternatively, it is also possible to perform an operation in which the IPU is proactively stopped without waiting for the completion of stopping the image sensor 73.

In essence, in the information processing device 1, when no change is found in a first image (in this example, a "low-resolution image"), the input of the next first image is awaited at a first electrical power, which is lower than the electrical power used during a first process (in this example, the "standby-state image processing") performed to determine a change in a first image.

Subsequently, at a timing T4, when an image change is detected as a result of performing the standby-state image processing, the high-resolution image required in the image processing of the application is re-obtained from the CMOS image sensor 73. Then, the application that is waiting since the timing T1 for the detection of an image change by the OS is notified about the detection of an image change. Moreover, the newly obtained high-resolution image is sent to the application, and the control is transferred to the application. From the timing T4 onward, the application performs unique image processing such as face recognition using the high-resolution image received from the OS. At a timing T5, when the image processing of the application is completed, the application again requests the OS to start the standby-state image processing for detecting an image change such as an environmental change or an event. Then, the sequence of operations described above is repeated. In FIG. 4, a dotted line represents the power consumption in the case in which the advanced image processing of an application is continuously performed without implementing the method described above. In contrast, in FIG. 4, a solid line represents the power consumption in the case in which the method described above is implemented. The difference between the power consumption represented by the dotted line in FIG. 4 and the power consumption represented by the solid line in FIG. 4 is equivalent to the power consumption that is reducible by implementing the method described above. Meanwhile, with reference to FIG. 4, during the period of time taken by the application for performing the image processing once, the standby-state image processing is also performed once. However, that is not the only possible case. Alternatively, the standby-state image processing can be performed for any number of times. In this way, with the configuration according to the first embodiment, many images can be processed more often and at shorter intervals than in the conventional case. For that reason, it becomes possible to swiftly respond to an image change (it becomes possible to enhance the responsiveness), and to enhance the recognition capacity/change detection capacity. That enables achieving enhancement in the usability of the information processing device 1 and that too with less power consumption. Meanwhile, the explanation with reference to FIG. 4 is only exemplary, and it is not the only possible case.

Figure 5:
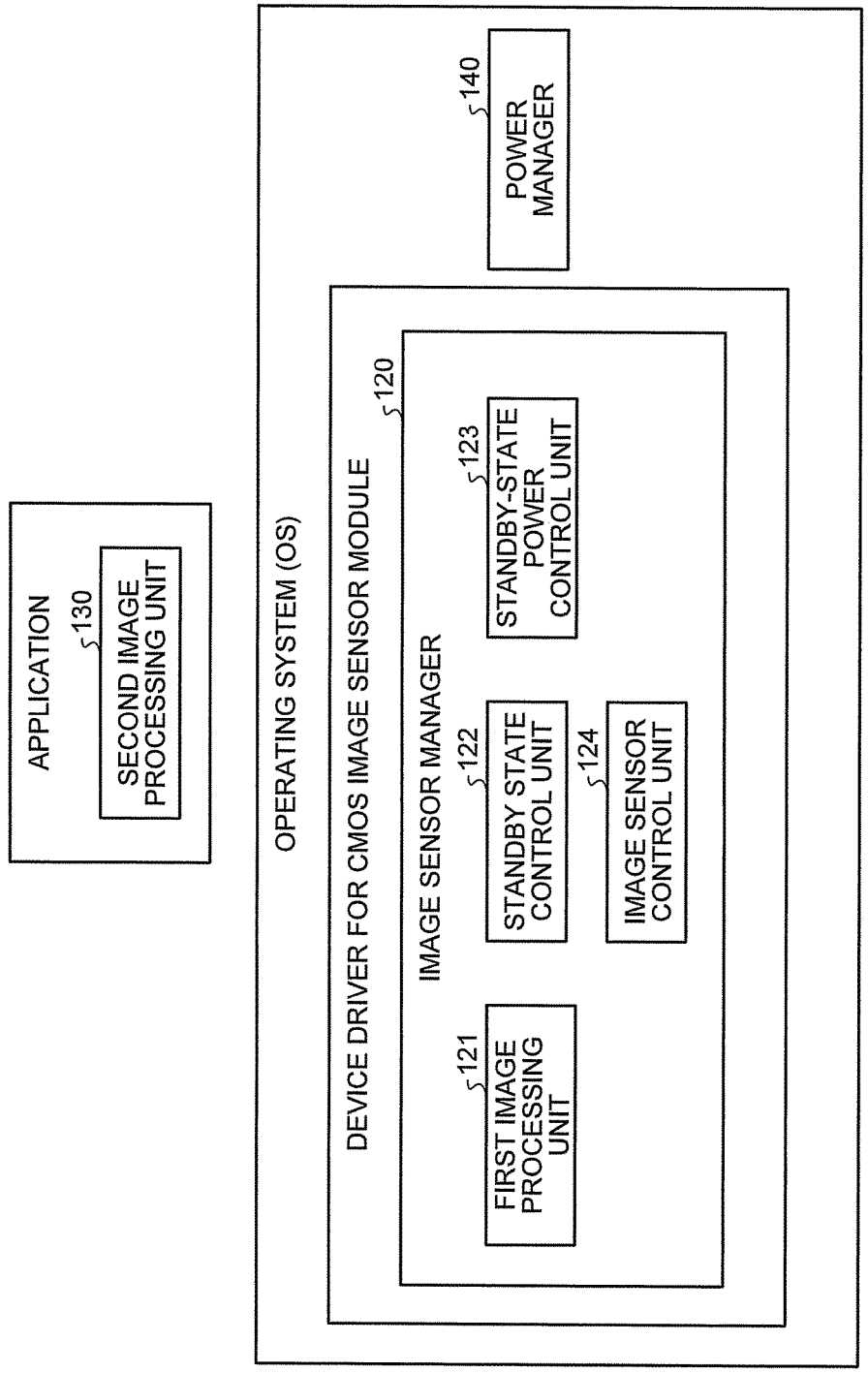
FIG. 5 is a diagram illustrating an image sensor manager according to the first embodiment.

FIG. 5 is a diagram illustrating an exemplary functional configuration of an image sensor manager 120 that is provided by the OS installed in the information processing device 1 according to the first embodiment. The image sensor manager 120 is implemented as, for example, a device driver included in the OS that runs in the SoC 10 (such as the device driver of the CMOS image sensor module 70). In the example illustrated in FIG. 5, the image sensor manager 120 includes a first image processing unit 121, a standby state control unit 122, a standby-state power control unit 123, and an image sensor control unit 124. Herein, the image sensor control unit 124 controls the CMOS image sensor module 70 (the CMOS image sensor 73) and obtains register settings via an interface, such as an I2C interface, and obtains the images (the images obtained by the CMOS image sensor 73 by means of imaging) via an interface such as a CSI interface. Moreover, as illustrated in FIG. 5, the application includes a second image processing unit 130 that performs application-specific image processing (in the following explanation, sometimes referred to as "second image processing"). In the first embodiment, due to the coordination between the application and the image sensor manager 120 of the OS, low power consumption is achieved in the information processing device 1.

The first image processing unit 121 performs the standby-state image processing. In the following explanation, the standby-state image processing is sometimes referred to as "first image processing"). The first image processing unit 121 uses the image obtained by the image sensor control unit 124 from the image sensor 73, and performs the first image processing to determine whether or not to allow the advanced image processing of the application (in the following explanation, sometimes referred to as "second image processing"). The first image processing, which may be simply referred to as a first process, has a smaller throughput or has lower power consumption as compared to the second image processing, which may be simply referred to as a second process.

In essence, in the information processing device 1, as a result of performing the first process (in this example, the "first image processing") for determining a change in the first image input from the image sensor 73, if no change is detected in the first image, then the input of the next first image is awaited. On the other hand, if a change is detected in the first image, then the second process (in this example, the "second image processing") is performed. Herein, the electrical power during the first process is lower than the electrical power during the second process. Moreover, in the information processing device 1, when no change is detected in the first image, then the input of the next first image is awaited at the first electrical power, which is lower than the electrical power during the first process for determining a change in the first image.

Furthermore, in the information processing device 1 according to the first embodiment, the configuration can be such that, as a result of performing the first process (in this example, the "first image processing") for recognizing a target object in the first image that is input from the image sensor 73, if the target object is not recognized, then the input of the next first image is awaited. However, when the target object is recognized, a second image having a higher resolution than the first image is input from the image sensor 73. Then, the second process (in this example, the "second image processing") is performed using the second image. Moreover, in the information processing device 1 according to the first embodiment, the configuration can be such that, as a result of performing the first process for recognizing the target object in the first image that is input from the image sensor 73, if the target object is not recognized, then the input of the next first image is awaited. However, when the target object is recognized, the second process is performed, where the electrical power during the first process is lower than the electrical power during the second process. In that case, the resolution of the second image used in the second process either can be higher than the resolution of the first image as is the case in the first embodiment or can be same as the resolution of the first image.

In the first embodiment, the first image processing unit 121 instructs the image sensor control unit 124 to obtain an image having a lower resolution than the image used in the second image processing (i.e., to obtain a low-resolution image), and performs the first image processing using that low-resolution image. Meanwhile, the image used in the first image processing can have the same resolution as the image used in the second image processing. In that case, the image used in the first image processing can be used without modification in the second image processing. That eliminates the need for obtaining an image to be used in the second image processing. The same is the case in the other embodiments too.

The first image processing is performed to detect a change in the image obtained by the image sensor control unit 124. When the first image processing results in the detection of a change in the image obtained by the image sensor control unit 124, the condition for performing the second image processing is satisfied. Herein, the operations for detecting an image change in the image obtained by the image sensor control unit 124 includes, for example, not only the operation for calculating the inter-frame difference and detecting an image change but also the operation of detecting whether or not a specific target object (for example, a barcode) is captured in the image obtained by the image sensor control unit 124. For example, in the case in which the first image processing represents the operation of detecting whether or not a specific target object (for example, a barcode) is captured in the image obtained by the image sensor control unit 124; if it is detected as a result of performing the first image processing that the specific target object is captured in the image obtained by the image sensor control unit 124, then the condition for performing the second image processing is satisfied.

The standby state control unit 122 comprehensively controls the operations of the image sensor manager 120. In the first embodiment, when the result of the first image processing satisfies the condition for performing the second image processing, the standby state control unit 122 performs control to make the second image processing unit 130 perform the second image processing. In the first embodiment, when the result of the first image processing satisfies the condition for performing the second image processing, the standby state control unit 122 instructs the image sensor control unit 124 to obtain an image having the necessary resolution for the second image processing (i.e., to obtain a high-resolution image), and sends to the second image processing unit 130 (the application) a notification about the obtained image and information indicating that the condition for performing the second image processing is satisfied (i.e., information indicating that an image change is detected). Herein, this notification control is equivalent to the control of making the second image processing unit 130 perform the second image processing. However, the manner of performing control to make the second image processing unit 130 perform the second image processing is not limited to this example. Meanwhile, in this example, the standby state control unit 122 can be considered to be corresponding to an "execution control unit".

Figure 6:
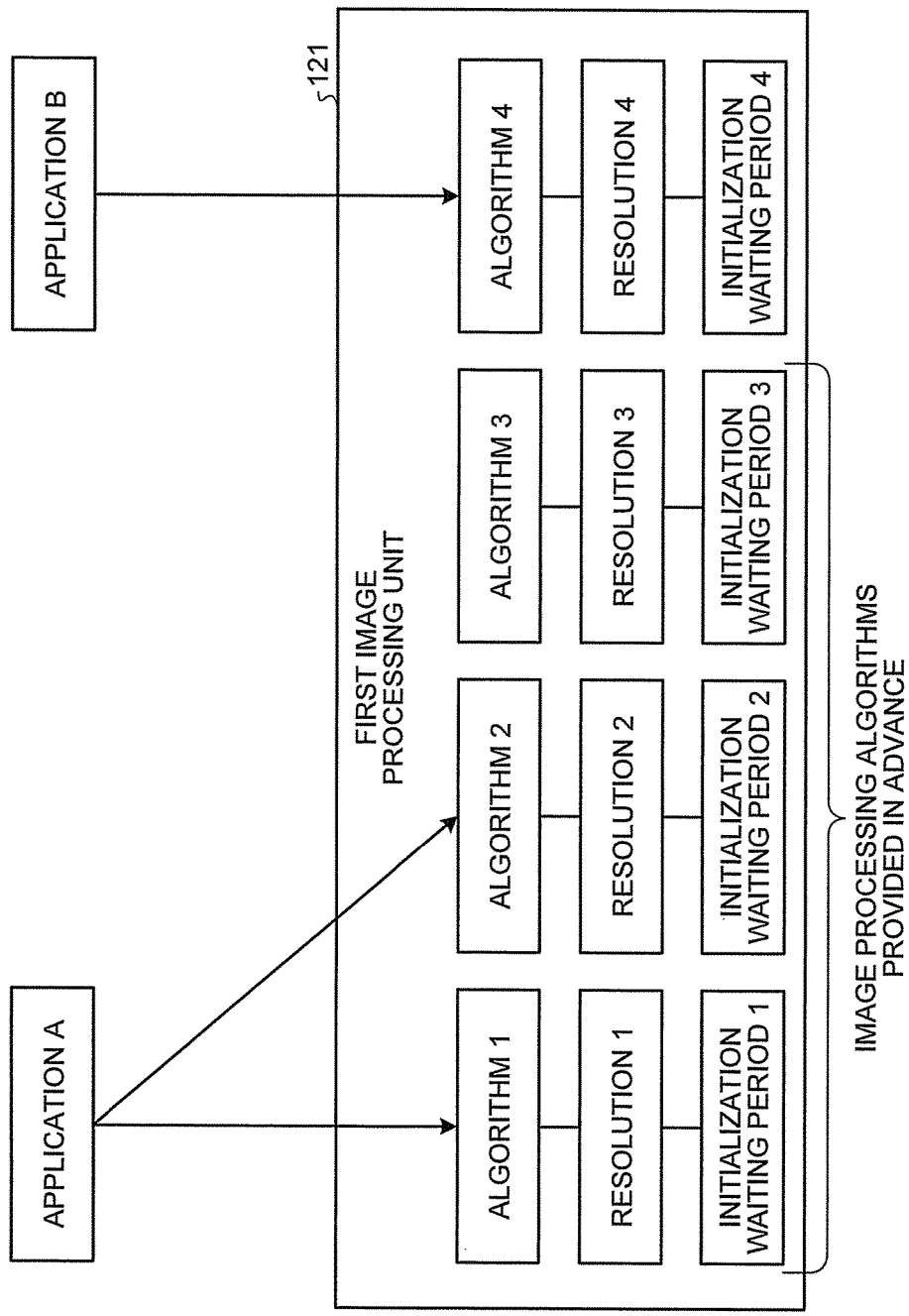
FIG. 6 is a diagram for explaining the setting of image processing algorithms according to the first embodiment.

Moreover, in the first embodiment, according to a specification from the application, the standby state control unit 122 performs control to set, as the image processing algorithm to be implemented in the first image processing, at least one of a plurality of types of image processing algorithms provided in advance in the first image processing unit 121. In this example, the standby state control unit 122 can be considered to be corresponding to a "setting control unit". In the example illustrated in FIG. 6, three types of algorithms are provided in advance in the first image processing unit 121. Those algorithms are identified by algorithm identifiers (in the example illustrated in FIG. 6, an algorithm 1 to an algorithm 3) assigned to the algorithms. For example, the algorithm identified by the algorithm 1 illustrated in FIG. 6 represents the algorithm for the operation of detecting whether or not a specific target object (such as a barcode) is captured in the image obtained by the image sensor control unit 124. Moreover, the algorithm identified by the algorithm 2 represents the algorithm for the operation of detecting a change in the image obtained by the image sensor control unit 124.

In the first embodiment, the OS (from another viewpoint, the information processing device 1) includes an interface unit (API) that enables the application to specify at least one algorithm, of a plurality of types of image processing algorithms provided in advance in the first image processing unit 121, as the image processing algorithm to be implemented in the first image processing. For example, the application can call an application program interface (API), such as an ioctl (I/O Control) system call of Linux, and can specify the application-intended algorithm, from among various image processing algorithms provided in the first image processing unit 121, to the image sensor manager 120 configured in the device driver of the CMOS image sensor module 70. Herein, the application can select the algorithm identifier (from the algorithm 1 to the algorithm 3 illustrated in FIG. 6) of the intended algorithm and specify the algorithm identified by the algorithm identifier. Meanwhile, for example, in the case in which a plurality of types of changes need to be detected in order to perform advanced image processing with respect to a plurality of types of objects such as a person and a barcode, a plurality of algorithms can be selected as the algorithms to be implemented in the first image processing unit 121. As illustrated in FIG. 6, an application A can specify the algorithm 1 and the algorithm 2 illustrated in FIG. 6. Meanwhile, for each image processing algorithm, the default value of resolution (such as 96×128) of the image obtained from the CMOS image sensor 73 (i.e., the image used in the first image processing) is defined, and the waiting period (the initialization period) for initializing the CMOS image sensor 73 is defined. However, the OS includes an interface unit (API) that enables specification or setting of values other than the default values.

Moreover, according to a request from an application, the standby state control unit 122 can obtain, from the outside too, the image processing algorithm to be implemented in the first image processing. In this example, the standby state control unit 122 can be considered to be corresponding to an "acquisition control unit". Moreover, in this example, the OS includes an interface unit (API) that enables the application to instruct the first image processing unit 121 to obtain the image processing algorithm to be implemented in the first image processing (i.e., a unique algorithm not included in the first image processing unit 121). This interface unit functions as, for example, a mechanism for downloading, in the OS, the image processing algorithm to be implemented in the first image processing. With that, even in the case in which the image processing algorithm suitable to the application is not provided in advance in the OS, it becomes possible to download the image processing algorithm suitable to the application and to perform the first image processing by implementing the downloaded image processing algorithm. Herein, the application may represent software that does not perform the second image processing but is meant only for adding the image processing algorithm to be implemented in the first image processing or meant only for upgrading the version of the image sensor manager 120. The same is the case in the other embodiments too.

The application can call an application program interface (API), such as an ioctl (I/O Control) system call of Linux, and can instruct the first image processing unit 121 to download a uniquely-created image processing algorithm in the image sensor manager 120 that is configured in the device driver of the CMOS image sensor module 70.

In the example illustrated in FIG. 6, an application B instructs the first image processing unit 121 to download a uniquely-defined image processing algorithm identified by an algorithm 4. According to a request from the application, when the first image processing unit 121 downloads an image processing algorithm other than the image processing algorithms provided in advance, the standby state control unit 122 adds and registers the downloaded image processing algorithm in the list of image processing algorithms to be implemented in the first image processing, and notifies the application about the algorithm identifier (in the example illustrated in FIG. 6, algorithm4) of the registered image processing algorithm. Thereafter, the application can use the notified algorithm identifier and specify the algorithm identified by the algorithm identifier.

Returning to the explanation with reference to FIG. 5, the standby-state power control unit 123 controls the low power modes of the information processing device 1. In the first embodiment, if the result of the first image processing does not satisfy the condition for performing the second image processing, the standby-state power control unit 123 performs control to switch the information processing device 1 to a second state (the low power consumption state) in which the power consumption is lower than in a first state in which the first image processing can be performed. In this example, if the result of the first image processing does not satisfy the condition performing the second image processing, the standby-state power control unit 123 instructs a power manager 140, which controls the supply of electrical power to the components of the information processing device 1, to switch the information processing device 1 to the second state. Meanwhile, in this example, the standby-state power control unit 123 can be considered to be corresponding to a "power control unit".

Figure 7:
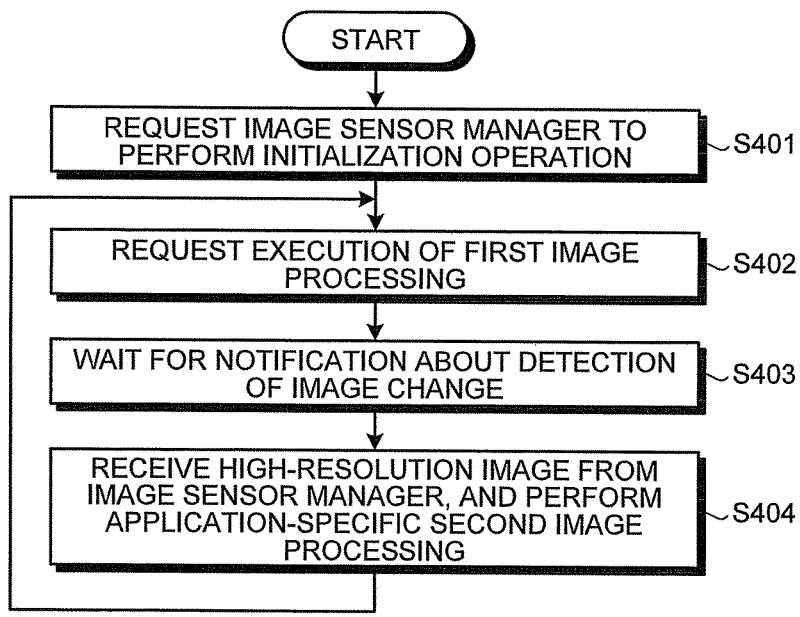
FIG. 7 is a flowchart for explaining operations performed by an application according to the first process.

FIG. 7 is a flowchart for explaining an example of the operations performed by an application. As illustrated in FIG. 7, firstly, the application requests, via an ioctl (I/O Control) system call, the image sensor manager 120 (the device driver) to perform various necessary initialization operations (Step 401). Meanwhile, as far as calling a function of the image sensor manager 120 (a function of the OS) from the application is concerned, the same method is implemented thereafter. For example, apart from the initialization operation of the CMOS image sensor module 70, the application can specify an algorithm identifier of the desired image processing algorithm and can request setting of the image processing algorithm identified by the specified algorithm identifier as the image processing algorithm to be implemented in the first image processing. Moreover, for example, in the example illustrated in FIG. 6, for each image processing algorithm, the default value of resolution (such as 96×128) of the image obtained from the CMOS image sensor 73 (i.e., the image used in the first image processing) is defined, and the waiting period (of few milliseconds) for initializing the CMOS image sensor 73 is defined. However, if the default value needs to be changed, the desired post-change value can be specified and setting to the desired post-change value can be requested. Furthermore, for example, if the application intends to use a uniquely-defined image processing algorithm, which is different than the image processing algorithms provided in advance in the first image processing unit 121, as the image processing algorithm to be implemented in the first image processing; then the application can request the image sensor manager 120 to download the uniquely-defined image processing algorithm. Moreover, the application can notify the image sensor manager 120 about the resolution (such as 96×128) of the image required in the second image processing and about the time interval for repeating the first image processing.

When the request for an initialization operation at Step S401 is completed, the application requests the image sensor manager 120 to perform the first image processing by implementing the image processing algorithm specified at Step S401 (Step S402).

Subsequent to Step S402, the application waits for a notification from the image sensor manager 120 about the detection of an image change (can be considered to be a notification about the information indicating that the condition for performing the second image processing is satisfied) (Step S403). When a notification about the detection of an image change is received from the image sensor manager 120, the application makes use of the high-resolution image, which is also received at the same time, and performs the application-specific second image processing using the second image processing unit 130 (Step S404). After the second image processing is completed, the application repeatedly performs the operations from Step S402 onward. Herein, the configuration can be such that, even after the application receives a notification, the operation of detecting an image change can be continually performed. In that case, subsequent to Step S404, the system control can return to Step S403.

Figure 8:
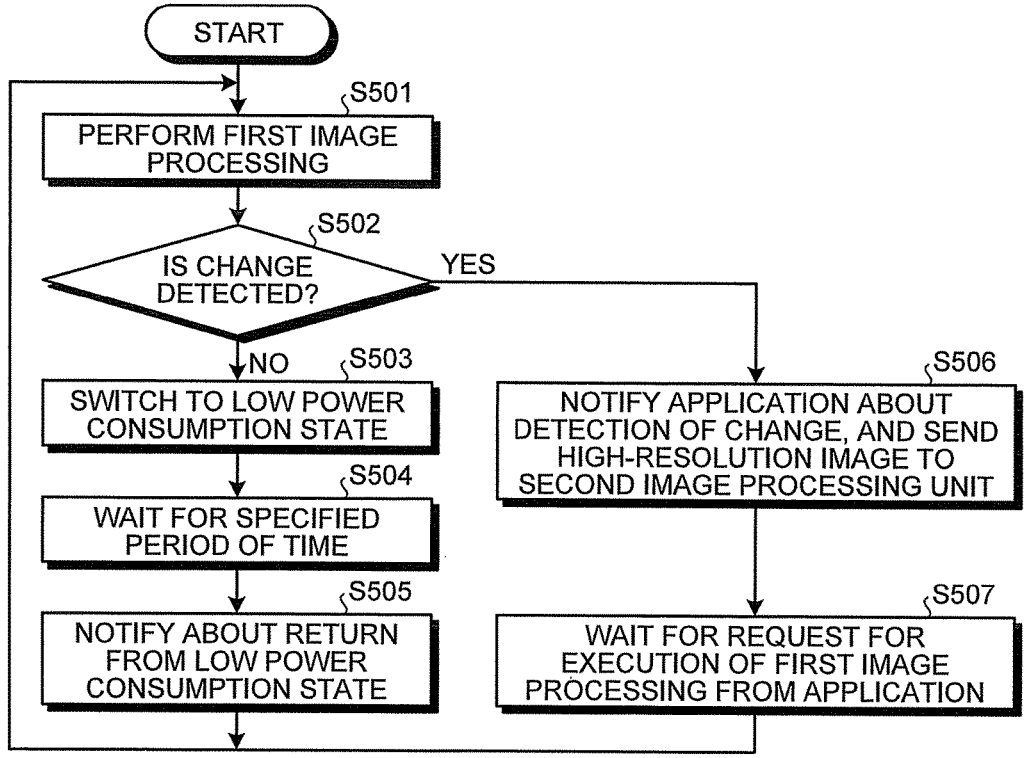
FIG. 8 is a flowchart for explaining operations performed by the image sensor manager according to the first embodiment.

FIG. 8 is a flowchart for explaining exemplary operations performed by the image sensor manager 120 in tandem with the abovementioned operations performed by the application. The flowchart illustrated in FIG. 8 is based on the premise that the image sensor manager 120 has completed the initialization operation in response to a request from the application at Step S401 illustrated in FIG. 7. During the initialization operation performed by the image sensor manager 120, the standby state control unit 122 that has received the setting details of the initialization operation specified by the application records the information based on the received setting details in the image sensor manager 120 or sets that information in the register of the image sensor 73. For example, when a predetermined algorithm identifier is specified by the application, the standby state control unit 122 records therein the fact that the image processing algorithm identified by the concerned algorithm identifier has been specified. Moreover, when the image to be used in the first image processing as specified by the application has a different resolution or a different waiting period for initialization than the default value, the standby state control unit 122 performs control to reflect those details in the first image processing unit 121. Furthermore, for example, when the application sends a request for a uniquely-defined image processing algorithm that is different than the image processing algorithms provided in advance in the first image processing unit 121, the standby state control unit 122 downloads the requested image processing algorithm, adds and registers the downloaded image processing algorithm in the list of image processing algorithms to be implemented in the first image processing, and notifies the application about the newly-registered algorithm identifier. Thereafter, the application becomes able to make use of the notified algorithm identifier and specify the algorithm identified by that algorithm identifier. Moreover, for example, when the application specifies the resolution of the image to be used in the second image processing performed by the application, the standby state control unit 122 records therein the specified information. Furthermore, when the application specifies the time interval for repeating the first image processing, the standby state control unit 122 sets timer information based on the specified information and records the set timer information in the standby-state power control unit 123 that performs control for the return from the low power consumption state.

Given below is the explanation of the flowchart illustrated in FIG. 8. Firstly, at Step S402 illustrated in FIG. 7, when the application requests execution of the first image processing by implementing the image processing algorithm specified at Step S401, the standby state control unit 122 receives the request and instructs the first image processing unit 121 to perform the first image processing by implementing the image processing algorithm identified by the specified algorithm identifier. Upon receiving the instruction, the first image processing unit 121 performs the first image processing by implementing the image processing algorithm identified by the specified algorithm identifier (Step S501). More particularly, the first image processing unit 121 notifies the image sensor control unit 124 about the resolution and the waiting period of initialization as set in the specified image processing algorithm, and instructs the image sensor control unit 124 to obtain an image. In this example, the resolution set in the image processing algorithm is set to be lower than the resolution required in the second image processing, while the waiting period for initialization set in the image processing algorithm is set to be shorter than the period of time required in obtaining a clear image. Upon receiving the instruction from the first image processing unit 121, the image sensor control unit 124 performs necessary initialization such as setting, in the register of the CMOS image sensor 73, the information (the resolution and the waiting period for initialization) notified by the first image processing unit 121 if that information is not already set; and obtains a low-resolution image. At that time, if a clear image needs to be obtained, it becomes necessary to wait for a sufficient period of time. However, in this example, since it serves the purpose as long as an image in which an image change is detectable can be obtained, waiting is done for only the notified period of time (which is shorter than the period of time taken to obtain a high-resolution image to be used in the second image processing). Then, using the low-resolution image obtained by the image sensor control unit 124, the first image processing unit 121 performs the first image processing by implementing the specified image processing algorithm.

If an image change is detected as a result of the first image processing (Yes at Step S502), the system control proceeds to Step S506. On the other hand, if no image change is detected (No at Step S502), then the standby state control unit 122 instructs the standby-state power control unit 123 to switch the information processing device 1 to the low power consumption state (Step S503). In this example, the image processing algorithm implemented in the first image processing is designed/implemented to swiftly detect an image change. That enables securing a period of time in which the entire information processing device 1 can be switched to the low power consumption state. Upon receiving the instruction from the standby state control unit 122, for example, the standby-state power control unit 123 sets the CMOS image sensor module 70 to the second low power mode and instructs the power manager 140 to switch the SoC 10 to the DEEP SLEEP mode. At that time, the information that is recorded in the standby-state power control unit 123 and that indicates the time interval for repeating the first image processing is used to set the timing for returning from the DEEP SLEEP mode in a timer, and a wait is performed till the timing set in the timer (Step S504). During that idle period, the information processing device 1 can be switched to a state of extremely low power consumption, and the average power consumption of the standby state of repeating the first image processing and the idle period can be reduced in a significant way. Then, the SoC 10 returns from the DEEP SLEEP mode when triggered by a timer event, and the standby-state power control unit 123 is notified about the return (Step S505). After the return from the low power consumption state, the operations from Step S501 onward are repeatedly performed.

Meanwhile, at Step S506, the standby state control unit 122 instructs the image sensor control unit 124 to obtain an image (a high-resolution image) having the necessary resolution for the second image processing as recorded in the standby state control unit 122. Upon receiving the instruction, the image sensor control unit 124 performs resetting of the register of the image sensor 73 for the purpose of obtaining a high-resolution image; obtains a high-resolution image from the image sensor 73; and sends the high-resolution image to the standby state control unit 122 (since resetting is performed via an interface such as an I2C interface, the detection of an image change can be observed from voltage information of the signal line of the same interface). Then, the standby state control unit 122 notifies the application about the detection of an image change; and sends the high-resolution image, which is obtained by the image sensor control unit 124, to the second image processing unit 130 that needs it for image processing (Step S506). Subsequently, the standby state control unit 122 waits until the application calls the image sensor manager 120 for the resumption of the first image processing (until the application requests execution of the first image processing) (Step S507). When a call is received, the operations from Step S501 onward are performed again.

In this way, in the first embodiment, the application and the image sensor manager 120 of the OS coordinate with each other to achieve low power consumption of the information processing device 1. In essence, the information processing device 1 according to the embodiment can be considered to have the following configuration. That is, the information processing device 1 includes a processing unit executed in the OS and includes an application. When an image input request is received from the application, the processing unit receives input of a first image from the image sensor 73 and performs the first process (in this example, the "first image processing") to determine a change in the first image. As a result of performing the first process, if no change in the first image is detected, then the input of the next first image is awaited. On the other hand, as a result of performing the first process, if a change in the first image is detected, then the processing unit receives input of a second image, which has a higher resolution than the first image, from the image sensor 73 and sends the second image to the application. Then, the application performs the second process (in this example, the "second image processing") using the second image received from the processing unit.

Moreover, the information processing device 1 according to the first embodiment can also be considered to have the following configuration. When there is no change in the first image received from the image sensor 73, the input of the next first image is awaited. However, when a change is detected, a second image having a higher resolution than the first image is received from the image sensor 73 and is then output (in this example, output to the application).

Furthermore, the information processing device 1 according to the first embodiment can also be considered to have the following configuration. After a request is received from the application for the input of a second image having a higher resolution than first image; repeated input of first images is done from the image sensor 73, and, when a change is found in a first image, a second image is received from the image sensor 73 and sent to the application. During the period of time starting from sending a request to receiving a second image, the electrical power of the image sensor 73 changes to at least the second electrical power at the time of inputting the images and to the third electrical power that is lower than the second electrical power.

As explained above, in the first embodiment, during the period of time in which there is no change in the images obtained from the CMOS image sensor 73, the advanced image processing (the second image processing) of the application is replaced with the first image processing having a smaller throughput than the second image processing and that is performed to detect a change in an image (i.e., the first image processing for determining whether or not to allow execution of the second image processing). As a result, it becomes possible to reduce the period of time for which the second image processing is performed without being actually unnecessary. Moreover, the period of time for which the information processing device 1 can be switched to the low power consumption state can be secured to the maximum extent possible. That enables achieving lower power consumption.

Meanwhile, in the first embodiment, the explanation is given for an example in which the SoC 10 is used to control the image sensor 73. However, the same power saving control can alternatively be performed using a microcomputer too. Thus, it is needless to say that the control is not limited to the explanation given above. The same is the case in the other embodiments too.

Second Embodiment

In a second embodiment, the initialization period of the image sensor 73 is different in the case of obtaining an image to be used in the first image processing than in the case of obtaining an image to be used in the second image processing. Herein, as described earlier, the initialization also includes the operation of resetting the register every time the image sensor 73 is made to return from the low power mode. As described earlier, during the standby-state image processing, there is no need to use a clear image that is required by the application. That is, as long as it is possible to detect the presence or absence of a change, an unclear image can also be used. In the case of using unclear images during the standby-state image processing, the waiting period for initialization (the initialization period) of the image sensor 73 can be shortened. Moreover, for example, if some of the captured images that are captured at the start but are originally destroyed without use because of the waiting done in the device driver or the image sensor 73 are used during the standby-state image processing, the idle state can be secured for a longer period of time. On the other hand, during the image processing of an application, since it is common to have the requirement of clear images, it becomes necessary to secure a longer initialization period of the image sensor 73 as compared to the case of obtaining images during the standby-state image processing. For that reason, the initialization period of the image sensor 73 is different in the case of obtaining an image to be used in the standby-state image processing than in the case of obtaining an image that needs to be sent to an application. For example, since the setting is done via an interface such as an I2C interface, after the same setting is observed from voltage information of the signal line of the same interface, it can also be observed from voltage information of the signal line of the same interface that the number of sets of image data transferred in succession via an image transferring interface such as a CSI interface is different in the case of obtaining an image to be used in the first image processing than in the case of obtaining an image to be used in the second image processing.

In the second embodiment, in the case of obtaining an image to be used in the first image processing, the image sensor control unit 124 sets the initialization period of the image sensor 73 to be shorter than the initialization period of the image sensor 73 in the case of obtaining an image to be used in the second image processing.

Moreover, in the second embodiment, an interface unit is disposed for enabling the application to set the initialization period of the image sensor 73. In this example, the OS includes an interface unit that enables the application to set the initialization period of the image sensor 73. For example, the application can call an application program interface (API), such as an ioctl (I/O Control) system call of Linux, and can specify the period of time for initialization of the image sensor 73 to the image sensor manager 120 configured in the device driver of the image sensor module 70. Moreover, this API can also be used at the time of developing a unique standby-state image processing algorithm. Meanwhile, although the explanation is given for an example of specifying the initialization period of the image sensor 73, that is not the only possible case. Then, according to the specification from the application, the image sensor control unit 124 sets the initialization period of the image sensor 73.

Third Embodiment

In a third embodiment, an interface unit is disposed for enabling the application to specify the time interval for repeating the first image processing. According to the specification from the application, the standby state control unit 122 (in this example, corresponding to an "interval setting control unit") sets the time interval. As a result, the standby-state image processing (the first image processing) can be performed at the suitable time interval for the application. Herein, the method of specifying the time interval is arbitrary. For example, the time interval can be specified using various methods such as specifying the number of times of execution in one second. Besides, the changes in the setting of the time interval can be specified at an arbitrary timing. As a result, the time interval can be changed in a dynamic manner according to the convenience of the application or according to a change in the state of the surrounding environment. Moreover, the method of detecting a change in the state of the surrounding environment is arbitrary, and can be implemented by secondarily using various other sensors mentioned in this written description.

For example, the application can call an application program interface (API), such as an ioctl (I/O Control) system call of Linux, and can specify the time interval to the image sensor manager 120 configured in the device driver of the image sensor module 70.

Fourth Embodiment

In a fourth embodiment, when the result of the first image processing satisfies the condition for performing the second image processing, the standby state control unit 122 instructs the image sensor control unit 124 to obtain a high-resolution image, which at least includes an image of the area satisfying the condition for performing the second image processing and which has a higher resolution than the image used in the first image processing, and notifies the application about the same. In this example, the standby state control unit 122 corresponds to an "execution control unit".

Figure 9:
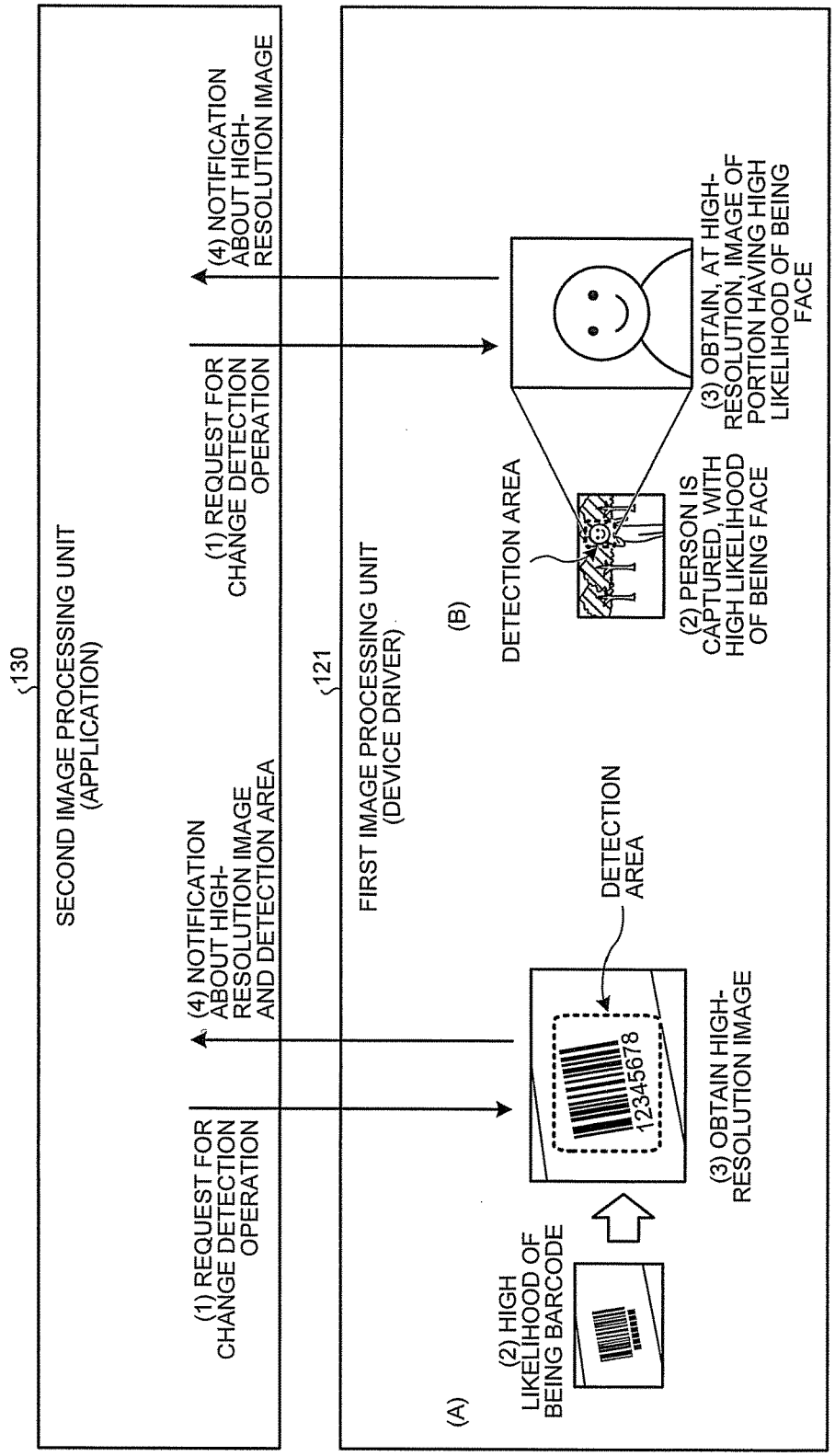
FIG. 9 is a diagram illustrating variations of first image processing according to a fourth embodiment.

For example, in (A) in FIG. 9 is illustrated a case in which the image processing algorithm implemented in the first image processing detects whether or not a barcode is captured. Firstly, the application requests for a change detection operation. In response to the request, the first image processing unit 121 uses a low-resolution image obtained from the CMOS image sensor 73 (obtained by the image sensor control unit 124) and performs an operation (the first image processing) to detect whether or not a barcode is captured in the low-resolution image; and detects that a barcode is captured. When it is detected that a barcode is captured, such an area in the image is obtained in which the barcode is likely to be captured. In this example, it is determined that the barcode is likely to be captured in a detection area enclosed by dotted lines in FIG. 9. Meanwhile, if a plurality of barcodes is detected, there may be a plurality of detection areas. Subsequently, the standby state control unit 122 re-obtains the entire high-resolution image and sends to the second image processing unit a notification about the detection of an image change and about the information indicating the high-resolution image (in this case, the entire high-resolution image) and the detection area. That is, in this example, it is possible to think that the standby state control unit 122 sends to the application a notification about the high-resolution image (in this case, the entire high-resolution image), which is obtained by the image sensor control unit 124, and about the information indicating the area in the high-resolution image which satisfies the condition for performing the second image processing. Thus, the application receives the high-resolution image and the information indicating the detection area (position information regarding the target object or the change). In this example, the standby state control unit 122 sends to the application a notification about the high-resolution image and about information indicating the area in the high-resolution image which satisfies the condition for performing the second image processing.

In (B) in FIG. 9 is illustrated a case in which the image processing algorithm implemented in the first image processing detects whether or not a person is captured. Firstly, the application requests for a change detection operation. In response to the request, the first image processing unit 121 uses a low-resolution image obtained from the CMOS image sensor 73 (obtained by the image sensor control unit 124) and performs an operation (the first image processing) to detect whether or not a person is captured in the low-resolution image; and detects that a person is captured. When it is detected that a person is captured, the location (the detection area) in which the face is captured is further detected, and only the detection area is re-obtained in detail in the form of an image having a higher resolution than the image used in the first image processing. At that time, it is also possible to perform resetting operations such as changing the zoom factor and changing the orientation or the angle of the lens that are required in re-obtaining the detection area in detail and at a high resolution. Then, the standby state control unit 122 sends to the second image processing unit 130 a notification about the detection of an image change and the high-resolution image of the detection area. Thus, the application receives the high-resolution image of the detection area, and performs unique and advanced image processing using the high-resolution image of the detection area. Meanwhile, if a plurality of persons is detected, then a plurality of images each capturing a person can be obtained as high-resolution images of detection areas.

In that regard, in the fourth embodiment, the OS includes an interface unit that enables the application to obtain high-resolution images (including entire high-resolution images and high-resolution images of detection areas) and to obtain the count of obtained images such as the high-resolution images of detection areas. For example, the application can call an application program interface (API), such as an ioctl (I/O Control) system call of Linux, and can obtain a high-resolution image (an entire high-resolution image), the position information such as the coordinates of a change detection area in the high-resolution image, and the high-resolution image of the change detection area. Meanwhile, it is needless to say that an API waiting for the notification can be different than an API receiving the resultant image; or the same API can be used for both purposes.

Fifth Embodiment

Regarding detecting the presence or absence of an image change during the standby-state image processing, the change does not necessarily occur in all areas of the entire image that can be obtained from the image sensor 73. In that regard, in the first embodiment, the image sensor control unit 124 obtains, as the image to be used in the first image processing, an image of some area of the entire image that can be obtained from the image sensor 73. More particularly, instead of retrieving all of the data, the image sensor control unit 124 makes use of a partial reading function and an image thinning function of the image sensor 73; and obtains an image having a low resolution (having a low total of resolutions) as the input image to be used in the standby-state image processing. As a result, there is a reduction in the volume of data transferred from the image sensor module 70 to the SoC 10, thereby leading to the shortening of the transfer time. That enables accelerating the start of the first image processing. Moreover, since there is further decrease in the resolution, the execution time of the first image processing also becomes shorter, and the change detection operation can be trimmed. Hence, the idle state can be secured for a still longer period of time. Furthermore, if the resolution can be reduced; then, as described in an embodiment to be hereinafter described, it becomes increasingly likely to be able to use the internal memory 102 that generally has a small memory capacity, thereby enabling achieving low power consumption. Moreover, as described in an embodiment to be hereinafter described, at the time of offloading the standby-state image processing to a microcomputer, the load of the microcomputer can be reduced. Hence, it becomes possible to use the microcomputer running at a lower electrical power thereby enabling achieving low power consumption of the entire system. Moreover, as described in an embodiment to be hereinafter described, at the time of performing the standby-state image processing in the image sensor 73, it is sufficient to have only a small buffer, thereby making the implementation easier.

Figure 10:
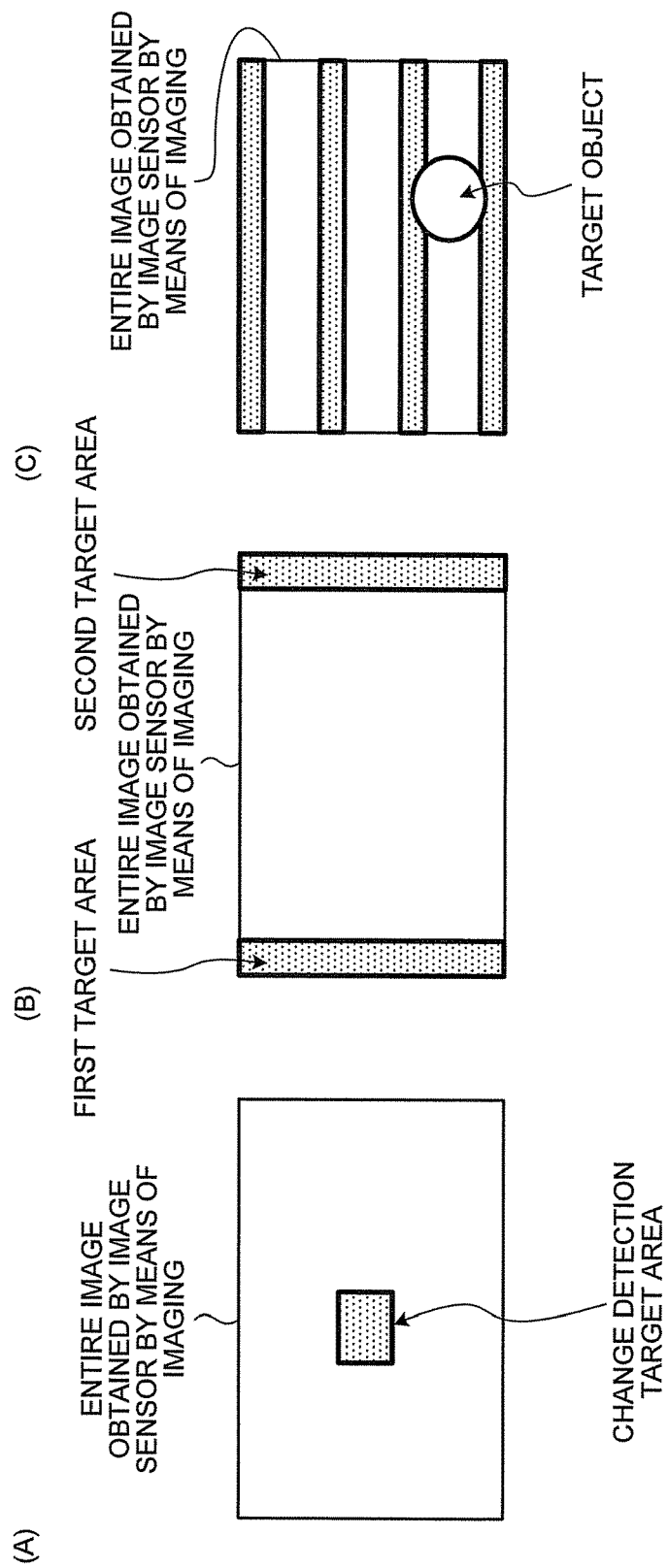
FIG. 10 is a diagram illustrating exemplary change detection target areas according to a fifth embodiment.

In FIG. 10 are illustrated exemplary target areas for the change detection operation (in the following explanation, referred to as "change detection target areas"). In FIG. 10, of an entire image obtainable by the image sensor 73 (an entire image obtained by the image sensor 73 by means of imaging), an area enclosed by heavy lines represents a change detection target area. In (A) in FIG. 10 is illustrated one of the change detection target areas. For example, while using a security camera for face recognition of a person entering a room from a door; it is sufficient to keep a watch only in the vicinity of the door knob during change detection. Hence, of an entire image obtained by means of imaging by the image sensor 73 that is stationary at a predetermined position, it is suitable to treat the area in the vicinity of the door knob as the change detection target area. After the change detection is performed, the entire image can be obtained by the image sensor 73 and face recognition can be performed.

As illustrated in (B) in FIG. 10, of an entire image obtained by the image sensor 73 by means of imaging, when the areas at the left and right ends represent the areas in which a target object is likely to be captured (herein, the area at the left end is referred to as a first target area and the area at the right end is referred to as a second target area); the first target area and the second target area can be treated as the change detection target areas in the entire image obtained by the image sensor 73 by means of imaging. Then, images of the first target area and the second target area can be partially read from the image sensor 73, and the detection of an image change can be performed using those low-resolution images. As illustrated in (C) in FIG. 10, in the case in which the position of appearance of the target object is not known but the size of the target object is known to some extent, only the areas that are thinned at shorter intervals than the width of the target object can be treated as the change detection target areas and can be read from the image sensor 73. Consequently, the change detection operation can be trimmed while preventing non-detection of the target object (i.e., while guaranteeing the detection of the target object). Meanwhile, the examples explained above are only exemplary in nature.

Meanwhile, a change detection target area can be set from the application. In the fifth embodiment, the OS includes an interface unit that enables the application to specify a change detection target area. For example, the application can call an application program interface (API), such as an ioctl (I/O Control) system call of Linux, and can specify a change detection target area to the image sensor manager 120 configured in the device driver of the CMOS image sensor module 70.

While setting a change detection target area, the image sensor control unit 124 of the image sensor manager 120 writes, in the register of the CMOS image sensor 73, information indicating the leading end position and the tail end position in the horizontal direction as well as indicating the leading end position and the tail end position in the vertical direction. Since a change detection target area can be specified at arbitrary timings, it can be changed in a dynamic manner according to the convenience of the application or the situation of changes.

Figure 11:
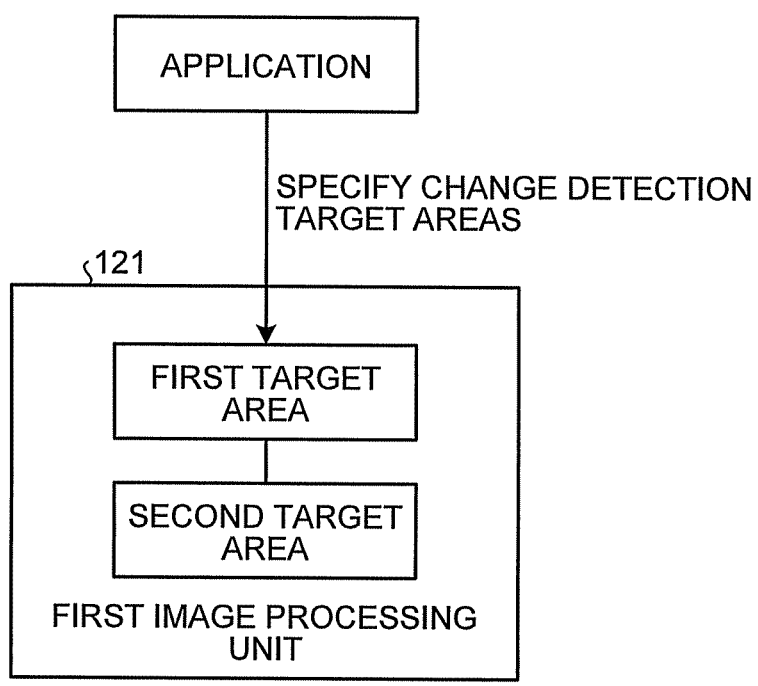
FIG. 11 is a diagram illustrating a case of specifying change detection target areas according to the fifth embodiment.

FIG. 11 is a diagram illustrating an exemplary case of specifying change detection target areas. The application specifies the change detection target areas using the API mentioned above. Herein, the example illustrated in (B) in FIG. 10 is taken into consideration. That is, of the entire image that can be obtained from the image sensor 73, the first target area and the second target area that are the two areas at the left and right ends are specified. The change detection target areas that are specified are recorded in the first image processing unit 121. When the execution of the first image processing is instructed, the first image processing unit 121 instructs the image sensor control unit 124 to obtain the change detection target areas that have been recorded. In response, the image sensor control unit 124 obtains the change detection target areas. Meanwhile, the change detection target areas can be set separately for each image processing algorithm to be implemented in the first image processing.

Sixth Embodiment

In a sixth embodiment, the time interval for performing the first image processing (in the following explanation, sometimes referred to as an "execution interval") changes in a dynamic manner. More particularly, the standby state control unit 122 sets the execution interval in a variable manner according to the result of the first image processing. For example, when a target object such as a person is not captured or when there is no movement (change), the time interval for importing an image to be used in the first image processing can be set to be longer, so that the entire information processing device 1 can be maintained in the low power consumption state for a longer period of time and electrical power saving can be achieved. In this example, when no image change is detected, the standby state control unit 122 can set the execution interval to be longer than the execution interval set in the case when an image change is detected. In this example, the standby state control unit 122 corresponds to an "interval setting control unit".

Figure 12:
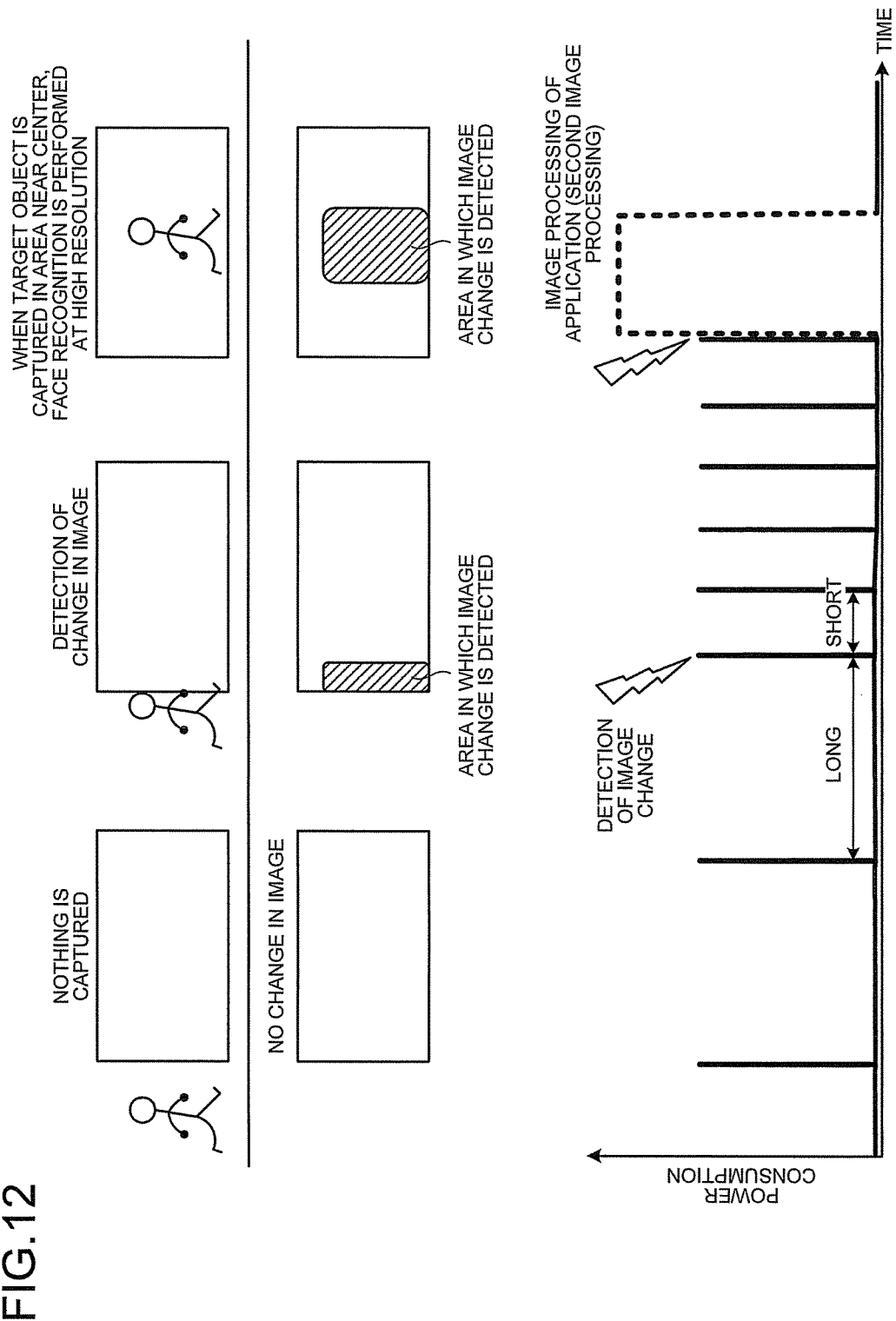
FIG. 12 is a diagram illustrating transition of the power consumption of the image sensor according to a sixth embodiment.
Figure 13:
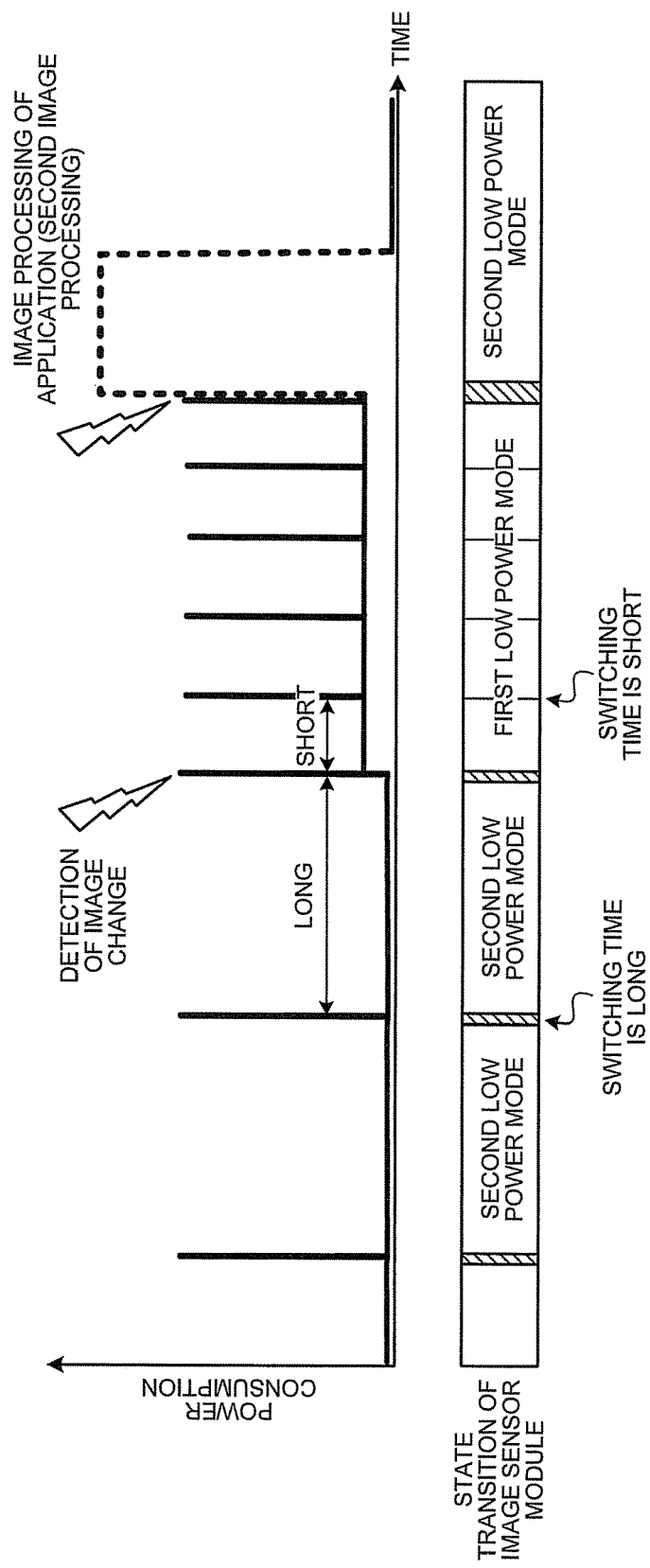
FIG. 13 is a diagram illustrating transition of the power consumption of the image sensor according to a seventh embodiment.

When the execution interval changes in a dynamic manner, the power consumption of the entire information processing device 1 or the CMOS image sensor module 70 can be observed to undergo changes as illustrated in FIG. 12.

That is, it can be observed that the standby state, which includes the first state in which the first image processing can be performed and the second state in which the power consumption is lower than in the first state, has different amounts of power consumption and the intervals of amounts of power consumption corresponding to the execution intervals that change in a dynamic manner. Herein, the standby state represents the state of waiting for the execution of the second image processing by an application, and is differentiated from the state in which the information processing device 1 performs the second image processing.

In the example illustrated in FIG. 12, when a target object such as a person is not captured, or when there is no change, or when it is understood from the information of other sensors used in combination that there would be no immediate change; a long interval is set for importing images. On the other hand, during the first image processing (the standby-state image processing) performed by the first image processing unit 121; for example, when it is detected that a person is captured in the area at the left end of an image obtained from the image sensor 73 (in this example, an entire image), the execution interval is set to be short and the standby-state image processing is performed in a repeated manner. In this example, it is assumed that the condition for performing the second image processing represents the condition in which a person is captured in the area near the center of the entire image obtained by the image sensor 73 by means of imaging. If the area in which the person is captured (i.e., the area of change) is near the center of the image, then the condition for performing the second image processing is satisfied. Hence, a high-resolution image is re-obtained as per the request of the second image processing unit 130, which performs the second image processing such as face recognition and recording of the image in which the person is captured in the center. Moreover, a notification about the detection of a person near the center of the entire image (i.e., a notification about the fact that the condition for performing the second image processing is satisfied) is sent along with the high-resolution image to the second image processing unit 130. In this way, the image processing algorithm implemented in the first image processing can have a plurality of execution intervals set on a condition-by-condition basis. For example, the configuration can be such that, at the time of sending the result of the already-completed standby-state image processing to the standby state control unit 122, the first image processing unit 121 also sends the execution interval in accordance with the result. When an image in which the target object is captured in a particular area (for example, the area near the center) is obtained, in the case of either locally recording the image in the information processing device 1 or transferring the image to an external device via the network device 60, implementing the configuration according to the sixth embodiment enables lowering the power consumption as well as achieving electrical power saving by automatically thinning the storage capacity and the communication volume in an IoT/M2M system or a glasses-type wearable terminal. Besides, it also becomes possible to achieve efficiency by reducing unnecessary data.

In essence, in the information processing device 1 according to the sixth embodiment, when there is no change in a first image, the input of the next first image is awaited for a fifth time period. When a change is found in a first image, the input of the next first image is awaited for a sixth time period. Herein, the sixth time period can be set to be shorter than the fifth time period.

Seventh Embodiment

In a seventh embodiment, when the SoC 10 proactively switches to the DEEP SLEEP mode, a plurality of low power modes of the CMOS image sensor module 70 is used in a more dynamic manner so as to achieve further optimization. For example, a plurality of low power modes of the image sensor module 70 can be used according to the execution interval explained in the sixth embodiment. For example, consider a case in which there are two low power modes as follows: a first low power mode in which a switching time (herein, the period of time required to switch between a third state (the energy saving state), in which the image sensor 73 cannot obtain an image (cannot perform imaging), and a fourth state (the normal state), in which the image sensor 73 can obtain an image, is short; and a second low power mode in which, because of stabilizing the stopped oscillator 71 or initializing the register, the transition/return time period is long (the switching time is long) and the power consumption required for the switching is large, but in which the standby electricity is still lower. When the execution interval is long, it is relatively important to have low standby electricity. Hence, the second low power mode is used. However, when the execution interval is short, the power consumption for the switching becomes relatively important. Hence, the first low power mode is used.

That is, it is possible to think that the time taken for the first image processing changes according to the execution interval. In this example, the standby state control unit 122 sets the switching time for the image sensor 73 in a variable manner according to the execution interval. More particularly, when the execution interval is equal to or greater than a threshold value, the standby state control unit 122 can perform control so that, during the idle period (the second state), the state of the image sensor 73 is set to the second low power mode. However, when the execution interval falls below the threshold value, the standby state control unit 122 can perform control so that, during the idle period (the second state), the state of the image sensor 73 is set to the first low power mode, which has a shorter switching time than in the second low power mode. That is, when the execution interval is equal to or greater than the threshold value, the standby state control unit 122 sets the switching time for the image sensor 73 to be longer than the switching time set in the case when the execution interval is smaller than the threshold value. In this example, the standby state control unit corresponds to a "switching time setting unit".

Eighth Embodiment

As explained in the first embodiment, in the DEEP SLEEP mode, the supply of electrical power to the cache memory 114 is stopped. For that reason, at the time of switching to the DEEP SLEEP mode, it becomes necessary to perform a cleaning operation in which the dirty data in the cache line is written in the main memory 50. On the other hand, at the time of returning from the DEEP SLEEP mode, it becomes necessary to perform an invalidation operation. Thus, it requires time and electrical power to perform such operations with respect to the cache. In that regard, at the time switching to the DEEP SLEEP mode, it is possible to use a second DEEP SLEEP mode in which the cache operations are omitted without stopping the supply of electrical power to the cache memory 114 and in which the standby electricity is comparatively high but the transition time is short. In contrast, the type of DEEP SLEEP mode in which the supply of electrical power to the cache memory 114 is stopped and in which the transition time is comparatively long but the standby electricity is lower is referred to as a first DEEP SLEEP mode.

Figure 14:
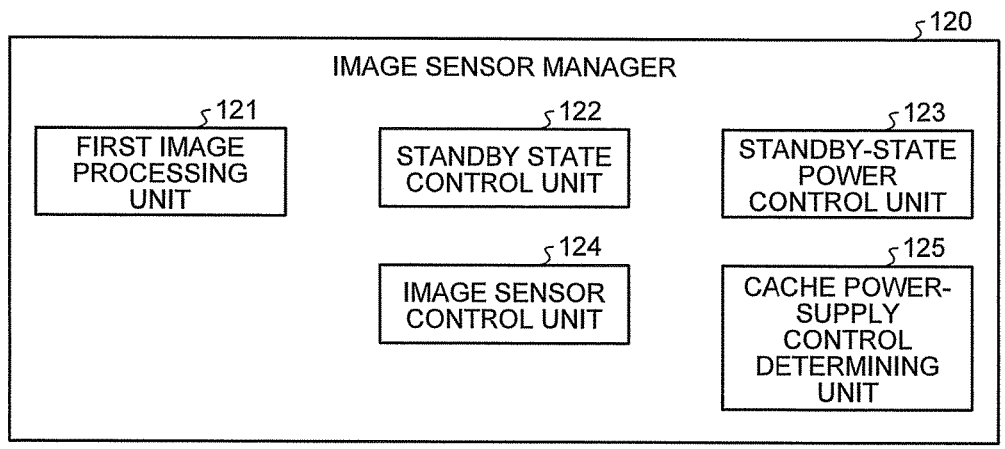
FIG. 14 is a diagram illustrating a configuration of the image sensor manager according to the seventh embodiment.

According to the eighth embodiment, as illustrated in FIG. 14, the image sensor manager 120 further includes a cache power-supply control determining unit 125 that, when the entire information processing device 1 switches to the low power consumption state (the second state), determines whether or not to continue the supply of electrical power to the cache memory 114 which is used in the first image processing. In this example, at the time of switching to the DEEP SLEEP mode, the cache power-supply control determining unit 120 switches between the first DEEP SLEEP mode and the second DEEP SLEEP mode in a dynamic manner.

Figure 15:
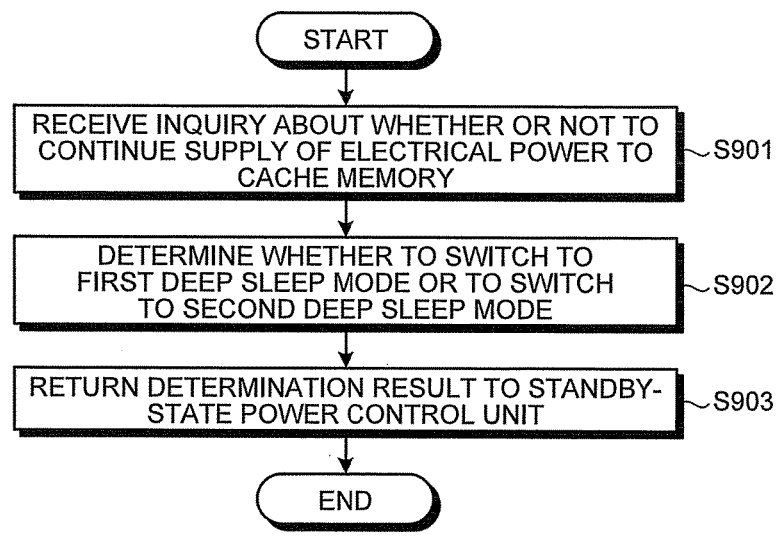
FIG. 15 is a flowchart for explaining operations performed by the image sensor manager according to the seventh embodiment.

FIG. 15 is a flowchart for explaining an example of the operation that is additionally performed at Step S503 illustrated in FIG. 8 by the cache power-supply control determining unit 125. The operation is started when the standby-state power control unit 123 attempts to switch the SoC 10 the DEEP SLEEP mode. Firstly, the standby-state power control unit 123 receives an inquiry about whether or not to continue the supply of electrical power to the cache memory 114 (Step S901). Then, the cache power-supply control determining unit 125 determines whether or not to continue the supply of electrical power to the cache memory 114. That is, the cache power-supply control determining unit 125 determines whether to switch the cache memory 114 to the first DEEP SLEEP mode or to the second DEEP SLEEP mode (Step S902). Then, the cache power-supply control determining unit 125 returns the determination result obtained at Step S902 to the standby-state power control unit 123 (Step S903).

Upon receiving the determination result from the cache power-supply control determining unit 125, the standby-state power control unit 123 appends that information and instructs the power manager 140 to switch the SoC 10 to the DEEP SLEEP mode. With that, the SoC 10 can be switched to the suitable DEEP SLEEP mode. This operation can be performed at various timings, such as every time of switching to the DEEP SLEEP mode or only when there is a change in the state of the information processing device 1 or a change in the surrounding environment.

Meanwhile, depending on the application or the usage scenario, there can be various determination conditions at Step S902. For example, the determination can be performed by comparing the time interval (the execution interval mentioned above) for performing the standby-state image processing with a threshold value recorded in advance in the cache power-supply control determining unit 125. When the execution interval is long, the power consumption in the low power consumption state during the idle period becomes relatively important. However, when the execution interval is short, there is an increase in the number of times of switching from the low power consumption state (the second state) to the state in which the first image processing can be performed (the first state). Hence, the power consumption required for the switching becomes relatively important. For that reason, when the execution interval is longer than the threshold value, the cache power-supply control determining unit 125 determines to stop the supply of electrical power to the cache memory 114. On the other hand, when the execution interval is equal to or shorter than the threshold value, the cache power-supply control determining unit 125 determines to continue the supply of electrical power to the cache memory 114.

Generally, since the operations that need to be performed come up asynchronously (irregularly), it is difficult to accurately predict the period of time for which the idle state would go on. However, in the eighth embodiment, the premise is that the change detection operation is performed on a regular basis, and the timing of the next return of the system from the idle state is of course known (is set; it is sufficient to check the time interval for performing the standby-state image processing). Hence, it becomes possible to set a suitable power consumption mode. That is not limited only to the cache, but is also applicable to the low power mode of the image sensor 73 or the SoC 10. The same is the case in the other embodiments too.

Meanwhile, the threshold value mentioned above represents, for example, the time at which the total electrical energy required to switch from the low power consumption state to the state of being able to perform the first image processing becomes equal to the electrical energy that can be reduced by switching to the low power consumption state. For that reason, before using the information processing device 1, the electrical energy required to switch from the low power consumption state to the state of being able to perform the first image processing is measured, and the electrical energy that can be reduced by switching to the low power consumption state is measured. Then, the threshold value can be obtained using the measurement results, and can be recorded in the cache power-supply control determining unit 125.

Figure 16:
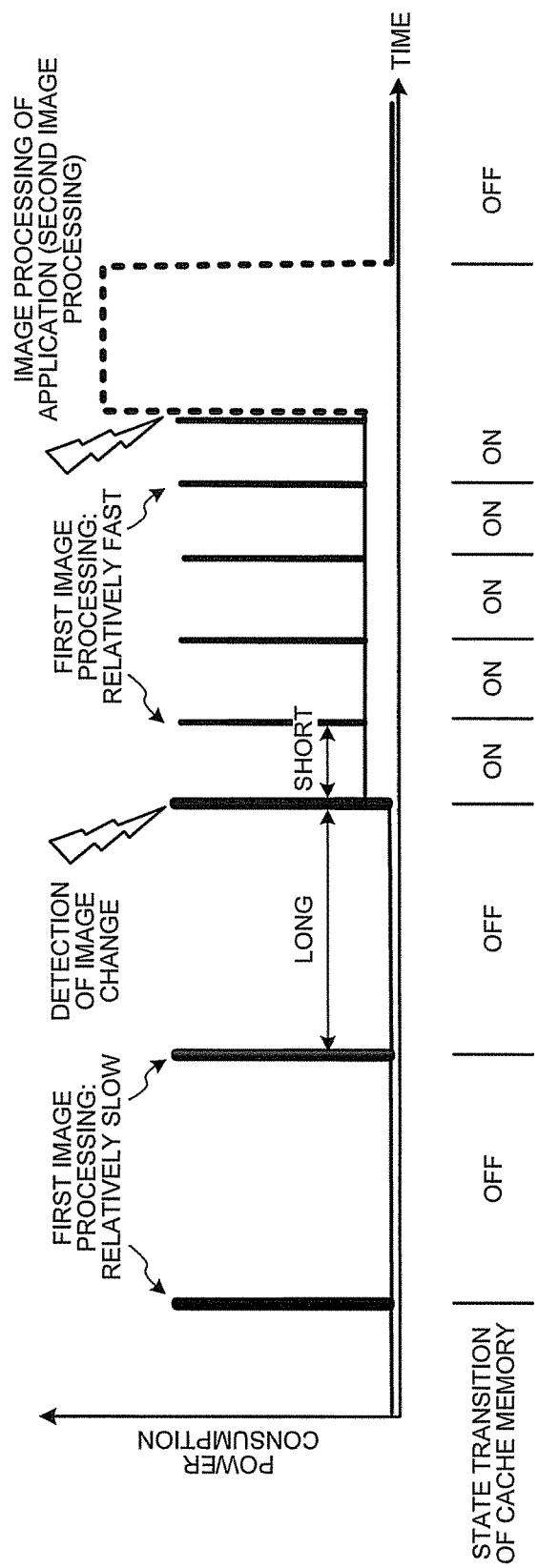
FIG. 16 is a diagram illustrating transition of the power consumption of the information processing device according to an eighth embodiment.

During the use of the information processing device 1 according to the eighth embodiment, the transition of the power consumption of the entire information processing device 1 is observed as illustrated in FIG. 16. That is, it can be observed that the standby state, which includes the first state in which the first image processing can be performed and the second state in which the power consumption is lower than in the first state, has different amounts of power consumption and the intervals of the amounts of power consumption correspond to the execution intervals. When those intervals are long, the power consumption of the information processing device in the standby state (or the electrical power supplied to the cache) is lower as compared to the power consumption when the intervals are short.

In essence, in the information processing device 1 according to the eighth embodiment, in an identical manner to the sixth embodiment, when there is no change in a first image, the input of the next first image is awaited for the fifth time period. When a change is found in a first image, the input of the next first image is awaited for the sixth time period. Herein, the sixth time period can be set to be shorter than the fifth time period. Moreover, when the input of the next first image is awaited for the fifth time period, the electrical power of the information processing device 1 is equal to a fourth electrical power. When the input of the next first image is awaited for the sixth time period, the electrical power of the information processing device 1 is equal to a fifth electrical power. Herein, the fourth electrical power can be set to be lower than the fifth electrical power.

As another method of determination performed by the cache power-supply control determining unit 125, the determination can be done according to the characteristics of the image processing algorithm implemented in the first image processing (the utilization characteristics of the cache memory 114). In the case of an algorithm that obtains the difference with the background image during the first image processing, since the background image is used in a repeated manner, it is better to keep the cache memory 114 in the ON state (i.e., it is better to continue the supply of electrical power to the cache memory 114). In that regard, for example, the application can be configured to have a way (an API) for performing setting for each image processing algorithm.

As still another method of determination, the determination can be done in the image sensor manager 120 using a heuristic method of comparing the size of data used in the image processing algorithm, which is implemented in the first image processing, with the capacity of the cache memory 114. Alternatively, when the size of all of the used data is not known, the determination can be performed using a heuristic method of comparing the resolution of the image used in the first image processing with a threshold value set in advance. For that reason, for example, the application can be configured to have a way (an API) for sending a notification about the information indicating the characteristics of the algorithm, such as the size of data used in the first image processing and the high likelihood of using the same data in a repeated manner, (a notification about the utilization characteristics of the cache memory 114) to the image sensor manager 120.

In essence, in the information processing device 1 according to the eighth embodiment, the configuration can be such that, when there is no change in a first image, according to the characteristics of the first process (in this example, the "first image processing") performed to detect a change in the first image, the period of time of stopping the supply of electrical power to the cache memory 114, which is used in storing some of the data stored in the main memory 50, and the period of time of continuing the supply of electrical power to the cache memory 114 undergo changes.

As still another method, it can be determined whether or not the information processing device 1 is in a meaningful state to hold the cache memory 114. For example, even if the image processing algorithm implemented in the first image processing uses the background image in a repeated manner; if the first image processing using the image processing algorithm is performed by the information processing device 1 configured as a glasses-type wearable device (hereinafter, sometimes simply referred to as "glasses"), then the person wearing the glasses changes the orientation of the head so as to change the line of sight. Hence, while the person is changing the orientation of the head, the background image keeps on changing, thereby making the cache memory 114 ineffective. In the case when the person wearing the glasses is moving the head, even if the image processing algorithm is set to be in the ON state in a static manner, that need not be followed. Instead, the fact that the head of the person is moving can be detected by detecting a significant change during the first image processing or detecting that the entire image is changing in an almost uniform manner, or by performing the detection using other sensors such as a 9-axis sensor installed in the information processing device 1. Then, the setting can be switched to dynamically setting the cache memory to the OFF state (i.e., to stop the supply of electrical power to the cache memory 114). That is, in an identical manner to the case explained earlier, it can be observed that, while the head of the person is moving or during the standby state attained immediately after the movement of the head of the person, the electrical power supplied to the cache memory 114 or the power consumption of the information processing device 1 is lower as compared to the standby state when the head is stationary.

In essence, in the information processing device 1 according to the eighth embodiment, the configuration can be such that, when there is a change in the background image that is repeatedly used in the first process for determining a change in the first images; the supply of electrical power to the cache memory 114, which is used in storing some of the data stored in a main memory device (the main memory 50), is stopped.

Meanwhile, the determination conditions can be a combination of the aspects explained above. Moreover, it is needless to say that the determination conditions are only exemplary, and not limited to the examples given above.

Ninth Embodiment

In a ninth embodiment, as described above, in the case in which the user is wearing a glasses-type wearable device (glasses), if the head of the person wearing the glasses is moving and if the fact that the image sensor 73 itself is moving (for example, operating at a speed/acceleration equal to or more than a certain level, or undergoing changes in the orientation or the tilt, or vibrating) is detected using another sensor other than the image sensor 73; then the change detection operation may not be performed and can be resumed only when it is confirmed that the head of the person wearing the glasses is stationary and the image sensor has stopped moving. That is done because, if the image sensor 73 is moving, then the change detection operation results in the continuous input of meaningless images. Hence, during that period, the image sensor 73 is stopped and low power consumption is achieved. In essence, the configuration can be such that, according to the changes in the movement of the image sensor 73, the period of time for waiting for the input of the next first image also changes. Alternatively, in the case of a capsule endoscope, when it is determined that the endoscope is not moving (forward), the change detection operation can be stopped because otherwise the same image is obtained again and again. Once the endoscope starts moving again, the change detection operation can be resumed.

10-th Embodiment

In a 10-th embodiment, all of the operations illustrated in FIG. 8 are performed using the internal memory 102 of the SoC 10. Although the internal memory 102 is generally small in size, it is immediately accessible after the return from the DEEP SLEEP mode and also has low access latency in consequence of being an on-chip memory. As a result, it becomes possible to speed up the first image processing, and to maximize the period of time for which the SoC 10 can be kept in the DEEP SLEEP mode and for which the information processing device 1 can be held in the low power consumption state. That enables achieving substantial reduction in the power consumption of the information processing device 1. Herein, switching to the DEEP SLEEP mode is also performed using the internal memory 102, and the first image processing is also performed using the internal memory 102. Besides, if it becomes possible to store all of the data and the code in the internal memory 102, and if the main memory 50 is of the nonvolatile type; then the supply of electrical power to the main memory 50 can be stopped during the first image processing too. However, if the main memory 50 is of the volatile type (for example, a DRAM such as PDDR2), it is switched to the self-refresh mode so that the power consumption can be further held down.

In essence, in the information processing device 1 according to the 10-th embodiment, the configuration can be such that a first image input from the image sensor 73 is stored in the internal memory 102 of the processing device that processes images (in this example, the "SoC 10"). Then, during the first process (in this example, the "first image processing") for determining a change in the first image that is stored in the internal memory 102, the electrical power supplied to the main memory 50, which is installed on the outside of the processing device, is equal to a sixth electrical power. Moreover, when a change is detected in the first image, the electrical power supplied to the main memory 50 is equal to a seventh electrical power that is sufficient to access the main memory 50. Herein, the sixth electrical power is lower than the seventh electrical power.

The supply of electricity to the internal memory 102 is continued during the DEEP SLEEP mode too. Hence, even if some of, if not all of, the data and the code is stored in the internal memory 102, it becomes possible to hold down the accesses to the on-chip main memory 50 (i.e., to hold down reading of the data from the main memory 50 and writing of the data in the main memory 50). That has a profound effect particularly in the case of using a nonvolatile memory having a relatively high access penalty. Thus, in the internal memory 102, it is desirable to store the data such as the images that are repeatedly read and written during the first image processing. Examples of the repeatedly-used data include the background image used in calculating the difference with an image, images of the target object used during movement detection, and statistical information explained in an embodiment given later. Such data is stored in the internal memory 102, and the SoC 10 is switched to the DEEP SLEEP mode. After the return from the DEEP SLEEP mode, the images obtained from the CMOS image sensor 73 are again stored in the internal memory 102. Then, for example, using the background image stored in the internal memory 102 and the current image read from the CMOS image sensor 73 into the internal memory 102, the first image processing can be performed to detect an image change. In order to hold down the accesses to the main memory 50, the code of the first image processing is also stored in the internal memory 102 and is executed therefrom. Thus, in order to ensure that the code of the first image processing and the images and data required in the first image processing can be stored as much as possible in the relatively-small internal memory 102, it is important to perform adjustments such as reducing the resolution of the image used in the first image processing.

Usually, the available memory for the application is the main memory 50; while the small-sized internal memory 102 is managed/used by the kernel for performing operations of the entire system. Hence, the internal memory 102 cannot be used from the application. In the 10-th embodiment, if the lightweight image processing (the first image processing) for determining whether or not to allow the advanced image processing of the application is separated from the application and incorporated in the kernel, then it becomes possible to link the first image processing with the power saving control performed using the internal memory 102. The application too benefits from such a configuration.

That is, in the 10-th embodiment, the access frequency with respect to the main memory 50 in the case of performing the first image processing is lower as compared to the access frequency in the case of performing the second image processing. Moreover, if all of the data and the code required in the first image processing can be stored in the internal memory 102; then, during the first image processing, the main memory 50 is not accessed at all. In essence, in the 10-th embodiment, the internal memory 102 is used to store at least some of the data used in the first image processing, and the first image processing unit 121 performs the first image processing using the data stored in the internal memory 102. From the perspective of the observable power consumption, it can be observed that the power consumption representing accesses to the main memory 50 during the first image processing are sometimes not observed. Meanwhile, it has been explained already that the first image processing can be observed from the power consumption.

11-th Embodiment

Figure 17:
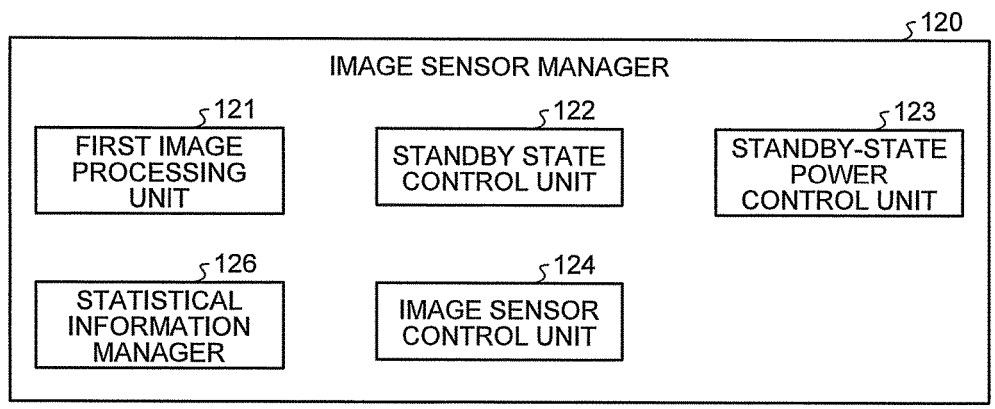
FIG. 17 is a diagram illustrating a configuration of the image sensor manager according to an 11-th embodiment.

In an 11-th embodiment, an image obtained by the image sensor control unit 124 and used in the first image processing undergoes changes with time. In the 11-th embodiment, as illustrated in FIG. 17, the image sensor manager 120 includes a statistical information manager 126. In this example, based on the result of the first image processing performed repeatedly during a learning period, the statistical information manager 126 generates statistical information in which, for each of a plurality of subareas constituting an entire image obtainable from the image sensor 73, the number of times of detection of a change is held in a corresponding manner. Then, the first image processing unit 121 instructs the image sensor control unit 124 to obtain, from the entire image, images of the subareas for which the number of times of detection of a change is equal to or greater than a threshold value, and performs the first image processing using the obtained images.

Thus, in the 11-th embodiment, the information processing device 1 is additionally equipped with a learning function in which a variety of statistical information is used. As a result, the setting of a change detection target area as explained in the fifth embodiment is done automatically, and the area from which a change is to be detected is learnt using a variety of statistical information. With that, the first image processing can be further trimmed and low power consumption can be achieved.

The statistical information can be of various types. Examples of the statistical information include information indicating the feature quantity of each of a plurality of subareas constituting the screen of a stationary camera, and that information is stored while repeatedly performing the standby-state image processing (the first image processing). For example, a change detection area at the time of first-time detection of an image change is recorded (see FIG. 18). In (A) in FIG. 18, in the initial setting performed by the application, two areas are specified as the change detection target areas (herein, the two areas are called "first change detection target areas"). During the learning period set by the application, recording on a subarea-by-subarea basis is done regarding the number of times for which, from the state in which there was no change in the image over a given period of time, a change occurs in the image because a target object is captured. As illustrated in (C) in FIG. 18, by referring to statistical information in which the number of times of detection of a change is held in a corresponding manner for each of eight subareas, it can be understood that, at the end of the learning period, changes that can trigger switching to the state of performing the advanced image processing of the application (the second image processing) have occurred in only a subarea 200 enclosed by heavy lines. Consequently, as illustrated in (B) in FIG. 18, the subarea 200 can be automatically reset as a second change detection target area representing the new change detection target area. Because of that, it becomes possible to reduce the transfer time of an image from the image sensor 73; to reduce the resolution of the image used in the image processing algorithm that is implemented in the first process; and to store the entire image, which is used in the first image processing and which has a lowered resolution, in the internal memory 102. That enables achieving enhanced coordination among various power saving functions available due to the framework, which leads to achieving lower power consumption. Moreover, if a variety of statistical information is stored as the data required in the first image processing in the internal memory 102 as explained in the 10-th embodiment, it becomes possible to eliminate or reduce the accesses to the main memory 50 with regard to the statistical information. Therefore, it becomes possible to achieve still lower power consumption.

Figure 18:
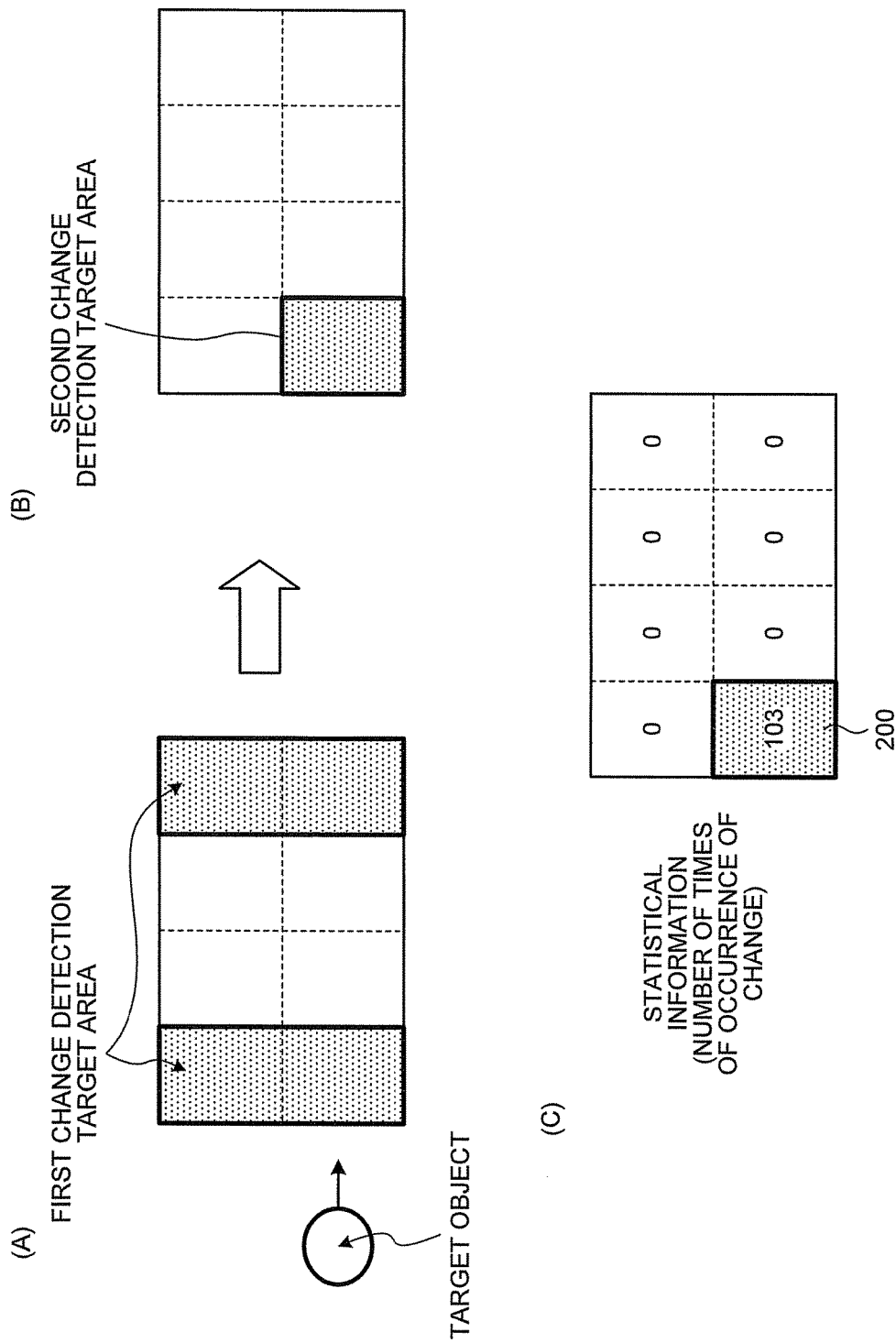
FIG. 18 is a diagram for explaining statistical information according to the 11-th embodiment.

As a result of using the learning function in which the statistical information is used, as illustrated in FIG. 18, when the learning period (a certain period of time) elapses, the first change detection target areas change into the second change detection target area. Along with the change in the change detection target areas, the observable power consumption also undergoes a change. Hence, if this configuration is used in various surrounding environments, it can be observed that the power consumption of the standby-state image processing is different.

Herein, the learning period can be specified by the application. In the 11-th embodiment, the OS includes an interface unit that enables the application to specify the learning period. For example, the application can call an application program interface (API), such as an ioctl (I/O Control) system call of Linux, and can specify a period for learning of the change detection target areas (the learning period) to the image sensor manager configured in the device driver of the image sensor module.

Meanwhile, the statistical information according to the 11-th embodiment is not limited to be used by the first image processing unit, but can also be used by the second image processing unit 130 (by the application). That provides the application a way for obtaining, at an arbitrary timing (of course, it can be the timing at which a change is detected), the statistical information stored till that point of time from the OS.

In the 11-th embodiment, the OS includes an interface unit that enables the application to obtain the statistical information. For example, the application can call an application program interface (API), such as an ioctl (I/O Control) system call of Linux, and can obtain the statistical information from the image sensor manager 120 configured in the device driver of the image sensor module.

Meanwhile, in the first embodiment described above, during the first image processing (the standby-state image processing), the detection of an image change serves as the trigger for sending, to the application, a high-resolution image required by the application. Then, the application performs unique image processing (the second image processing) using that high-resolution image. However, that is not the only possible case. Alternatively, for example, the configuration can be such that, without obtaining a high-resolution image, image processing is performed for the purpose of efficiently collecting the statistical information according to the 11-th embodiment at low electrical power. In that regard, it is possible to have an API that enables setting the option of not obtaining a high-resolution image.

12-th Embodiment

The first image processing (the standby-state image processing) can be performed by suitably using the SIMD engine 115 and the accelerator 103, which is a GPU embedded in the SoC 10 and which has excellent power efficiency. With that, it becomes possible to achieve still lower power consumption.

Figure 19:
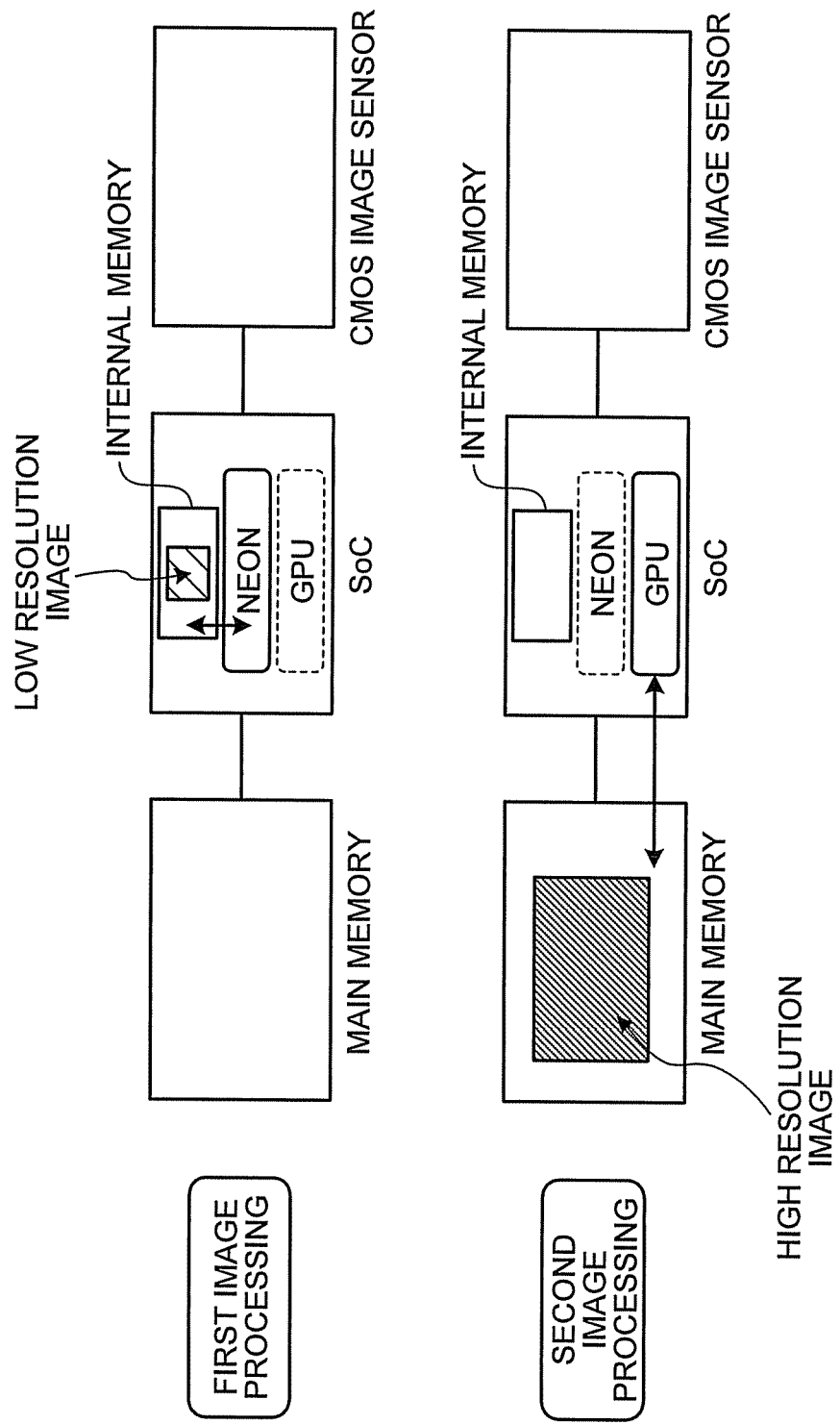
FIG. 19 is a diagram for explaining an example of operations according to a 12-th embodiment.

In FIG. 19 is illustrated an example of operations performed by suitably using the SIMD engine 115 and the GPU. The first image is performed using NEON, which is effective even with respect to small-sized data as compared to a GPU, and using only the internal memory 102 of the SoC 10. Therefore, after the return from the DEEP SLEEP mode, the first image processing can be started instantaneously. Moreover, when the main memory 50 is configured with a nonvolatile memory, the supply of electrical power can be left discontinued during the first image processing too. As is the conventional case, if the advanced image processing (the second image processing) is performed in the application using a high-resolution image and using a GPU that requires the data to be stored in the main memory 50, then the main memory 50 is accessed on an ongoing basis. In contrast, because of the framework according to the invention in which the change detection operation (the first image processing) is separated to be performed in the kernel, NEON can be used while keeping the data (the data required in the first image processing) in the internal memory 102 (usually, in the case of using NEON from the application, the data stored only in the main memory 50 can be used). Hence, it becomes possible to achieve electrical power saving in the GPU as well as the main memory 50, thereby enabling achieving further reduction in the power consumption.

In essence, the configuration can be such that the first process (in this example, the "first image processing") for determining a change in a first image is performed in a first accelerator (in this example, "NEON"), and the second process (in this example, the "second image processing") using a second image is performed in a second accelerator (in this example, the "GPU").

13-th Embodiment

In a 13-th embodiment, when the SoC 10 has a multicore configuration including a plurality of processor cores 101, it becomes possible to achieve lower power consumption by making efficient use of the multicore configuration.

More particularly, in the first image processing, there are times when the throughput is small so that the parallelism among a plurality of cores is not sufficiently utilized. Not only that, it is also necessary to frequently switch the SoC 10 to the DEEP SLEEP mode or to make the SoC 10 return from the DEEP SLEEP mode. Hence, if a single core or only a small number of cores is used, then the switching operation such as the operation with respect to the cache memory 114 can be simplified. In contrast, in the second image processing, it is often the case that the throughput is large and the parallelism among cores can also be sufficiently utilized. Thus, the time taken for the transition operation is relatively short. Therefore, if the first image processing is performed using a single core or only a small number of cores, and if the second image processing is performed using a plurality of cores greater in number than the cores used in the first process; then it becomes possible to achieve a high degree of efficiency. Meanwhile, in case a greater number of cores leads to a longer period of time taken for the transition operation, there is a trade-off between the transition period (the time taken to switch to the DEEP SLEEP mode and the time taken to return from the DEEP SLEEP mode) and the parallel processing effect when the number of cores is increased. In that regard, the number of cores is selected in such a way that there is a decrease in the total power consumption at the time of transition and a decrease in the total power consumption at the time of parallel computation during the first image processing and the second image processing; and each type of image processing is performed accordingly. The suitable number of cores can be fixed at the time of downloading the image processing algorithm to be implemented in the first image processing. Alternatively, the suitable number of cores can be experimentally decided by running a computer program that varies the number of cores and the image resolution at the time of downloading, and the suitable number of cores can be set on a platform-by-platform basis. Meanwhile, the method of selecting the suitable number of cores by taking into account the transition period can be implemented in arbitrary operations.

14-th Embodiment

Figure 20:
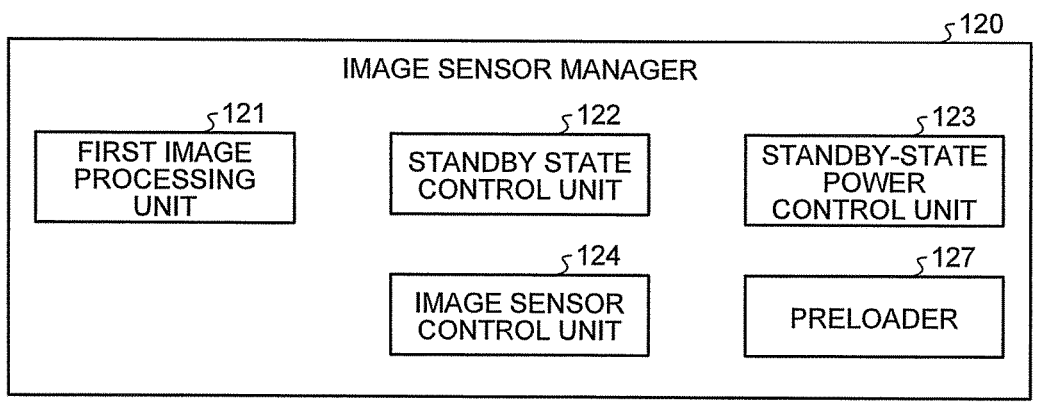
FIG. 20 is a diagram illustrating a configuration of the image sensor manager according to a 14-th embodiment.

In a 14-th embodiment, as illustrated in FIG. 20, the image sensor manager 120 further includes a preloader 127 that, prior to the start of the first image processing, reads the data to be used in the first image processing (hereinafter, referred to as "preloading").

Figure 21:
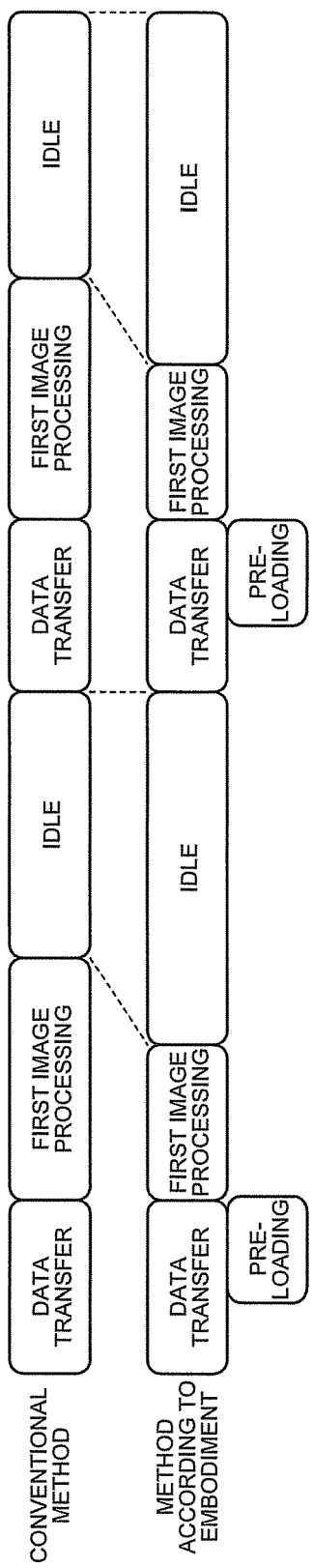
FIG. 21 is a diagram illustrating operations according to the 14-th embodiment.

In the 14-th embodiment, during the transfer of an image to be used in the first image processing (for example, a low-resolution image) from the CMOS image sensor 73, if the data required in the first image processing is preloaded in the cache memory 114; then, after the data transfer (the transfer of an image to be used in the first image processing from the CMOS image sensor 73) is completed, the first image processing can be performed in a swift manner as compared to the conventional method of obtaining the data required in the first image processing. That makes it possible to further increase the idle period as illustrated in FIG. 21. Herein, preloading is performed using a preloading command. As long as the preloading is started in such a way that it is completed by the time of starting the first image processing, preloading can be started before the start of the data transfer. Meanwhile, examples of the data required in the standby-state image processing include image data such as the background image that is used in a repeated manner, and the statistical information explained earlier in the 11-th embodiment. However, those are not the only possible examples. Moreover, for example, in the first DEEP SLEEP mode in which the supply of electrical power to the cache memory 114 is stopped, during the DEEP SLEEP mode as explained in the eighth embodiment, the data to be used in the first image processing can be preloaded from the main memory 50 or the internal memory 102 at a possible timing after the return from the DEEP SLEEP mode. In this case too, preloading can be started before the start of the data transfer.

15-th Embodiment

In a 15-th embodiment, a low-power microcomputer is added in the configuration according to the first embodiment, and the first image processing (the standby-state image processing), which is performed in the SoC 10 according to the first embodiment, is offloaded to the microcomputer (i.e., the microcomputer is made to perform the first image processing). Thus, the information processing device 1 includes a microcomputer including the first image processing unit 121. With that, only when a change is detected (i.e., only when the result of the first image processing satisfies the condition for performing the second image processing), the SoC 10 can be made to return from the DEEP SLEEP mode and to allow the application to perform the second image processing. As a result, the idle period of the SoC 10, which has high power consumption during operations, can be secured for a longer period of time, thereby enabling achieving low power consumption. If the first image processing is performed in a repeated manner without the detection of any image change, the SoC 10 remains in the DEEP SLEEP mode. Hence, it is observed that the power consumption of the SoC 10 remains at a low level.

Figure 22:
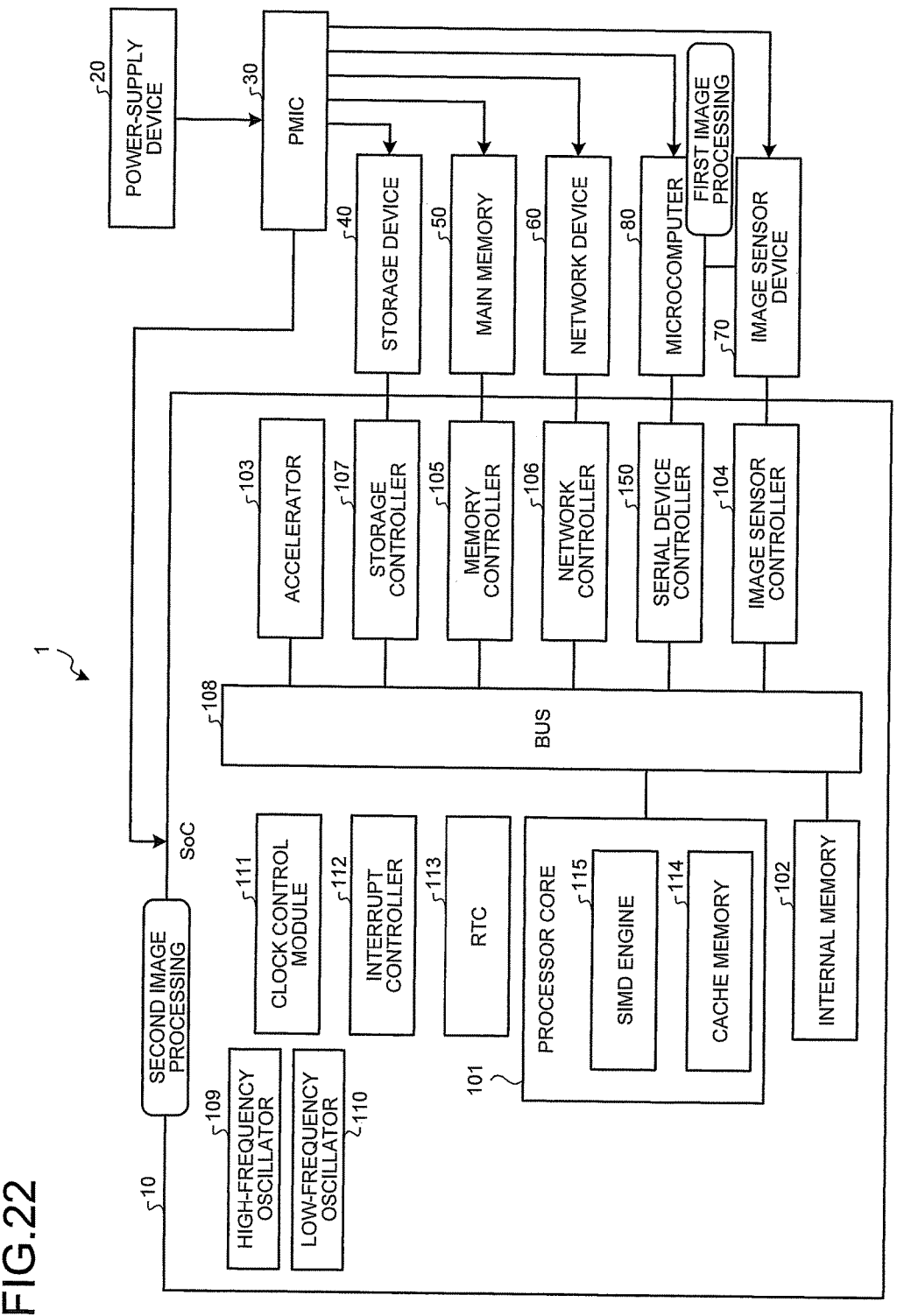
FIG. 22 is a diagram illustrating a configuration of the information processing device according to a 15-th embodiment.

FIG. 22 is a diagram illustrating an exemplary configuration of the information processing device 1 according to the 15-th embodiment. As illustrated in FIG. 22, the configuration differs from the configuration in the first embodiment in the way that a microcomputer 80 functioning as an I/O device is newly installed and the SoC 10 further includes a serial device controller 150 for controlling the microcomputer 80. The serial device controller 150 can be configured with, for example, an I2C interface, an SPI interface, a UART interface, or a GPIO interface (GPIO stands for General-Purpose Input/Output). In the example illustrated in FIG. 22, the microcomputer 80 includes the first image processing unit 121, and performs the first image processing. The SoC 10 includes the second image processing unit 130, and performs the second image processing.

Figure 23:
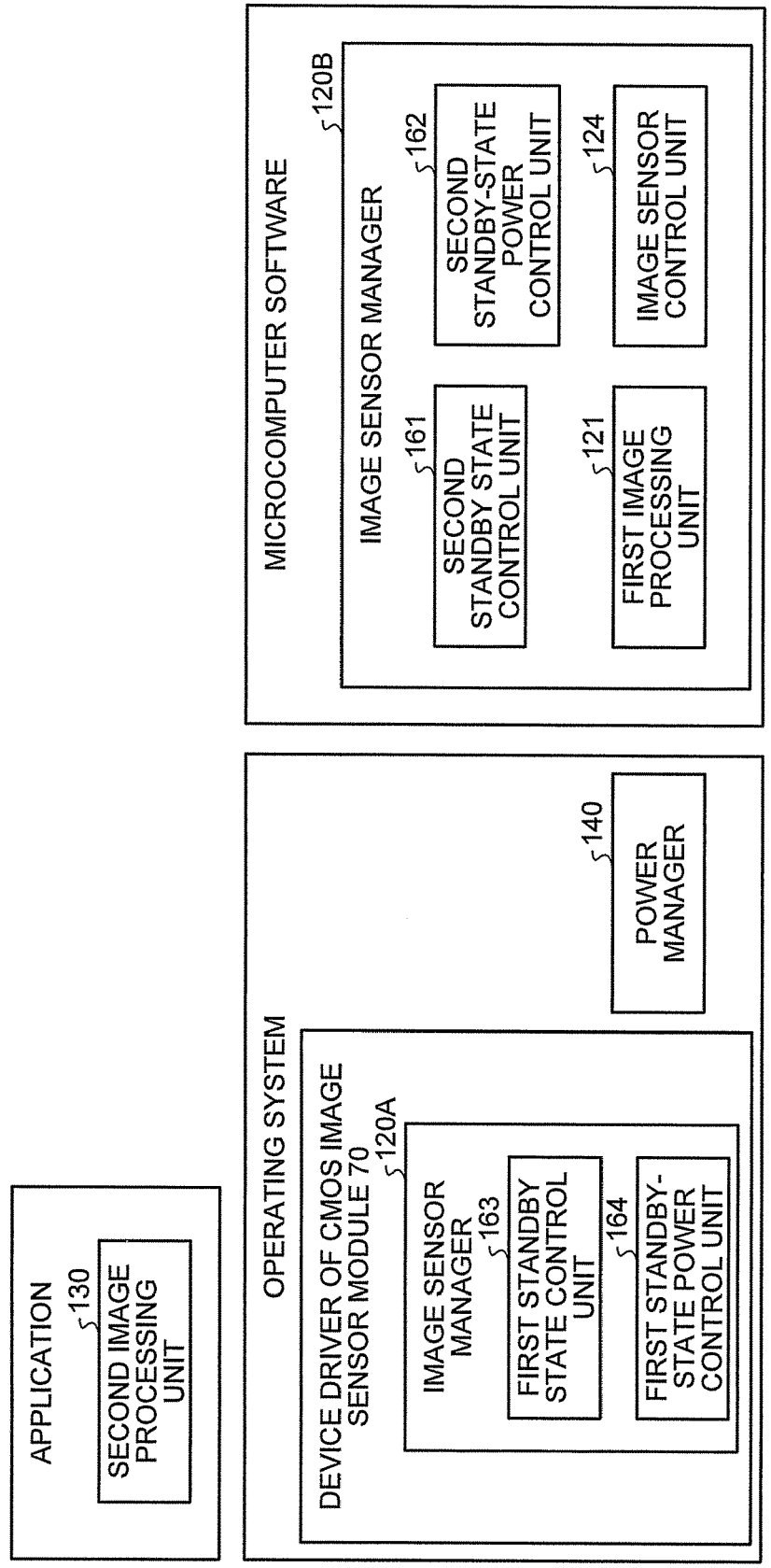
FIG. 23 is a diagram illustrating a configuration of the image sensor manager according to the 15-th embodiment.

FIG. 23 is a diagram illustrating an exemplary functional configuration of the image sensor manager 120 according to the 15-th embodiment. In order to ensure that the first image processing can be performed in the microcomputer 80, the functions of the image sensor manager 120 are separated into functions for the OS and functions for software executed in the microcomputer 80 (hereinafter, sometimes referred to as "microcomputer software"). In the example illustrated in FIG. 23, the image sensor manager 120 used for the OS is referred to as an image sensor manager 120A. Similarly, the image sensor manager 120 used for the microcomputer software is referred to as an image sensor manager 120B. However, in the following explanation, when the image sensor managers 120A and 120B need not be distinguished from each other, they are simply referred to as the image sensor manager 120.

As illustrated in FIG. 23, the image sensor manager 120B for the microcomputer software includes a second standby state control unit 161, the first image processing unit 121, a second standby-state power control unit 162, and the image sensor control unit 124. The second standby state control unit 161 comprehensively controls the operations of the image sensor manager 120. The first image processing unit 121 performs the standby-state image processing (the first image processing). The second standby-state power control unit 162 controls the electrical power supplied to the image sensor 73 and the microcomputer 80. The image sensor control unit 124 controls the image sensor 73.

As illustrated in FIG. 23, the image sensor manager 120A for the OS includes a first standby state control unit 163 and a first standby-state power control unit 164. The first standby state control unit 163 communicates with the applications and with the second standby state control unit 161 of the microcomputer software. The first standby-state power control unit 164 controls the electrical power supplied to the SoC 10. For example, the first standby-state power control unit 164 instructs the power manager 140 to switch the SoC 10 to the DEEP SLEEP mode.

Figure 24:
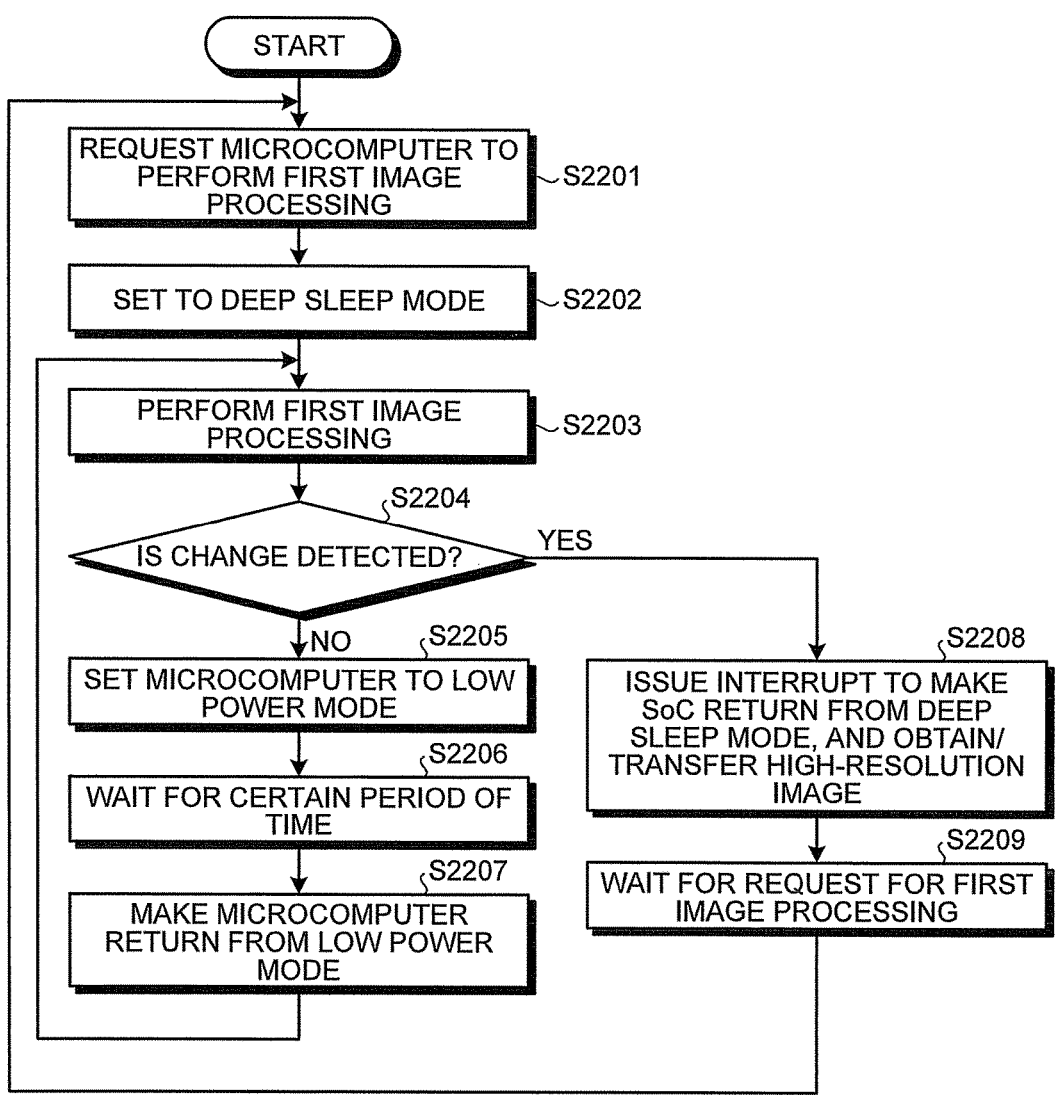
FIG. 24 is a flowchart for explaining operations performed by the image sensor manager according to the 15-th embodiment.

FIG. 24 is a flowchart for explaining an example of the operation performed by the image sensor manager 120. This operation is started when the first standby state control unit 163 receives a request for the change detection operation (a request for the first image processing) from the application.

The first standby state control unit 163 requests the microcomputer 80 to perform the first image processing (Step S2201). Then, the first standby-state power control unit 164 instructs the power manager 140 to set the DEEP SLEEP mode (Step S2202).

Subsequently, the first image processing unit 121 of the microcomputer 80 performs the first image processing (Step S2203). If an image change is detected (Yes at Step S2204), then the system control proceeds to Step S2208. On the other hand, if no image change is detected (No at Step S2204), then the second standby-state power control unit 162 sets the microcomputer 80 to a low power mode (i.e., a power saving state in which the power consumption is lower than the state in which the first image processing can be performed) (Step S2205). Subsequently, the second standby-state power control unit 162 waits for a certain period of time using a timer (Step S2206). After the elapse of the certain period of time, the second standby-state power control unit 162 performs control to make the microcomputer 80 return from the low power mode to the state in which the first image processing can be performed (Step S2207). Then, the system control returns to Step S2203. Thus, the first image processing unit 121 again performs the first image processing.

Meanwhile, when an image change is detected (Yes at Step S2204), the second standby state control unit 161 issues an interrupt and makes the SoC 10 return from the DEEP SLEEP mode, instructs the image sensor control unit 124 to obtain a high-resolution image, and performs control to transfer the high-resolution image to the SoC 10 (Step S2208). Then, the second standby state control unit 161 waits for a request for the change detection operation (the first image processing) from the first standby state control unit 163 (from another viewpoint, a request from the application) (Step S2209). Subsequently, the system control returns to Step S2201. Meanwhile, just before performing the operation at Step S2209, the microcomputer 80 can be set to the low power mode; and can be made to return from the low power mode after a request is received.

16-th Embodiment

Figure 25:
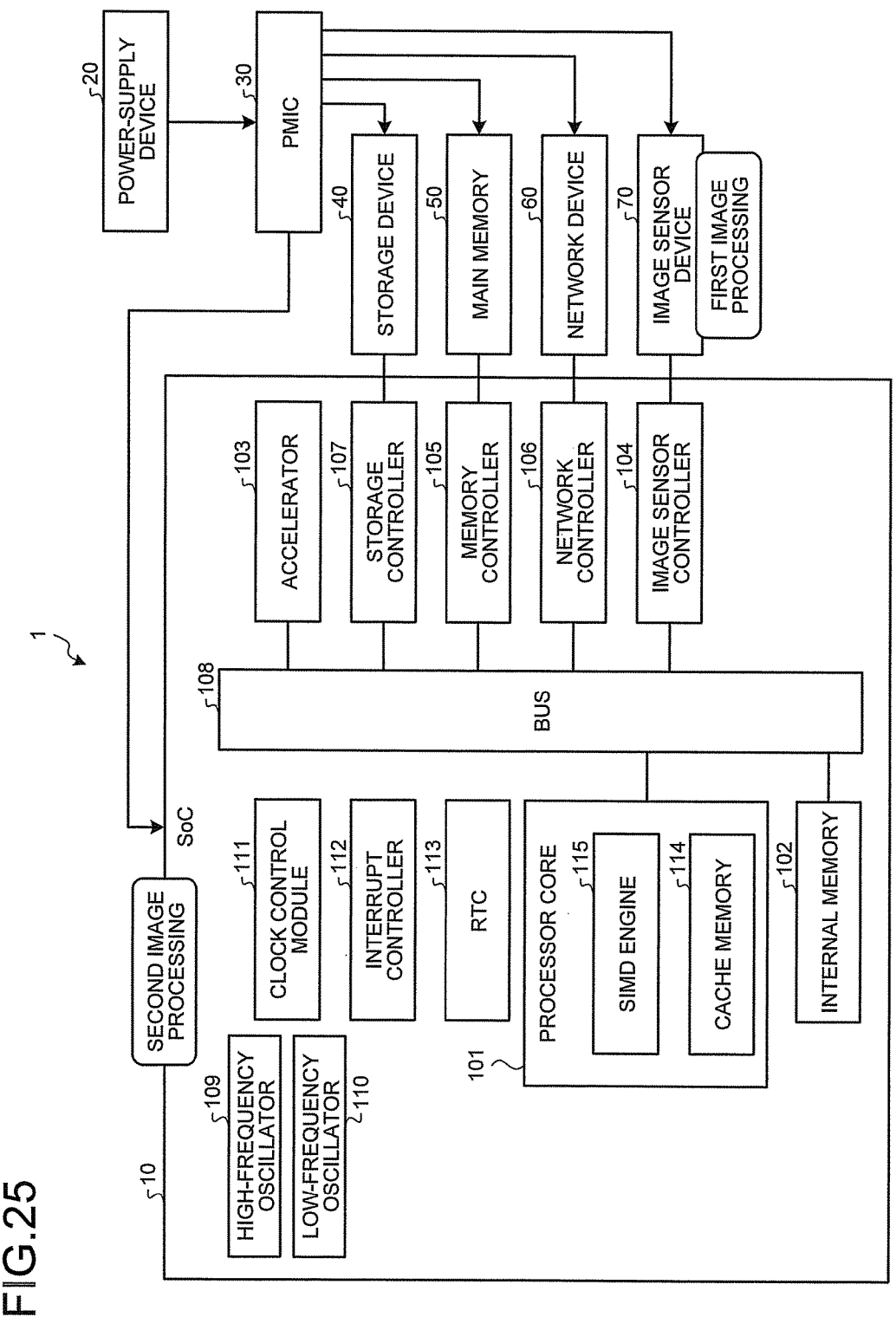
FIG. 25 is a diagram illustrating a configuration of the information processing device according to a 16-th embodiment.

In a 16-th embodiment, the first image processing (the standby-state image processing), which is performed in the SoC 10 according to the first embodiment, is performed in the image sensor device (the CMOS image sensor module) 70 as illustrated in FIG. 25. That is, the image sensor device 70 includes the first image processing unit 121. As a result of performing the first image processing either entirely or partially in the CMOS image sensor module 70, the SoC 10 can be allowed to operate only when an image change is detected. As a result, the idle period of the SoC 10, which has high power consumption during operations, can be secured for a longer period of time, thereby enabling achieving low power consumption.

Figure 26:
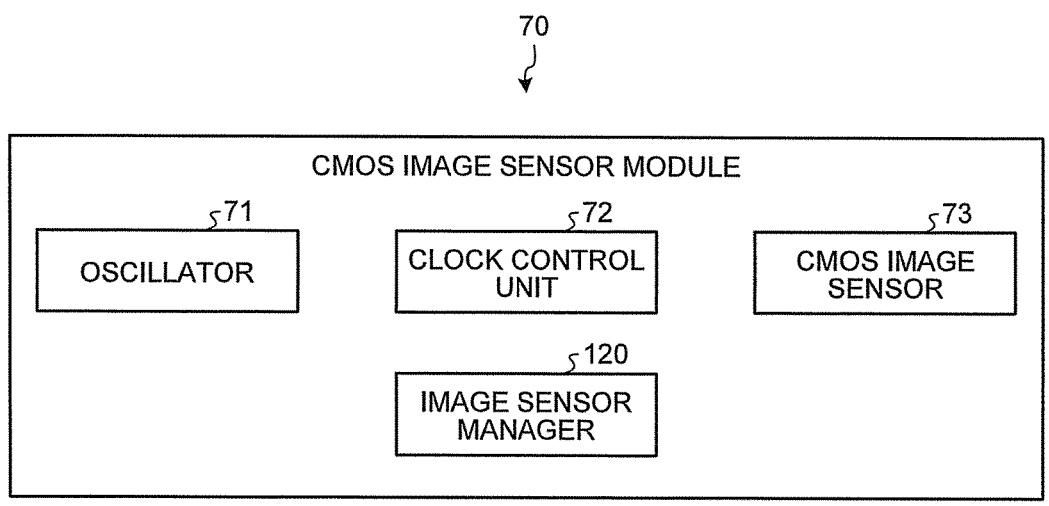
FIG. 26 is a diagram illustrating a configuration of the image sensor module according to the 16-th embodiment.

FIG. 26 is a diagram illustrating an exemplary configuration of the CMOS image sensor module 70 according to the 16-th embodiment. As illustrated in FIG. 26, in the CMOS image sensor module 70, the function of the image sensor manager 120 is integrated with the configuration illustrated in FIG. 2.

Figure 27:
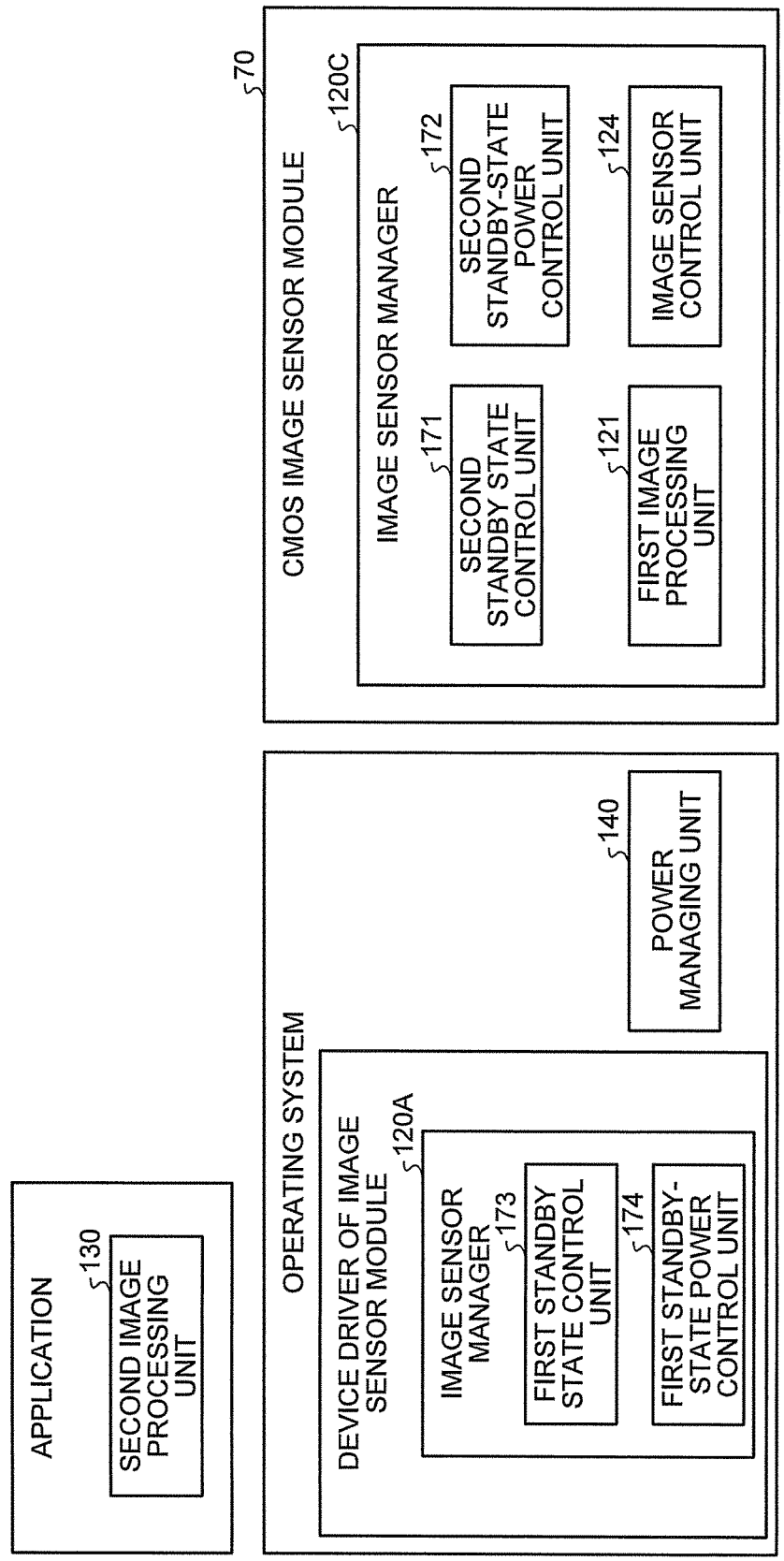
FIG. 27 is a diagram illustrating a configuration of the image sensor manager according to the 16-th embodiment.

FIG. 27 is a diagram illustrating an exemplary functional configuration of the image sensor manager 120 according to the 16-th embodiment. In order to ensure that the first image processing can be performed in the CMOS image sensor module 70, the functions of the image sensor manager 120 are separated into functions for the OS and functions for the CMOS image sensor module 70. In the example illustrated in FIG. 27, the image sensor manager 120 used for the OS is referred to as the image sensor manager 120A. Similarly, the image sensor manager 120 used for the CMOS image sensor module 70 is referred to as an image sensor manager 120C. However, in the following explanation, when the image sensor managers 120A and 120C need not be distinguished from each other, they are simply referred to as the image sensor manager 120.

As illustrated in FIG. 27, the image sensor manager 120C for the CMOS image sensor module 70 includes a second standby state control unit 171, the first image processing unit 121, a second standby-state power control unit 172, and the image sensor control unit 124. The second standby state control unit 171 comprehensively controls the operations of the image sensor manager 120. The first image processing unit 121 performs the standby-state image processing (the first image processing). The second standby-state power control unit 172 controls the electrical power supplied to the image sensor 73. The image sensor control unit 124 controls the CMOS image sensor module 70.

As illustrated in FIG. 27, the image sensor manager 120A for the OS includes a first standby state control unit 173 and a first standby-state power control unit 174. The first standby state control unit 173 communicates with the second standby state control unit 171 of the CMOS image sensor module 70. The first standby-state power control unit 174 controls the electrical power supplied to the SoC 10. For example, the first standby-state power control unit 174 instructs the power manager 140 to switch the SoC 10 to the DEEP SLEEP mode.

Figure 28:
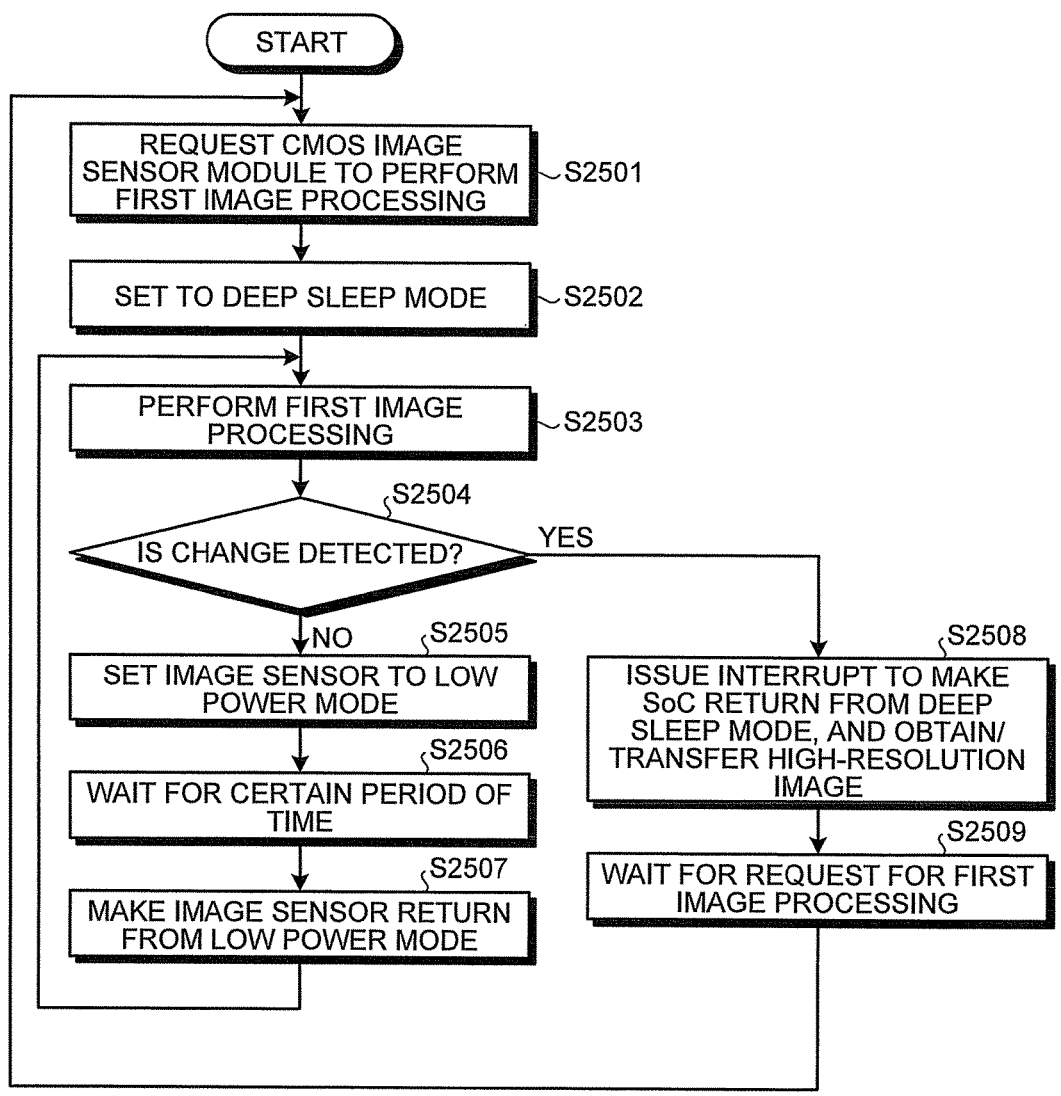
FIG. 28 is a flowchart for explaining operations performed by the image sensor manager according to the 16-th embodiment.

FIG. 28 is a flowchart for explaining an example of the operation performed by the image sensor manager 120. This operation is started when the first standby state control unit 173 receives a request for the change detection operation (a request for the first image processing) from the application. The first standby state control unit 173 requests the CMOS image sensor module 70 to perform the first image processing (Step S2501). Then, the first standby-state power control unit 173 instructs the power manager 140 to set the DEEP SLEEP mode (Step S2502).

Subsequently, the first image processing unit 121 of the CMOS image sensor module 70 performs the first image processing (Step S2503). If an image change is detected (Yes at Step S2504), then the system control proceeds to Step S2508. On the other hand, if no image change is detected (No at Step S2504), then the second standby-state power control unit 172 sets the CMOS image sensor 73 to the low power mode (Step S2505). Subsequently, the second standby-state power control unit 172 waits for a certain period of time using a timer (Step S2506). After the elapse of the certain period of time, the second standby-state power control unit 172 performs control to make the CMOS image sensor 73 return from the low power mode to the state in which the first image processing can be performed (Step S2507). Then, the system control returns to Step S2503. Thus, the first image processing unit 121 again performs the first image processing.

Meanwhile, when an image change is detected (Yes at Step S2504), the second standby state control unit 171 issues an interrupt and makes the SoC 10 return from the DEEP SLEEP mode, instructs the image sensor control unit 124 to obtain a high-resolution image, and performs control to transfer the high-resolution image to the SoC 10 (Step S2508). Then, the second standby state control unit 171 waits for a request for the change detection operation (the first image processing) from the first standby state control unit 173 (from another viewpoint, a request from the application) (Step S2509). Subsequently, the system control returns to Step S2501. Meanwhile, just before performing the operation at Step S2509, the CMOS image sensor 73 can be set to the low power mode; and can be made to return from the low power mode after a request is received.

In essence, the image sensor device 70 according to the 16-th embodiment is an image input device that includes the image sensor 73. When an image input request is received, the image sensor device 70 receives input of a first image from the image sensor 73. If no change is found in the first image, then the image sensor device 70 waits for the input of the next first image. When a change is found in a first image, the image sensor device 70 receives input of a second image, which has a higher resolution than the first image, from the image sensor 73; and outputs the second image. Moreover, when no change is found in a first image, the image sensor device 70 according to the 16-th embodiment waits for the input of the next first image and switches the electrical power from the second electrical power, which is used at the time of inputting images, to the third electrical power that is lower than the second electrical power.

Meanwhile, the 16-th embodiment can also be implemented in the configuration of a glasses-type wearable device described in a latter embodiment.

In the 16-th embodiment, the first image processing (the standby-state image processing) is performed using a low-resolution image or an unclear image, and the presence or absence of an image change is detected. Similarly, it is also possible to detect whether any object, such as a camera, that is prohibited from being captured from the perspective of security or privacy protection (hereinafter, referred to as a "prohibited object") has been captured. That is, in the configuration in which the first image processing unit 121 is included in the image sensor module 70, the first image processing unit 121 can also perform an operation to determine whether or not the image obtained by the CMOS image sensor control unit 124 is allowed to be obtained in the information processing device 1.

For example, when a change is detected during the first image processing, an operation for detecting whether or not a prohibited object is captured is also performed. If a prohibited object is captured, then the transfer of a high-resolution image to the SoC 10 is blocked; or the prohibited object is defocused; or an image having a sufficiently low resolution allowed from the perspective of security of privacy protection is sent in return. As a result, an information processing device equipped with an image sensor can be achieved in which the power consumption is low and in which images that may pose problem from the perspective of security or privacy protection are prevented from being output to the outside of the image sensor 73. Alternatively, the configuration can be such that, unless it is detected that an object allowed to be captured is captured, no image is output to the outside of the image sensor 73.

17-th Embodiment

Unlike the 16-th embodiment in which the first image processing is performed in the image sensor device 70 (the CMOS image sensor module 70), the image sensor device 70 according to a 17-th embodiment has a plurality of imaging modes suitable for implementing the first embodiment in an efficient manner.

More particularly, the image sensor device 70 has a first imaging mode that, at the time of inputting first images from the CMOS image sensor in response to an image input request, inputs a specified number of images having a specified resolution at a specified interval according to the specifications from the application; that is specialized in change detection; and that consumes low electrical power. Of course, only a single low-resolution image may also be taken. Generally, at the start of imaging, images keep on being continuously input from the image sensor 73. Hence, surplus images are input from the image sensor 73, thereby leading to a surplus operation time and high power consumption in the image sensor 73. However, in the first imaging mode, only the minimum necessary images can be input, thereby enabling minimization of the operation time of the image sensor 73. The first imaging mode is based on the premise of performing the first image processing. Hence, after the input of images is over, the image sensor device 70 can automatically and immediately switch to the low power mode. Thus, the first imaging mode is specialized for the first image processing (the change detection operation), and has the functions such autofocusing disabled so that only low-resolution and unclear images usable in the change detection operation can be taken. Of course, the first imaging mode can also be used in the second image processing.

A second imaging mode is based on the premise of performing the second image processing. In the second imaging mode, unless separately specified, images are input in a continuous manner. Hence, when the input of continuous images is required in the second image processing, the second imaging mode can be used. In this way, the image input device (the image sensor module 70) has the first imaging mode in which the specified first image is returned from the image sensor 73 and the input is completed and in which change detection can be performed at a low electrical power; and has a second imaging mode in which the specified second image is returned and the input is continued unless separately specified.

A third imaging mode represents a mode in which the delay in the first image processing and the second image processing is reduced. If imaging for a second image is done after the completion of the first image processing, then there are times when a delay occurs. In the third imaging mode, the first image (the low-resolution image) to be used in the first image processing as well as the second image (the high-resolution image) to be used in the second image processing is obtained in advance and stored in the buffer of the image sensor device 70; and firstly only the low-resolution image is returned. After the application performs the first image processing, if a change is detected, then an image input request for a second image is received. In response to the request, the second image that was stored is returned. As a result, it becomes possible to significantly reduce the time difference between imaging for the first image and imaging for the second image.

Thus, in the 17-th embodiment, the configuration can be such that the image input device (the image sensor module 70) inputs a first image and a second image, which has a higher resolution than the first image, in succession; and stores therein the second image. Then, as a result of performing the first process (in this example, the "first image processing") for determining a change in the first image; if a change in the first image is detected, the image input device outputs (in this example, outputs to the application) the second image that is stored. Meanwhile, the imaging modes explained above are only exemplary. That is, the image mode is not limited to the imaging modes explained above.

18-th Embodiment

Figure 29:
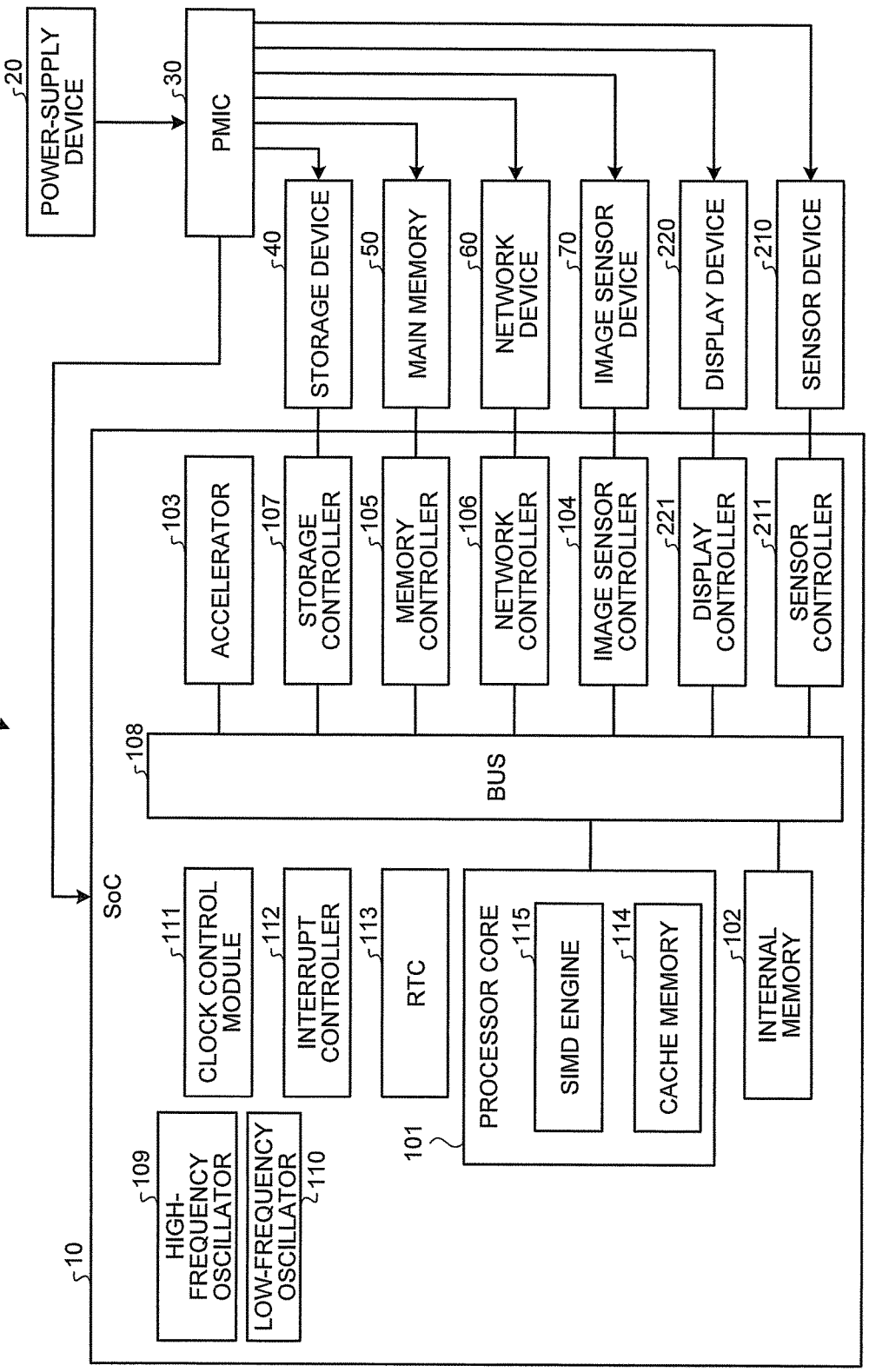
FIG. 29 is a diagram illustrating a configuration of the information processing device according to an 18-th embodiment.

The information processing device 1 according to an 18-th embodiment is configured with a glasses-type wearable device. As illustrated in FIG. 29, the information processing device 1 according to the 18-th embodiment includes, in addition to the configuration illustrated in FIG. 1, a sensor device 210; a sensor controller 211 that controls the sensor device 210; a display device 220; and a display controller 221 that controls the display device 220. For example, the sensor device 210 is configured with a 9-axis sensor module having a 3-axis gyro sensor, a 3-axis acceleration sensor, and a 3-axis electronic compass. Alternatively, various other sensors such as an infrared sensor or a sound sensor (a microphone) can be used as the sensor device 210. The display device 220 is configured with, for example, a head-mounted display that is equipped with various types of electronic-paper devices or nonvolatile displays such as Mirasol; or an LCD such as IGZO or a memory liquid crystal display that runs on low refresh rate. Meanwhile, also in all other embodiments other than the 18-th embodiment, the information processing device 1 can be configured with a glasses-type wearable device as is the case in the 18-th embodiment.

In the 18-th embodiment, an offloading control unit is disposed that makes a second information processing device, which is different than the information processing device 1, perform the second image processing (i.e., the offloading control unit offloads the second image processing to the second information processing device). For example, collaboration is done with a smartphone (that corresponds to the second information processing device) using a wireless LAN or near field communication, and the advanced second process and other high-load processing can be offloaded to the smartphone (not illustrated). For example, as a result of performing the first image processing in the SoC 10 of a glasses-type wearable device; if a person is detected, then a high-resolution image having the required resolution for the second image processing in the form of advanced face recognition is transferred to the smartphone, and the smartphone can be instructed to perform face recognition and an operation for searching the person whose face is recognized (the second image processing can be considered to be including both operations). Meanwhile, in this case, the processing can be further offloaded from the smartphone to a third information processing device such as a cloud. Then, the smartphone returns the result of the second process to the information processing device 1 (in this example, a glasses-type wearable device). The information processing device 1 generates a synthetic image by synthesizing the result of the second image processing, which is received from the smartphone, with the image; and displays the synthetic image on an LCD. Meanwhile, while the second image processing is being performed in the smartphone, the information processing device 1 is switched to the low power consumption state.

Figure 30:
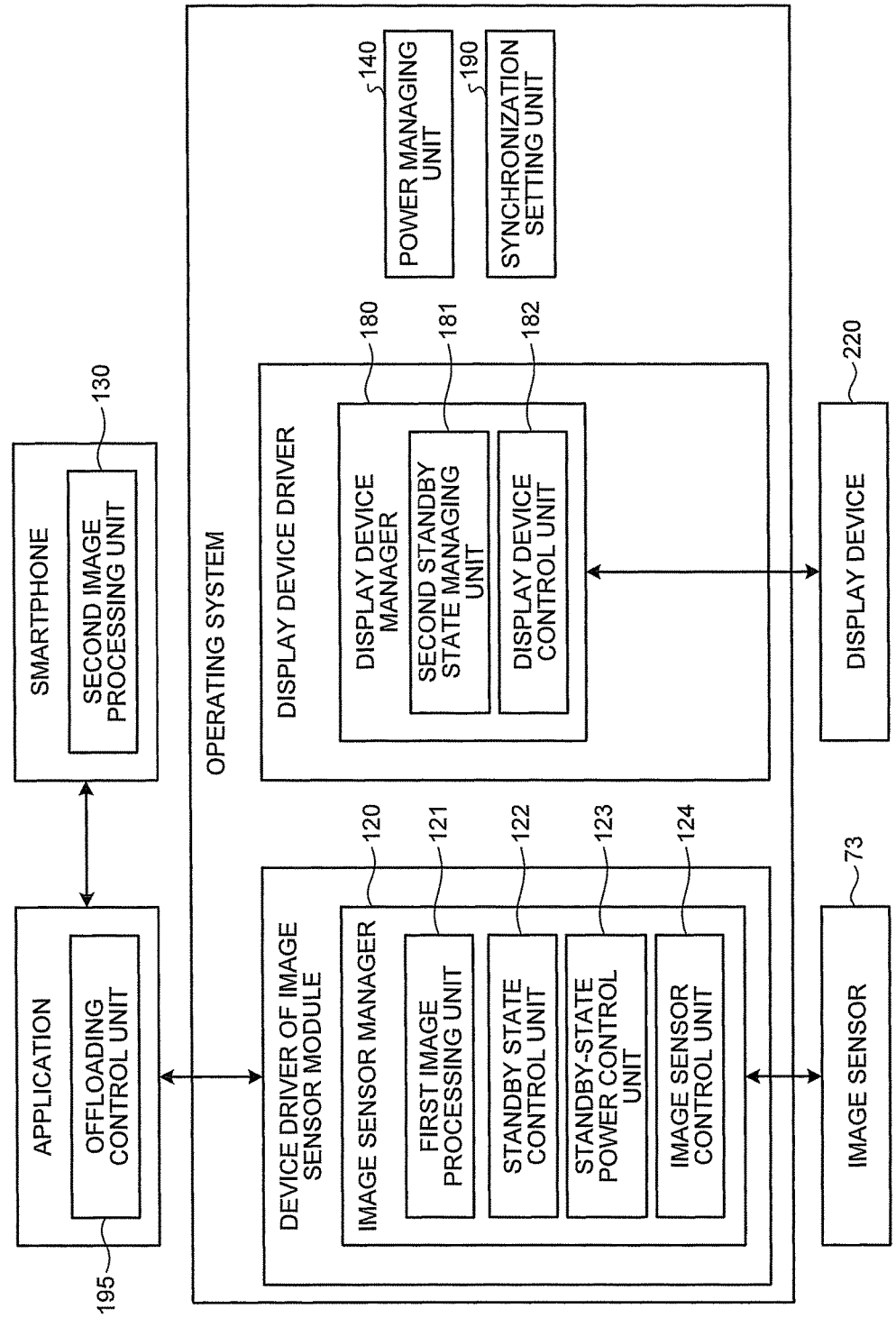
FIG. 30 is a diagram illustrating a configuration of the information processing device and a smartphone according to the 18-th embodiment.

FIG. 30 is a diagram illustrating an exemplary functional configuration of the information processing device 1 and a smartphone, which functions as the second information processing device, according to the 18-th embodiment. The functions provided by the OS include the image sensor manager 120, a display device manager 180, the power manager 140, and a synchronization setting unit 190. The image sensor manager 120 includes the first image processing unit 121, the standby state control unit 122, the standby-state power control unit 123, and the image sensor control unit 124. These functions are almost identical to the functions according to the first embodiment. The standby state control unit 122 performs communication with applications in an identical manner to the first embodiment.

The display device manager 180 includes a second standby state manager 181 and a display device control unit 182. The second standby state manager 181 comprehensively controls the operations of the display device manager 180. The display device control unit 182 controls the display device 220.

The synchronization setting unit 190 synchronizes the execution timing of the operation that is periodically performed by a device in the information processing device 1 with the execution timing of the first image processing. In this example, the device represents the display device 220 (a display device) and the operation that is periodically performed by the device represents a refresh operation for holding the display contents. However, that is not the only possible case. In essence, in the information processing device 1 according to the 18-th embodiment, the configuration can be such that the execution timing of the first process (in this example, the "first image processing") for determining a change in a first image is synchronized with the execution timing of a third process (in this example, the "refresh operation") performed in the information processing device 1.

Meanwhile, in the example illustrated in FIG. 30, the application includes an offloading control unit 195 that performs control to make the smartphone perform the second image processing; while the smartphone includes the second image processing unit 130 that performs the second image processing.

In an identical manner to the first embodiment, the application requests the image sensor manager 120 to perform the first image processing. Upon receiving that request, the standby state control unit 122 instructs the first image processing unit 121 to perform the first image processing. Thus, the first image processing unit 121 performs the first image processing according to the instruction. As a result of performing the first image processing; if an image change is detected, then the standby state control unit 122 makes the image sensor control unit 124 obtain a high-resolution image required in the second image processing; and sends to the application a notification about the high-resolution image and information indicating that the condition for performing the second image processing is satisfied. Upon receiving the notification, the application (the offloading control unit 195) transfers the high-resolution image to the smartphone and instructs the smartphone to perform the second image processing. In response to the instruction, the smartphone (the second image processing unit 130) performs the second image processing and returns the result of the second image processing to the application. Then, the application generates a synthetic image by synthesizing the result of the second image processing, which is received from the smartphone, with the image; and transfers the synthetic image to the display device driver (the display device manager 180). The second standby state manager 181 receives the synthetic image and instructs the display device control unit 182 to display the synthetic image. According to the instruction from the second standby state manager 181, the display device control unit 182 performs control to display the synthetic image on the display device 220.

Figure 31:
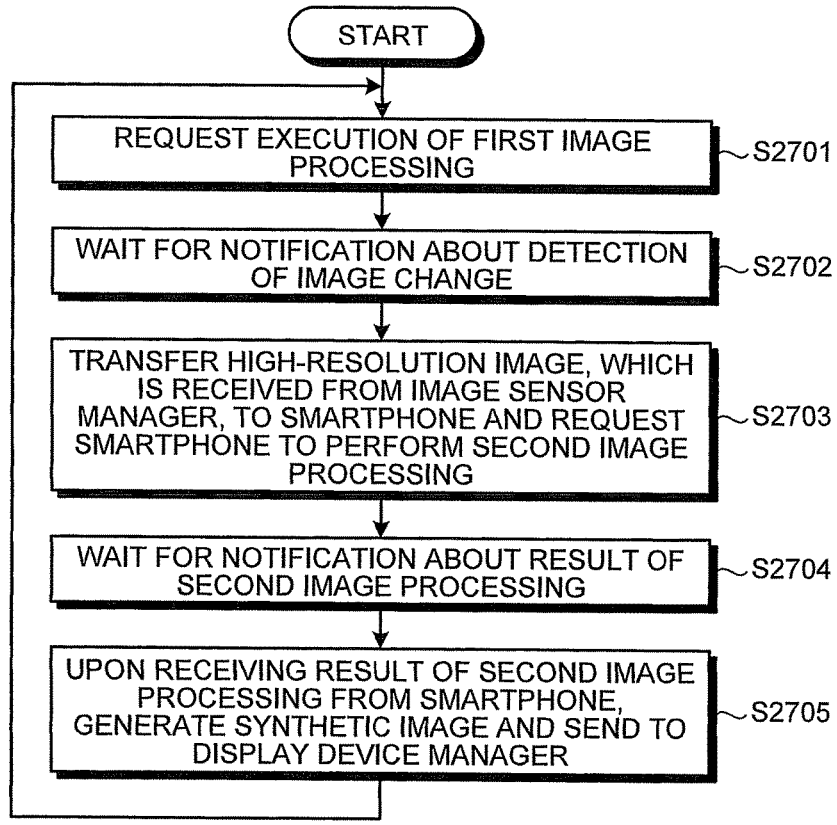
FIG. 31 is a flowchart for explaining operations performed by an application according to the 18-th embodiment.

FIG. 31 is a flowchart for explaining an example of the operations performed by the application. As illustrated in FIG. 31, firstly, the application requests the image sensor manager 120 to perform the first image processing (Step S2701). Then, the application waits for a notification about the detection of an image change from the image sensor manager 120 (can be considered to be a notification about the information indicating that the condition for performing the second image processing is satisfied) (Step S2702). When a notification about the detection of an image change is received from the image sensor manager 120, the application transfers the high-resolution image, which is received along with the notification, to the smartphone and requests the smartphone to perform the second image processing (Step S2703). Subsequently, the application waits for a notification about the result of performing the second image processing (Step S2704). When the result of performing the second image processing is received from the smartphone, the application generates a synthetic image by synthesizing the result of the second image processing with the image; and transfers the synthetic image to the display device manager 180 (Step S2705). Herein, the application performs these operations in a repeated manner. Meanwhile, since the operations performed by the image sensor manager 120 are almost identical to the explanation with reference to FIG. 8, the detailed explanation is omitted herein.

Figure 32:
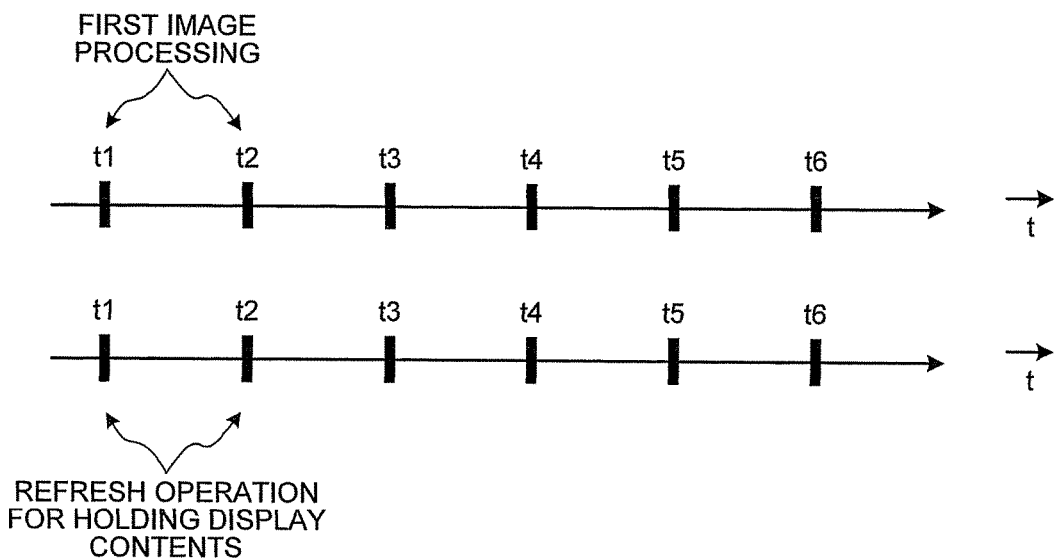
FIG. 32 is a diagram for explaining the setting performed by a synchronization setting unit according to the 18-th embodiment.

When the second image processing is offloaded in this way, electrical power is consumed in transferring the data such as images. However, in return for that, the electrical power required to perform the second image processing can be reduced, and also there are times when the operations can be swiftly completed in the smartphone. In the display device of the information processing device, a large amount of electrical power is consumed related to the display. Hence, if a display device is used that can hold the display even if the supply of electrical power is stopped (or only a small amount of electrical power is supplied) when there is no change in the display contents, it becomes possible to hold down the power consumption during the standby state while the user of the information processing device is viewing the display or when there is no change in the display contents. Examples of such a display device include a nonvolatile electronic paper; a memory liquid crystal display; a liquid crystal display (LCD) compatible to panel self-refresh (PSR); and a low-power-consumption display such as IGZO that runs on low refresh rate. In a low-power-consumption display such as IGZO that runs on low refresh rate, if periodical rewriting is performed, such as one instance of rewriting per second, then that results in holding the display contents. Hence, as illustrated in FIG. 32, the synchronization setting unit 190 synchronizes the execution interval of the first image processing (the standby-state image processing) (i.e., synchronizes the timing of importing an image from the CMOS image sensor 73) with the timing of performing a periodical refresh operation for the purpose of holding the display contents of the display such as IGZO. As a result, it becomes possible to reduce the number of times of making the SoC 10 return from the DEEP SLEEP mode (needless to say that the explanation is applicable to other low power modes too) for the purpose of performing the operations mentioned above. That enables achieving further electrical power saving.

Meanwhile, in FIG. 32, it is illustrated that the two operations are in complete synchronization. However, alternatively, while the refresh operation is being performed, the first image processing can be performed for a plurality of times; or vice versa. Moreover, calibration can be performed to ensure such implementation. In this way, if the operation timing (or the active period) of a plurality of devices (in this case, the display device 220 and the image sensor 73) is calibrated to maximize the idle period, it becomes possible to achieve a profound power saving effect. Besides, regarding a rewriting operation (an operation for changing the display contents) performed in an asynchronous manner in PSR or an electronic paper, the SoC 10 needs to be returned from the DEEP SLEEP mode. Hence, at that timing, the first image processing can be performed. Of course, it is needless to say that the execution interval of a sensing operation of a 9-axis sensor and the execution interval of the first image processing can also be synchronized.

19-th Embodiment

In the first embodiment, if the information processing device 1 is driven using, for example, a photovoltaic cell, the method of performing the first image processing (the standby-state image processing) can be dynamically changed according to the remaining capacitance of a capacitor that stores electrical power (or according to the electricity generated by the photovoltaic cell). As a result, even under strict power constraints, the operations of the information processing device 1 can be continued in a stable manner. For example, when the remaining capacitance of the capacitor falls below a threshold value, then the standby state control unit 122 sets a longer interval for importing an image or changes the image processing algorithm to be implemented in the first image processing so that the power consumption can be held down. In this example, the standby state control unit corresponds to a "switching control unit".

Meanwhile, the embodiments described above can be combined in an arbitrary manner.

A computer program executed in the information processing device 1 can be saved as a downloadable file on a computer connected to a network such as the Internet or can be made available for distribution through a network such as the Internet. Alternatively, the computer program can be stored in advance in a nonvolatile recording medium such as a read only memory (ROM).

Listed below are the features of the information processing device according to the embodiments described above.

Illustrative Embodiment 1

An information processing device includes an image sensor control unit that controls an image sensor; and includes a first image processing unit that uses an image obtained by the image sensor control unit from the image sensor, and performs first image processing which has a smaller throughput than second image processing and which is performed to determine whether or not to allow execution of the second image processing.

Illustrative Embodiment 2

In the information processing device according to illustrative embodiment 1, the first image processing unit makes the image sensor control unit obtain an image having a lower resolution than an image used in the second image processing, and performs the first image processing using the obtained image.

Illustrative Embodiment 3

The information processing device according to illustrative embodiment 1 further includes a power control unit that, if the result of performing the first image processing does not satisfy the condition for performing the second image processing, performs control to switch the information processing device to a second state in which the power consumption is lower than in a first state in which the first image processing is performed.

Illustrative Embodiment 4

The information processing device according to illustrative embodiment 1 further controls an execution control unit that, if the result of performing the first image processing satisfies the condition for performing the second image processing, performs control to make an application perform the second image processing.

Illustrative Embodiment 5

In the information processing device according to illustrative embodiment 1, the first image processing is performed to detect a change in the image obtained by the image sensor control unit. If performing the first image processing results in the detection of a change in the image obtained by the image sensor control unit, then the condition for performing the second image processing is satisfied.

Illustrative Embodiment 6

In the information processing device according to illustrative embodiment 5, the first image processing is performed to detect whether or not a particular object is captured in the image obtained by the image sensor control unit. If performing the first image processing results in the detection that a particular object is captured in the image obtained by the image sensor control unit, then the condition for performing the second image processing is satisfied.

Illustrative Embodiment 7

The information processing device according to illustrative embodiment 1 further includes a setting control unit that, according to a specification from the application, sets at least one of a plurality of types of image processing algorithms, which are provided in advance in the first image processing unit, as the image processing algorithm to be implemented in the first image processing.

Illustrative Embodiment 8

The information processing device according to illustrative embodiment 1 further includes an interface unit that enables the application to specify at least one of a plurality of types of image processing algorithms, which are provided in advance in the first image processing unit, as the image processing algorithm to be implemented in the first image processing.

Illustrative Embodiment 9

The information processing device according to illustrative embodiment 1 further includes an acquisition control unit that, in response to a request from the application, obtains, from the outside, the image processing algorithm to be implemented in the first image processing.

Illustrative Embodiment 10

The information processing device according to illustrative embodiment 1 further includes an interface unit that enables the application to make the acquisition control unit obtain the image processing algorithm to be implemented in the first image processing.

Illustrative Embodiment 11

In the information processing device according to illustrative embodiment 1, the initialization period for the image sensor is different in the case of obtaining an image to be used in the first image processing than in the case of obtaining an image to be used in the second image processing.

Illustrative Embodiment 12

In the information processing device according to illustrative embodiment 11, in the case of obtaining an image to be used in the first image processing, the image sensor control unit sets the initialization period for the image sensor to be shorter than the initialization period for the image sensor in the case of obtaining an image to be used in the second image processing.

Illustrative Embodiment 13

The information processing device according to illustrative embodiment 1 further includes an interface unit that enables the application to specify the initialization period for the image sensor.

Illustrative Embodiment 14

In the information processing device according to illustrative embodiment 13, the image sensor control unit sets the initialization period for the image sensor according to the specification from the application.

Illustrative Embodiment 15

The information processing device according to illustrative embodiment 1 further includes an interface unit that enables the application to specify a time interval for performing the first image processing.

Illustrative Embodiment 16

The information processing device according to illustrative embodiment 15 further includes an interval setting control unit that sets the time interval according to the specification from the application.

Illustrative Embodiment 17

The information processing device according to illustrative embodiment 1 further includes an execution control unit that, when the result of the first image processing satisfies the condition for performing the second image processing, makes the image sensor control unit obtain a high-resolution image, which at least includes an image of the area satisfying the condition for performing the second image processing and which has a higher resolution than the image used in the first image processing; and sends the high-resolution image to the application.

Illustrative Embodiment 18

In the information processing device according to illustrative embodiment 17, the execution control unit sends, to the application, the high-resolution image and information indicating the area in the high-resolution image that satisfies the condition for performing the second image processing.

Illustrative Embodiment 19

The information processing device according to illustrative embodiment 17 further includes an interface unit that enables the application to obtain the high-resolution image.

Illustrative Embodiment 20

In the information processing device according to illustrative embodiment 1, the image sensor control unit obtains, as the image to be used in the first image processing, an image of a partial area in the entire image obtainable from the image sensor.

Illustrative Embodiment 21

The information processing device according to illustrative embodiment 20 further includes an interface unit that enables the application to specify the partial area.

Illustrative Embodiment 22

In the information processing device according to illustrative embodiment 1, the time interval for performing the first image processing changes in a dynamic manner.

Illustrative Embodiment 23

The information processing device according to illustrative embodiment 22 includes an interval setting control unit that sets the time interval in a variable manner according to the result of performing the first image processing.

Illustrative Embodiment 24

In the information processing device according to illustrative embodiment 1, the time taken for the first image processing changes according to the time interval for performing the first image processing.

Illustrative Embodiment 25

The information processing device according to illustrative embodiment 24 further includes a switching time setting unit that, according to the time interval, sets, in a variable manner, a switching time that indicates the period of time required to switch between a third state, in which the image sensor cannot obtain an image, and a fourth state, in which the image sensor can obtain an image.

Illustrative Embodiment 26

The information processing device according to illustrative embodiment 3 further includes a cache power-supply determination control unit that determines whether or not to continue the supply of electrical power to a cache memory, which is used in the first image processing, at the time of switching to the second state.

Illustrative Embodiment 27

In the information processing device according to illustrative embodiment 26, when the time interval for performing the first image processing is longer than a threshold value, the cache power-supply determination control unit determines to stop the supply of electrical power to the cache memory. However, when the time interval for performing the first image processing is equal to or shorter than the threshold value, the cache power-supply determination control unit determines to continue the supply of electrical power to the cache memory.

Illustrative Embodiment 28

In the information processing device according to illustrative embodiment 1, in the case of performing the first image processing, the access frequency with respect to a main memory device is smaller than the access frequency in the case of performing the second image processing.

Illustrative Embodiment 29

The information processing device according to illustrative embodiment 28 further includes an internal memory that is used to store at least some of the data used in the first image processing and that is different than the main memory device. The first image processing unit performs the first image processing using the data stored in the internal memory.

Illustrative Embodiment 30

In the information processing device according to illustrative embodiment 1, the image obtained by the image sensor control unit and used in the first image processing changes over time.

Illustrative Embodiment 31

The information processing device according to illustrative embodiment 30 includes a statistical information manager that, based on the result of the first image processing performed repeatedly during a learning period, generates statistical information in which, for each of a plurality of subareas constituting an entire image obtainable from the image sensor, the number of times of detection of a change is held in a corresponding manner. The first image processing unit instructs the image sensor control unit to obtain, from the entire image, images of the subareas for which the number of times of detection of a change is equal to or greater than a threshold value, and performs the first image processing using the obtained images.

Illustrative Embodiment 32

The information processing device according to illustrative embodiment 31 further includes an interface unit that enables the application to specify the learning period.

Illustrative Embodiment 33

The information processing device according to illustrative embodiment 31 further includes an interface unit that enables the application to obtain the statistical information.

Illustrative Embodiment 34

The information processing device according to illustrative embodiment 1 further includes a preloader that, prior to the start of the first image processing, preloads the data to be used in the first image processing.

Illustrative Embodiment 35

The information processing device according to illustrative embodiment 1 further includes a microcomputer that includes the first image processing unit.

Illustrative Embodiment 36

In the information processing device according to illustrative embodiment 1, the image sensor includes the first image processing unit.

Illustrative Embodiment 37

In the information processing device according to illustrative embodiment 36, the first image processing unit performs an operation to determine whether or not the image obtained by the image sensor control unit is allowed to be obtained in the information processing device.

Illustrative Embodiment 38

The information processing device according to illustrative embodiment 1 further includes an offloading control unit that makes a second information processing device, which is different than the information processing device, perform the second image processing.

Illustrative Embodiment 39

The information processing device according to illustrative embodiment 1 further includes a synchronization setting unit that synchronizes the execution timing of the operation that is periodically performed by a device in the information processing device with the execution timing of the first image processing.

Illustrative Embodiment 40

In the information processing device according to illustrative embodiment 39, the device represents a display device and the operation that is periodically performed by the device represents a refresh operation for holding the display contents.

Illustrative Embodiment 41

The information processing device according to illustrative embodiment 1 further includes a switching control unit that changes the method of performing the first image processing according to the capacitance of a capacitor which stores electrical power.

Illustrative Embodiment 42

An information processing device includes an image sensor control unit that controls an image sensor; and includes a first image processing unit that uses an image obtained by the image sensor control unit from the image sensor, and performs second image processing which is performed to determine whether or not to allow execution of first image processing and which has a smaller throughput than the first image processing.

Listed below are the features of an information processing method implemented in the information processing device (a processor) according to the embodiments described above.

Illustrative Embodiment 43

In an information processing method, an image sensor is controlled, and an image obtained from the image sensor during the control of the image sensor is used in performing first image processing which has a smaller throughput than second image processing and which is performed to determine whether or not to allow execution of the second image processing.

Illustrative Embodiment 44

In the information processing method according to illustrative embodiment 43, an image having a lower resolution than an image used in the second image processing is obtained during the control performed by the image sensor control unit, and the first image processing is performed using the obtained image.

Illustrative Embodiment 45

In the information processing method according to illustrative embodiment 43, if the result of performing the first image processing does not satisfy the condition for performing the second image processing, control is performed to switch the information processing device to a second state in which the power consumption is lower than in a first state in which the first image processing is performed.

Illustrative Embodiment 46

In the information processing method according to illustrative embodiment 43, if the result of performing the first image processing satisfies the condition for performing the second image processing, control is performed to make an application perform the second image processing.

Illustrative Embodiment 47

In the information processing method according to illustrative embodiment 43, the first image processing is performed to detect a change in the image that is obtained during the control of the image sensor. If performing the first image processing results in the detection of a change in the image that is obtained during the control of the image sensor, then the condition for performing the second image processing is satisfied.

Illustrative Embodiment 48

In the information processing method according to illustrative embodiment 47, the first image processing is performed to detect whether or not a particular object is captured in the image that is obtained during the control of the image sensor. If performing the first image processing results in the detection that a particular object is captured in the image that is obtained during the control of the image sensor, then the condition for performing the second image processing is satisfied.

Illustrative Embodiment 49

In the information processing method according to illustrative embodiment 43, in response to a request from the application, the image processing algorithm to be implemented in the first image processing is obtained from the outside.

Illustrative Embodiment 50

In the information processing method according to illustrative embodiment 43, the initialization period for the image sensor is different in the case of obtaining an image to be used in the first image processing than in the case of obtaining an image to be used in the second image processing.

Illustrative Embodiment 51

In the information processing method according to illustrative embodiment 50, in the case of obtaining an image to be used in the first image processing, the initialization period for the image sensor is set to be shorter than the initialization period for the image sensor in the case of obtaining an image to be used in the second image processing.

Illustrative Embodiment 52

In the information processing method according to illustrative embodiment 43, the initialization period for the image sensor is set according to the specification from the application.

Illustrative Embodiment 53

In the information processing method according to illustrative embodiment 43, a time interval for performing the first image processing is set according to the specification from the application.

Illustrative Embodiment 54

In the information processing method according to illustrative embodiment 43, when the result of the first image processing satisfies the condition for performing the second image processing, a high-resolution image, which at least includes an image of the area satisfying the condition for performing the second image processing and which has a higher resolution than the image used in the first image processing, is obtained during the control performed by the image sensor control unit; and the high-resolution image is sent to the application.

Illustrative Embodiment 55

In the information processing method according to illustrative embodiment 54, to the application is sent the high-resolution image and information indicating the area in the high-resolution image that satisfies the condition for performing the second image processing.

Illustrative Embodiment 56

In the information processing method according to illustrative embodiment 43, an image of a partial area in the entire image obtainable from the image sensor is obtained as the image to be used in the first image processing.

Illustrative Embodiment 57

In the information processing method according to illustrative embodiment 43, the time interval for performing the first image processing changes in a dynamic manner.

Illustrative Embodiment 58

In the information processing method according to illustrative embodiment 57, the time interval is set in a variable manner according to the result of performing the first image processing.

Illustrative Embodiment 59

In the information processing method according to illustrative embodiment 43, the time taken for the first image processing changes according to the time interval for performing the first image processing.

Illustrative Embodiment 60

In the information processing method according to illustrative embodiment 59, according to the time interval, a switching time is set in a variable manner that indicates the period of time required to switch between a third state, in which the image sensor cannot obtain an image, and a fourth state, in which the image sensor can obtain an image.

Illustrative Embodiment 61

In the information processing method according to illustrative embodiment 45, it is determined whether or not to continue the supply of electrical power to a cache memory, which is used in the first image processing, at the time of switching to the second state.

Illustrative Embodiment 62

In the information processing method according to illustrative embodiment 61, when the time interval for performing the first image processing is longer than a threshold value, it is determined to stop the supply of electrical power to the cache memory. However, when the time interval for performing the first image processing is equal to or shorter than the threshold value, it is determined to continue the supply of electrical power to the cache memory.

Illustrative Embodiment 63

In the information processing method according to illustrative embodiment 43, in the case of performing the first image processing, the access frequency with respect to a main memory device is smaller than the access frequency in the case of performing the second image processing.

Illustrative Embodiment 64

In the information processing method according to illustrative embodiment 63, the first image processing is performed using data stored in an internal memory that is used to store at least some of the data used in the first image processing and that is different than the main memory device.

Illustrative Embodiment 65

In the information processing method according to illustrative embodiment 43, the image obtained during the control of the image sensor and used in the first image processing changes over time.

Illustrative Embodiment 66

In the information processing method according to illustrative embodiment 65, based on the result of the first image processing performed repeatedly during a learning period, statistical information is generated in which, for each of a plurality of subareas constituting an entire image obtainable from the image sensor, the number of times of detection of a change is held in a corresponding manner. During the control of the image sensor; of the entire image, images of the subareas for which the number of times of detection of a change is equal to or greater than a threshold value are obtained, and the first image processing is performed using the obtained images.

Illustrative Embodiment 67

In the information processing method according to illustrative embodiment 43, prior to the start of the first image processing, the data to be used in the first image processing is preloaded.

Illustrative Embodiment 68

In the information processing method according to illustrative embodiment 43, a microcomputer performs the first image processing.

Illustrative Embodiment 69

In the information processing method according to illustrative embodiment 43, the image sensor performs the first image processing.

Illustrative Embodiment 70

In the information processing device according to illustrative embodiment 69, during the first image processing, an operation is performed to determine whether or not the image obtained during the control of the image sensor is allowed to be obtained in the information processing device.

Illustrative Embodiment 71

In the information processing method according to illustrative embodiment 43, a second information processing device, which is different than the information processing device, is made to perform the second image processing.

Illustrative Embodiment 72

In the information processing method according to illustrative embodiment 43, the execution timing of the operation that is periodically performed by a device in the information processing device is synchronized with the execution timing of the first image processing.

Illustrative Embodiment 73

In the information processing method according to illustrative embodiment 72, the device represents a display device and the operation that is periodically performed by the device represents a refresh operation for holding the display contents.

Illustrative Embodiment 74

In the information processing method according to illustrative embodiment 43, the method of performing the first image processing is changed according to the capacitance of a capacitor that stores electrical power.

Illustrative Embodiment 75

In an information processing method, an image sensor is controlled, and an image obtained from the image sensor during the control of the image sensor is used in performing second image processing which is performed to determine whether or not to allow execution of first image processing and which has a smaller throughput than the first image processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory having an operating system and an application stored therein; and
a processor communicatively coupled to the memory, the processor configured to
operate as a first processing unit when the processor executes the operating system, and
operate as a second processing unit when the processor executes the application, wherein
the first processing unit uses a first accelerator to perform processing for a first image received from an image sensor,
when there is a change in the first image, the first processing unit receives a second image having a higher resolution than the first image from the image sensor and sends the second image to the second processing unit,
the second processing unit performs processing for the second image, and
when there is no change in the first image, the first processing unit stops supply of electrical power to a main memory that is a non-volatile memory.

2. The device according to claim 1, wherein
when there is no change in the first image, the first processing unit waits for reception of the next first image at a first electrical power, the first electrical power being lower than electrical power used while a first process for determining a change in the first image is performed.

3. The device according to claim 1, wherein
electrical power supplied to the image sensor is equal to a second electrical power when capturing an image and is equal to a third electrical power lower than the second electrical power while capturing no image,
the image sensor captures the first image for a first time period representing a period of time taken for capturing images during a period of time in which there is no change in the first image, and
the image sensor captures the first image for a second time period representing a period of time taken for capturing images when there is a change in the first image, the first time period being shorter than the second time period.

4. The device according to claim 1, wherein during a period of time in which there is no change in the first image, a period of time from start of an operation for requesting the first image to start of an operation for obtaining the first image is a third time period, and when there is change in the first image, a period of time from start of an operation for requesting the second image to start of an operation for obtaining the second image is a fourth time period, the third time period being shorter than the fourth time period.

5. The device according to claim 1, wherein when there is no change in the first image, reception of the next first image is awaited for a fifth time period, and when there is a change in the first image, reception of the next first image is awaited for a sixth time period, the sixth time period being shorter than the fifth time period.

6. The device according to claim 5, wherein when reception of the next first image is awaited for the fifth time period, electrical power of the device is equal to a fourth electrical power, and when reception of the next first image is awaited for the sixth time period, electrical power of the device is equal to a fifth electrical power, the fourth electrical power being lower than the fifth electrical power.

7. The device according to claim 1, wherein, when there is no change in the first image, a period of time for which supply of electrical power to a cache memory is stopped and a period of time for which supply of electrical power to the cache memory is continued are changed according to feature of a first process for determining a change in the first image, the cache memory being used to store some of data stored in a main memory device.

8. The device according to claim 1, wherein, when there is a change in a background image that is repeatedly used in a first process for determining a change in the first image, supply of electrical power to a cache memory that is used to store some of data stored in a main memory device is stopped.

9. The device according to claim 1, wherein the first image received from the image sensor is stored in an internal memory installed in a processing unit for processing images, during a first process for determining a change in the first image that is stored in the internal memory, electrical power supplied to a main memory device that is installed on outside of the processing unit is equal to a sixth electrical power, and when a change in the first image is detected, the electrical power supplied to the main memory device is equal to a seventh electrical power that is sufficient to access the main memory device, the sixth electrical power being lower than the seventh electrical power.

10. The device according to claim 9, wherein the first accelerator is used in the first process, and a second accelerator is used in a second process for the second image.

11. The device according to claim 1, wherein a period of time for which reception of the next first image is awaited is changed according a change in movements of the image sensor.

12. The device according to claim 1, wherein an execution timing of a first process for determining a change in the first image is synchronized with an execution timing of a third process performed in the device.

13. The device according to claim 1, wherein a process for determining a change in the first image is performed using the first image to detect a change in the second image.

14. The device according to claim 1, wherein
when there is no change in the first image, the first processing unit switches a system-on-chip (SoC) on which at least the processor is mounted to a deep sleep mode, and
power consumption in the deep sleep mode is lower than power consumption in a low power mode for being in standby on electric power lower than a normal state.

15. The device according to claim 1, wherein
when there is no change in the first image, the first processing unit waits for reception of the next first image.

16. An information processing device comprising:
a memory having an operating system and an application stored therein; and
a processor communicatively coupled to the memory, the processor configured to
operate as a first processing unit when the processor executes the operating system, and
operate as a second processing unit when the processor executes the application, wherein
the first processing unit uses an accelerator to perform processing for a first image received from an image sensor,
when a first process performed by the first processing unit for determining a change in a first image received from an image sensor results in no detection of a change in the first image, the first processing unit waits for reception of the next first image,
when the first process by the first processing unit results in detection of a change in the first image, the second processing unit performs a second process,
electrical power used for the first process is lower than electrical power used for the second process, and
when there is no change in the first image, the first processing unit stops supply of electrical power to a main memory that is a non-volatile memory.

17. The device according to claim 16, wherein when there is no change in the first image, reception of the next first image is awaited at a first electrical power, the first electrical power being lower than electrical power used for the first process.

18. An information processing device comprising:
a memory having an operating system and an application stored therein; and
a processor communicatively coupled to the memory, the processor configured to
operate as a first processing unit when the processor executes the operating system, and
operate as a second processing unit when the processor executes the application, wherein
the first processing unit uses an accelerator to perform processing for a first image received from an image sensor,
when a first process performed by the first processing unit for recognizing an object in a first image that is received from an image sensor results in no recognition of the object, the first processing unit waits for reception of the next first image,
when the first process results in recognition of the object, the first processing unit receives a second image having a higher resolution than the first image from the image sensor and sends the second image to the second processing unit, and the second processing unit performs a second process for the second image, and
when there is no change in the first image, the first processing unit stops supply of electrical power to a main memory that is a non-volatile memory.

19. An information processing device comprising:
a memory having an operating system and an application stored therein; and
a processor communicatively coupled to the memory, the processor configured to
operate as a first processing unit when the processor executes the operating system, and
operate as a second processing unit when the processor executes the application, wherein
the first processing unit uses an accelerator to perform processing for a first image received from an image sensor,
when a first process performed by the first processing unit for recognizing an object in a first image that is received from an image sensor results in no recognition of the object, the first processing unit waits for reception of the next first image,
when the first process by the first processing unit results in recognition of the object, the second processing unit performs a second process,
electrical power used for the first process is lower than electrical power used for the second process, and
when there is no change in the first image, the first processing unit stops supply of electrical power to a main memory that is a non-volatile memory.

20. An information processing device comprising:
a memory having an operating system and an application stored therein; and
a processor communicatively coupled to the memory, the processor configured to
operate as a first processing unit when the processor executes the operating system, and
operate as a second processing unit when the processor executes the application, wherein
the first processing unit uses a first accelerator to perform processing for a first image received from an image sensor,
when there is a change in the first image, the first processing unit receives a second image having a higher resolution than the first image from the image sensor and sends the second image to the second processing unit,
the second processing unit performs processing for the second image, and
when there is no change in the first image, the first processing unit switches a main memory to a low power mode, the main memory being a volatile memory.

* * * * *